US012214961B2

(12) United States Patent
Schedlbauer et al.

(10) Patent No.: US 12,214,961 B2
(45) Date of Patent: Feb. 4, 2025

(54) METHOD AND ORDER-PICKING STORAGE FACILITY FOR STORING AND ORDER-PICKING ARTICLES

(71) Applicant: TGW Logistics Group GmbH, Marchtrenk (AT)

(72) Inventors: Michael Johannes Schedlbauer, Hengersberg (DE); Stefan Holzner, Zaisering (DE); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 901 days.

(21) Appl. No.: 17/261,294

(22) PCT Filed: Jul. 19, 2019

(86) PCT No.: PCT/AT2019/060240
§ 371 (c)(1),
(2) Date: Apr. 5, 2021

(87) PCT Pub. No.: WO2020/014725
PCT Pub. Date: Jan. 23, 2020

(65) Prior Publication Data
US 2021/0261337 A1    Aug. 26, 2021

(30) Foreign Application Priority Data

Jul. 20, 2018    (AT) .............................. A 50632/2018

(51) Int. Cl.
*B65G 1/137*    (2006.01)
*B65G 1/04*    (2006.01)
(Continued)

(52) U.S. Cl.
CPC ......... *B65G 1/1378* (2013.01); *B65G 1/0492* (2013.01); *B66F 9/063* (2013.01);
(Continued)

(58) Field of Classification Search
CPC ..... B65G 1/1378; B65G 1/0492; B60P 3/007; B66F 9/063; B66F 9/183;
(Continued)

(56) References Cited

U.S. PATENT DOCUMENTS 3,866,780 A    2/1975 Miller et al.
4,993,915 A    2/1991 Berger et al.
(Continued)

FOREIGN PATENT DOCUMENTS

AT         507 811 A1    8/2010
AU      2017361114 A     5/2019
(Continued)

OTHER PUBLICATIONS

International Search Report in PCT/AT2019/060240, mailed Apr. 17, 2020.
(Continued)

*Primary Examiner* — Thomas Randazzo
(74) *Attorney, Agent, or Firm* — Collard & Roe, P.C.

(57) ABSTRACT

In a method for storing and picking stackable article carriers in an order fulfillment facility, in which transport loading aids are transported between a loading station with an automatically operated loading device, a storage zone and a removal station with an automatically operated unloading device by autonomously moveable, driverless transport vehicles, the transport loading aids are loaded with article carrier stacks in the loading station and the article carrier stacks are discharged from the transport loading aids in the unloading station. Subsequently, the article carriers for a picking order are reloaded onto one or multiple target loading aids. Further, an order fulfillment facility stores and stackable article carriers.

34 Claims, 31 Drawing Sheets

(51) Int. Cl.
  *B66F 9/06* (2006.01)
  *B66F 9/18* (2006.01)
  *G05B 19/418* (2006.01)
  *G06Q 10/0631* (2023.01)
  *G06Q 10/08* (2024.01)
  *G06Q 10/087* (2023.01)
  *B60P 3/00* (2006.01)

(52) U.S. Cl.
  CPC ........ *B66F 9/183* (2013.01); *G05B 19/41895* (2013.01); *G06Q 10/06315* (2013.01); *G06Q 10/08* (2013.01); *G06Q 10/087* (2013.01); *B60P 3/007* (2013.01)

(58) Field of Classification Search
  CPC ....... G05B 19/41895; G06Q 10/06315; G06Q 10/08; G06Q 10/087
  See application file for complete search history.

(56) References Cited

U.S. PATENT DOCUMENTS

| | | | |
|---|---|---|---|
| 5,102,292 | A | 4/1992 | Brinker et al. |
| 5,242,262 | A | 9/1993 | Andre et al. |
| 5,265,712 | A | 11/1993 | Krieg |
| 5,417,543 | A | 5/1995 | Focke et al. |
| 5,524,747 | A | 6/1996 | Wohlfahrt et al. |
| 6,332,750 | B1 | 12/2001 | Donner et al. |
| 6,652,014 | B2 | 11/2003 | Schmalz et al. |
| 7,047,710 | B2 | 5/2006 | Winkler |
| 7,735,625 | B2 | 6/2010 | Schaefer |
| 8,708,637 | B2 | 4/2014 | Wolkerstorfer |
| 8,915,696 | B2 | 12/2014 | Baumann et al. |
| 8,989,892 | B2 | 3/2015 | Hill |
| 9,008,827 | B1 | 4/2015 | Dwarakanath et al. |
| 9,272,845 | B2 | 3/2016 | Honkanen et al. |
| 9,776,812 | B2 | 10/2017 | Cavelius |
| 9,988,216 | B1 | 6/2018 | Mccalib, Jr. et al. |
| 10,065,798 | B2 | 9/2018 | Borders et al. |
| 10,317,119 | B2 | 6/2019 | Zou |
| 11,530,120 | B2 * | 12/2022 | Ueda ................ B65G 1/0464 |
| 2003/0123962 | A1 | 7/2003 | Mikulic et al. |
| 2005/0047895 | A1 | 3/2005 | Lert, Jr. |
| 2016/0176638 | A1 * | 6/2016 | Toebes ................ G05D 1/0282 701/25 |
| 2017/0022010 | A1 * | 1/2017 | D'Andrea ............ B65G 1/0492 |
| 2017/0066592 | A1 | 3/2017 | Bastian, II et al. |
| 2018/0085788 | A1 * | 3/2018 | Engel .................... B07C 1/025 |
| 2019/0092612 | A1 | 3/2019 | Soder |
| 2020/0039747 | A1 * | 2/2020 | Ahmann ............ B65G 1/1375 |
| 2020/0339348 | A1 * | 10/2020 | Durai ................ B65G 65/00 |

FOREIGN PATENT DOCUMENTS

| | | | | |
|---|---|---|---|---|
| CA | 3108379 | A1 * | 1/2020 | ............ B60P 3/007 |
| DE | 4213301 | A1 | 10/1993 | |
| DE | 10 2005 016 431 | A1 | 10/2006 | |
| DE | 199 59 285 | B4 | 1/2008 | |
| DE | 10 2010 051 948 | A1 | 5/2012 | |
| DE | 10 2011 101 692 | A1 | 11/2012 | |
| DE | 10 2013 101 659 | A1 | 8/2013 | |
| DE | 10 2012 106 112 | A1 | 1/2014 | |
| DE | 10 2012 216 429 | A1 | 3/2014 | |
| DE | 10 2014 104 470 | A1 | 10/2015 | |
| DE | 10 2017 000 274 | A1 | 7/2018 | |
| EP | 0 363 722 | A2 | 4/1990 | |
| EP | 0 451 592 | A1 | 10/1991 | |
| EP | 0 532 950 | A1 | 3/1993 | |
| EP | 0 548 545 | B1 | 1/1996 | |
| EP | 0 627 373 | B1 | 4/1997 | |
| EP | 0 849 199 | A1 | 6/1998 | |
| EP | 0 579 031 | B1 | 9/1998 | |
| EP | 0 952 953 | B1 | 6/2001 | |
| EP | 1 321 397 | A1 | 6/2003 | |
| EP | 1 462 394 | A2 | 9/2004 | |
| EP | 1 659 077 | A2 | 5/2006 | |
| EP | 1 659 077 | B1 | 6/2010 | |
| EP | 2 441 709 | A1 | 4/2012 | |
| EP | 2 456 696 | B1 | 6/2013 | |
| EP | 2 746 194 | A1 | 6/2014 | |
| EP | 2 687 463 | B1 | 11/2016 | |
| WO | 98/31620 | A1 | 7/1998 | |
| WO | 2007/131668 | A1 | 11/2007 | |
| WO | 2008/022767 | A1 | 2/2008 | |
| WO | 2009/094681 | A1 | 8/2009 | |
| WO | 2011/009150 | A1 | 1/2011 | |
| WO | 2012/116690 | A1 | 9/2012 | |
| WO | 2012/127102 | A1 | 9/2012 | |
| WO | 2014/077683 | A1 | 5/2014 | |
| WO | 2014/111890 | A1 | 7/2014 | |
| WO | 2015/144139 | A1 | 10/2015 | |
| WO | 2016/210126 | A1 | 12/2016 | |
| WO | 2017/182135 | A1 | 10/2017 | |
| WO | 2018/039423 | A1 | 3/2018 | |
| WO | 2018/090081 | A1 | 5/2018 | |

OTHER PUBLICATIONS

The Warehouse of the Future—Witron's OPM Technology at Meijer in Wisconsin https://www.youtube.com/watch?v=bn5jVKhFUs, downloaded Jan. 6, 2021 (70 pages).

* cited by examiner

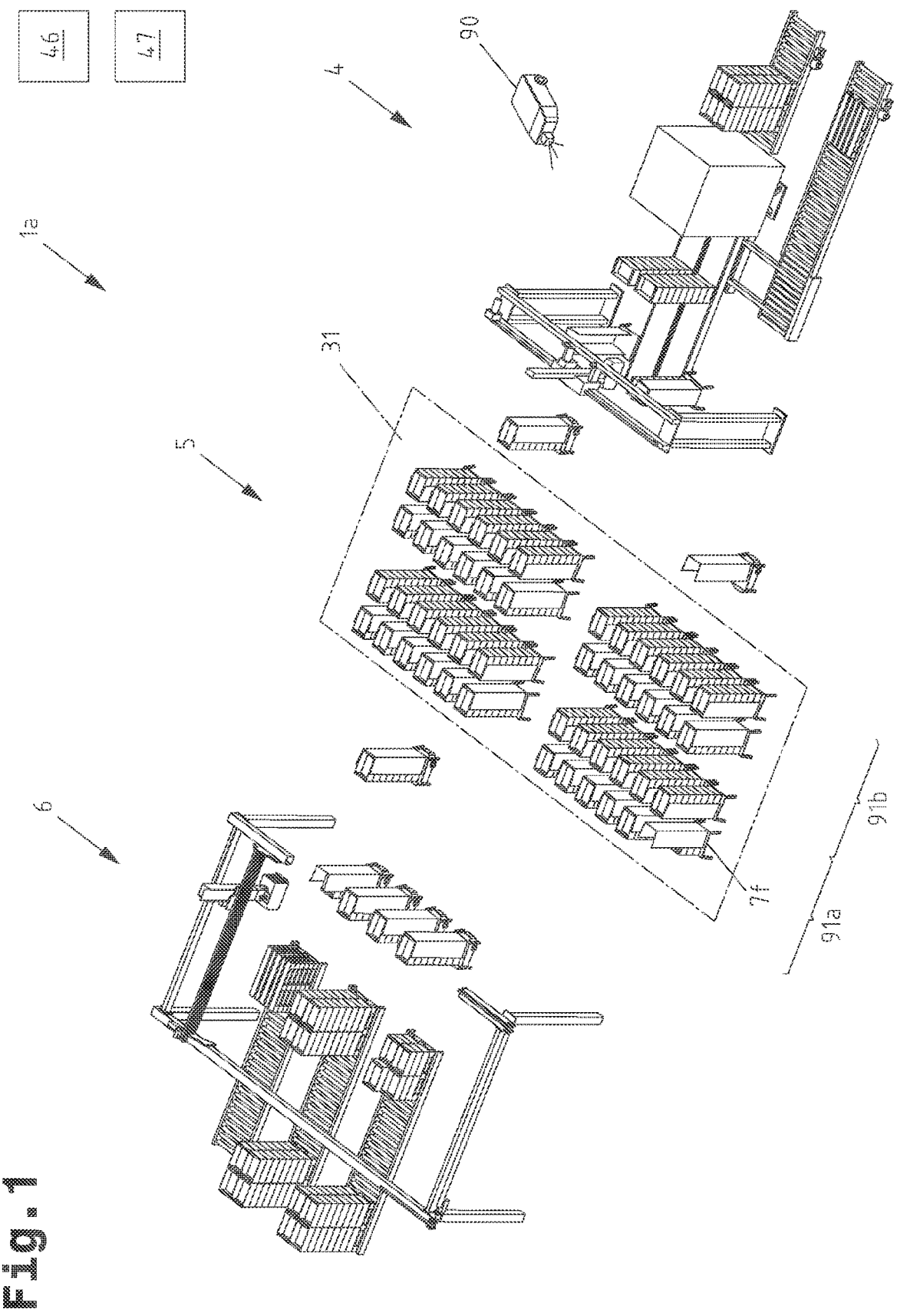

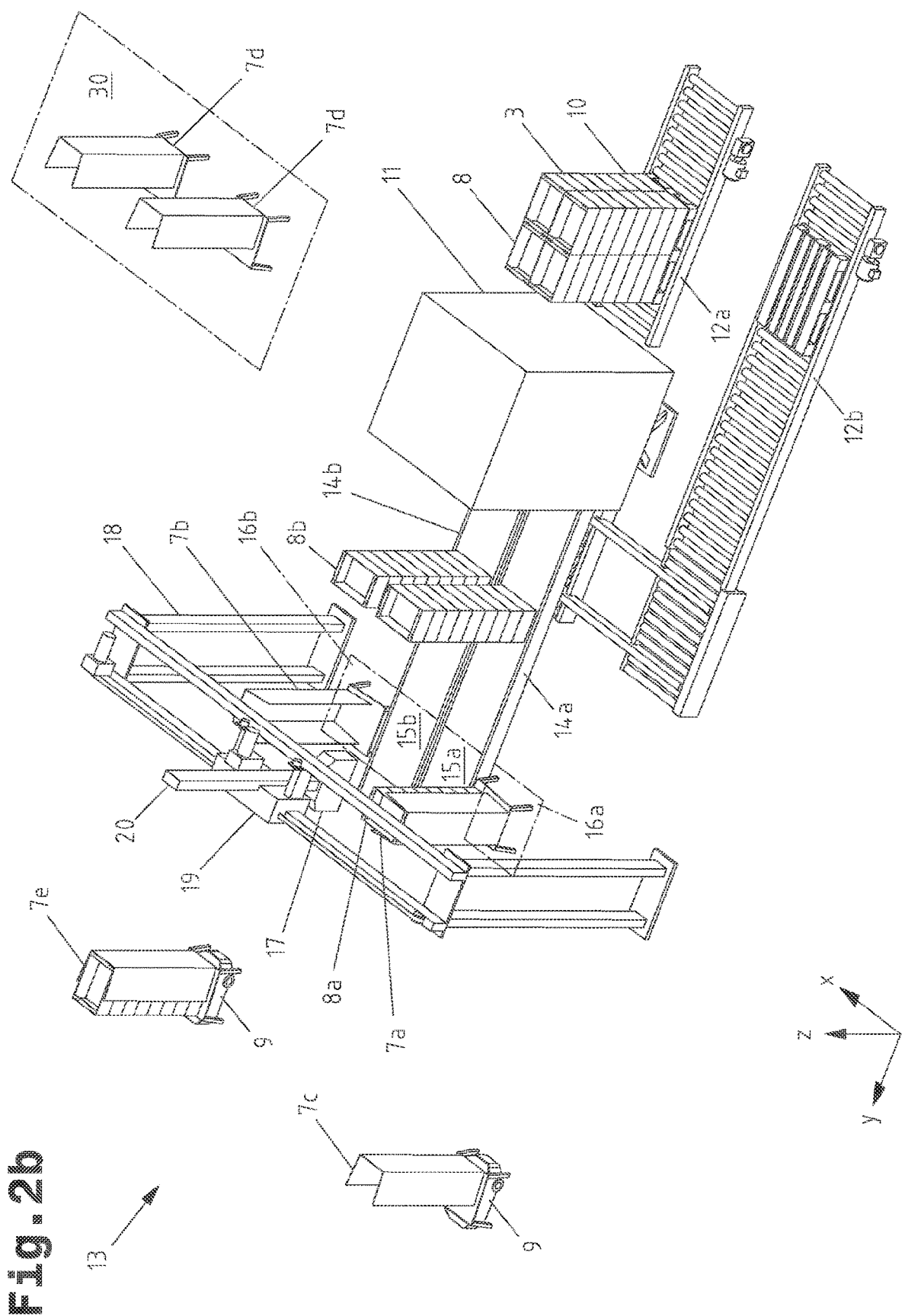

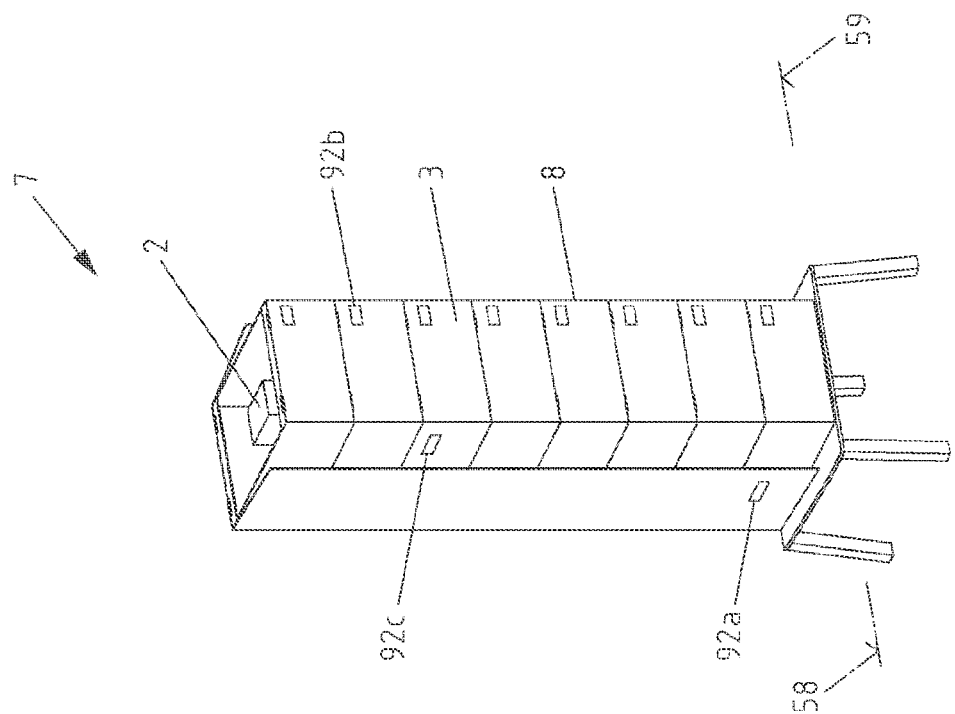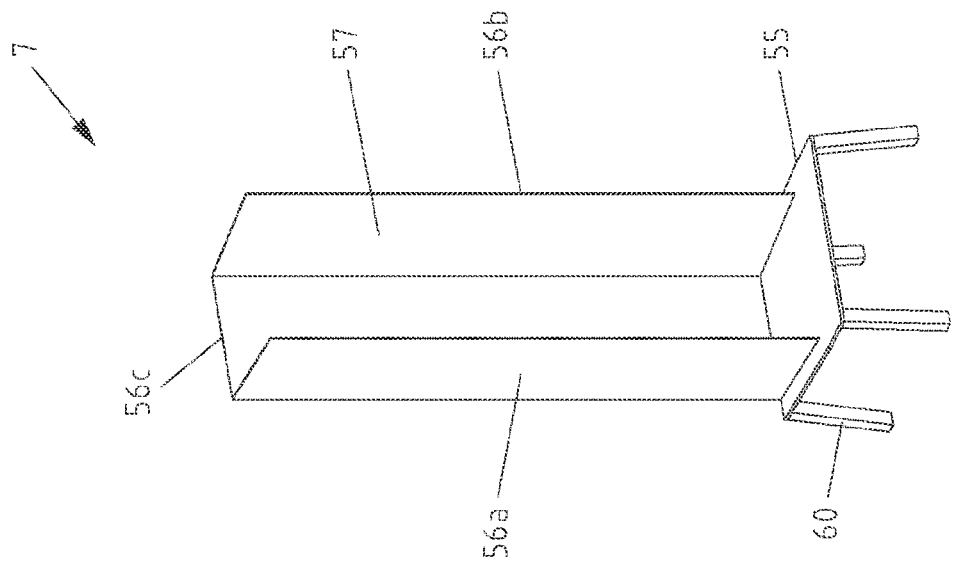

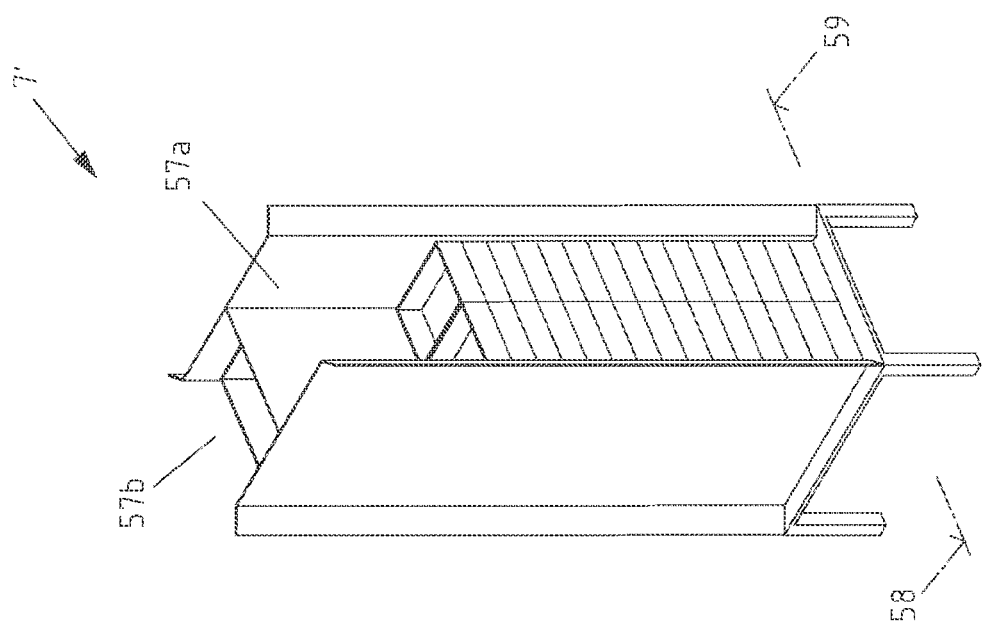
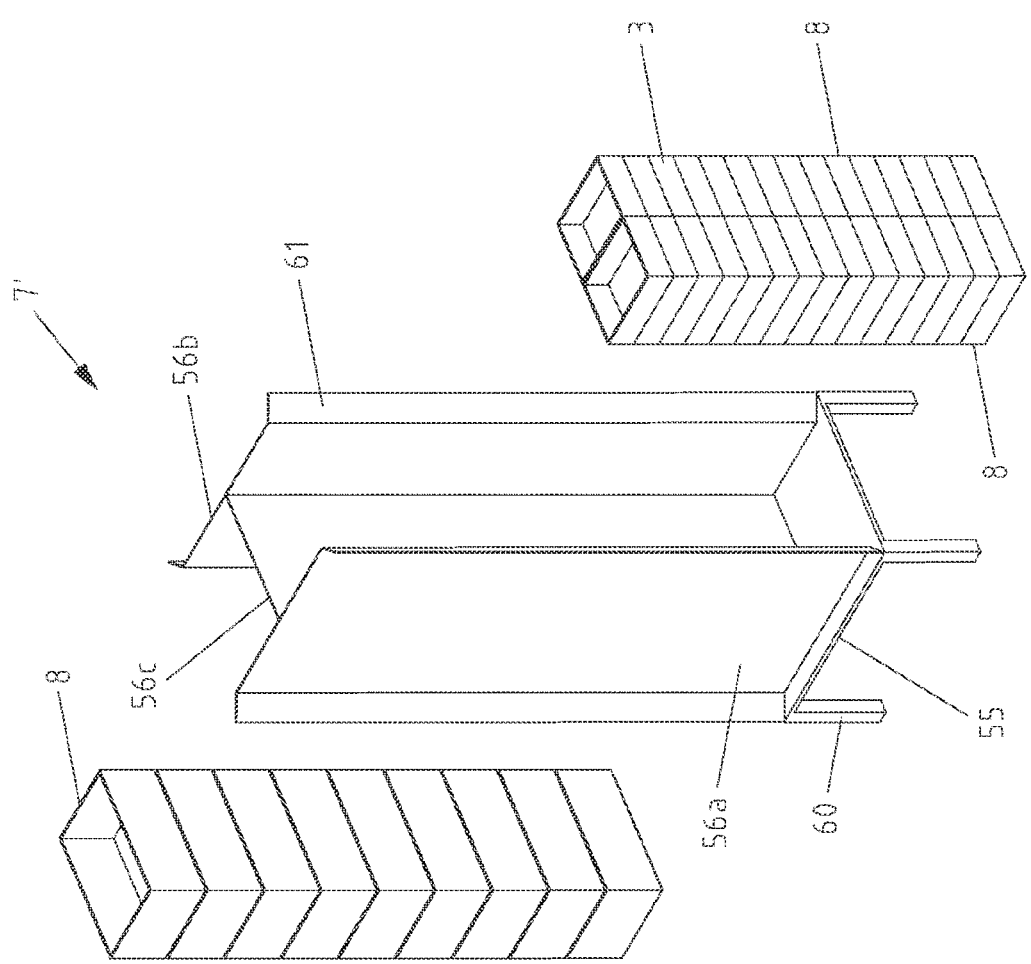
Fig.5b
Fig.5a

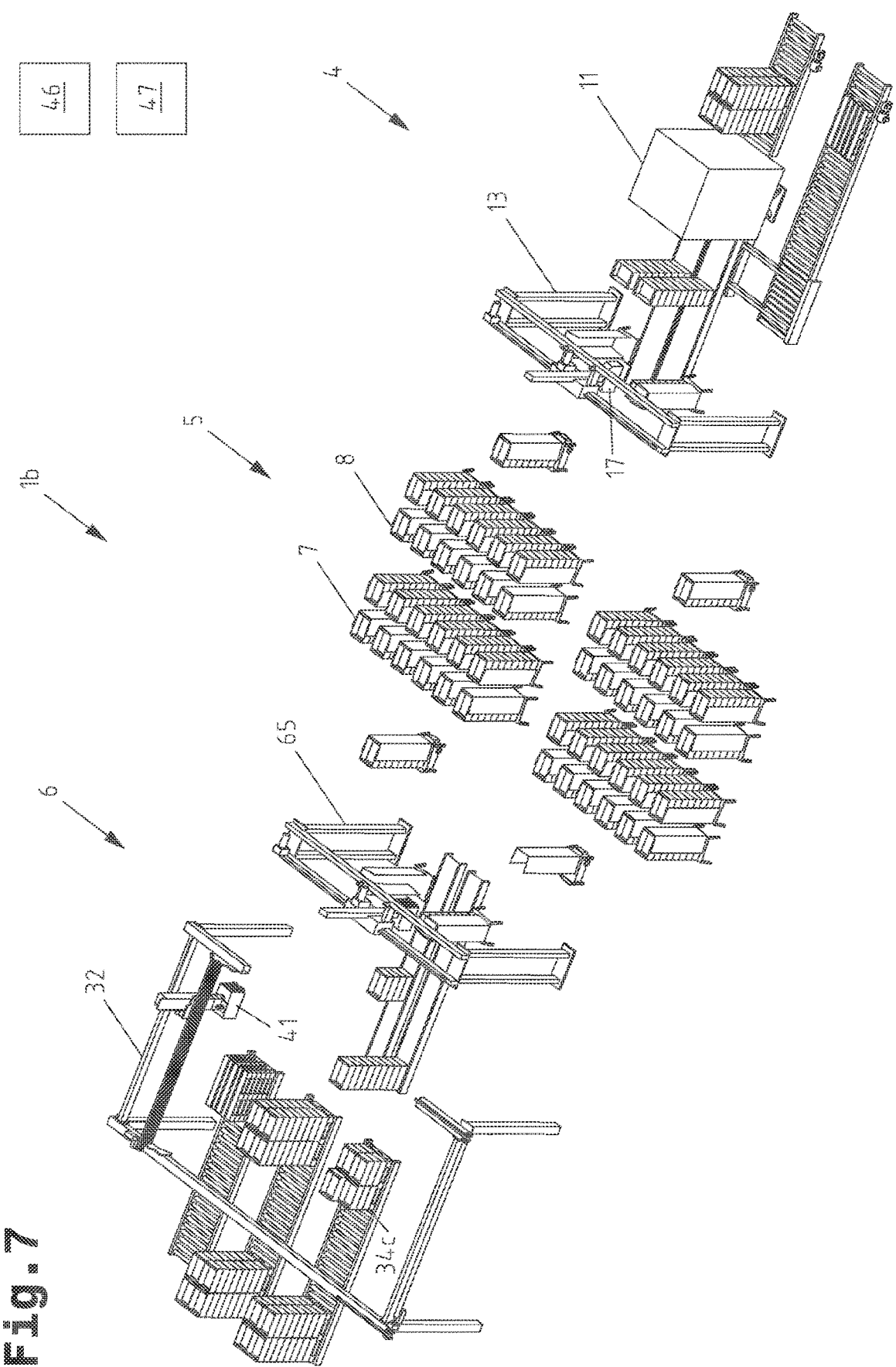

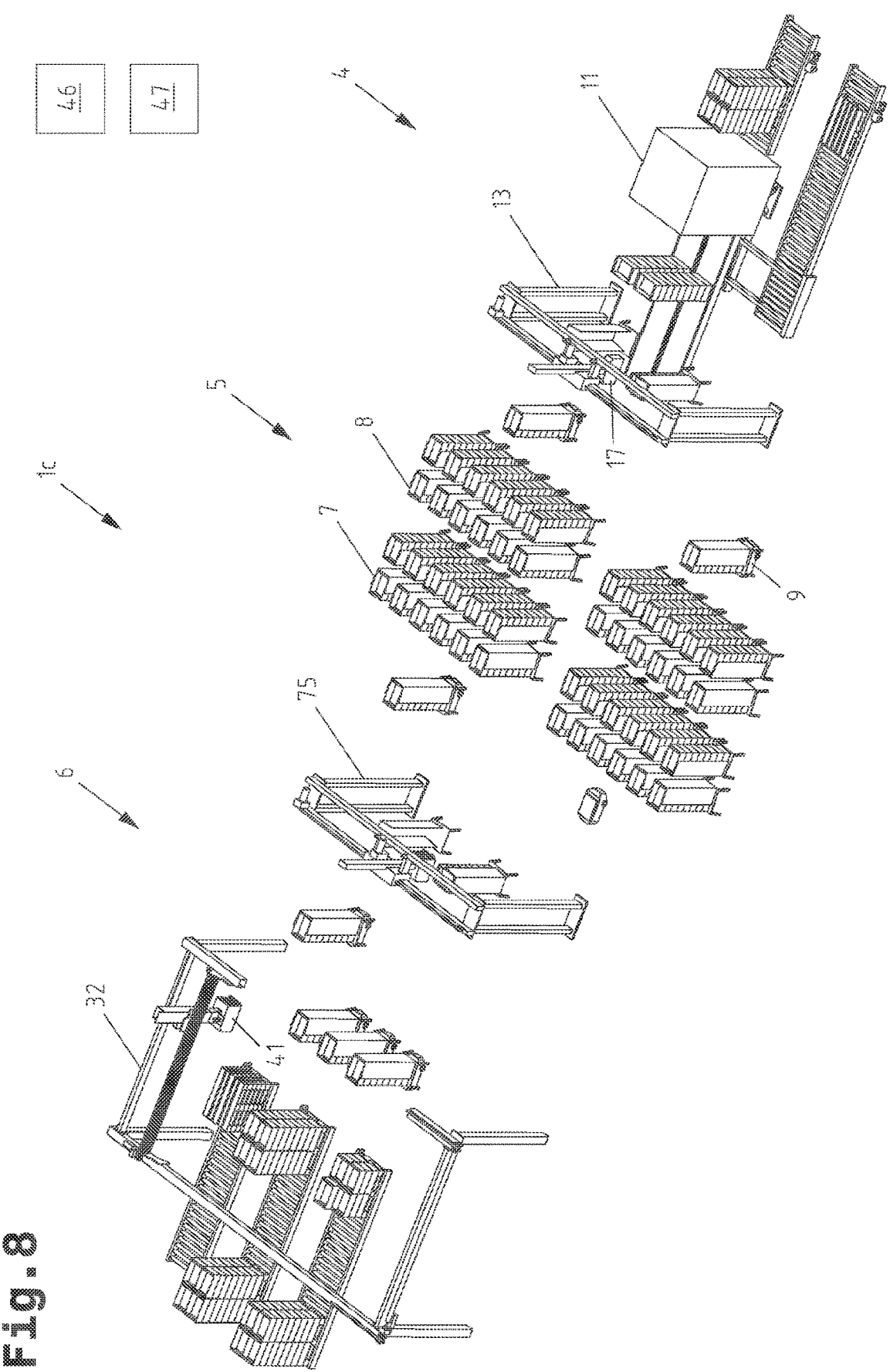

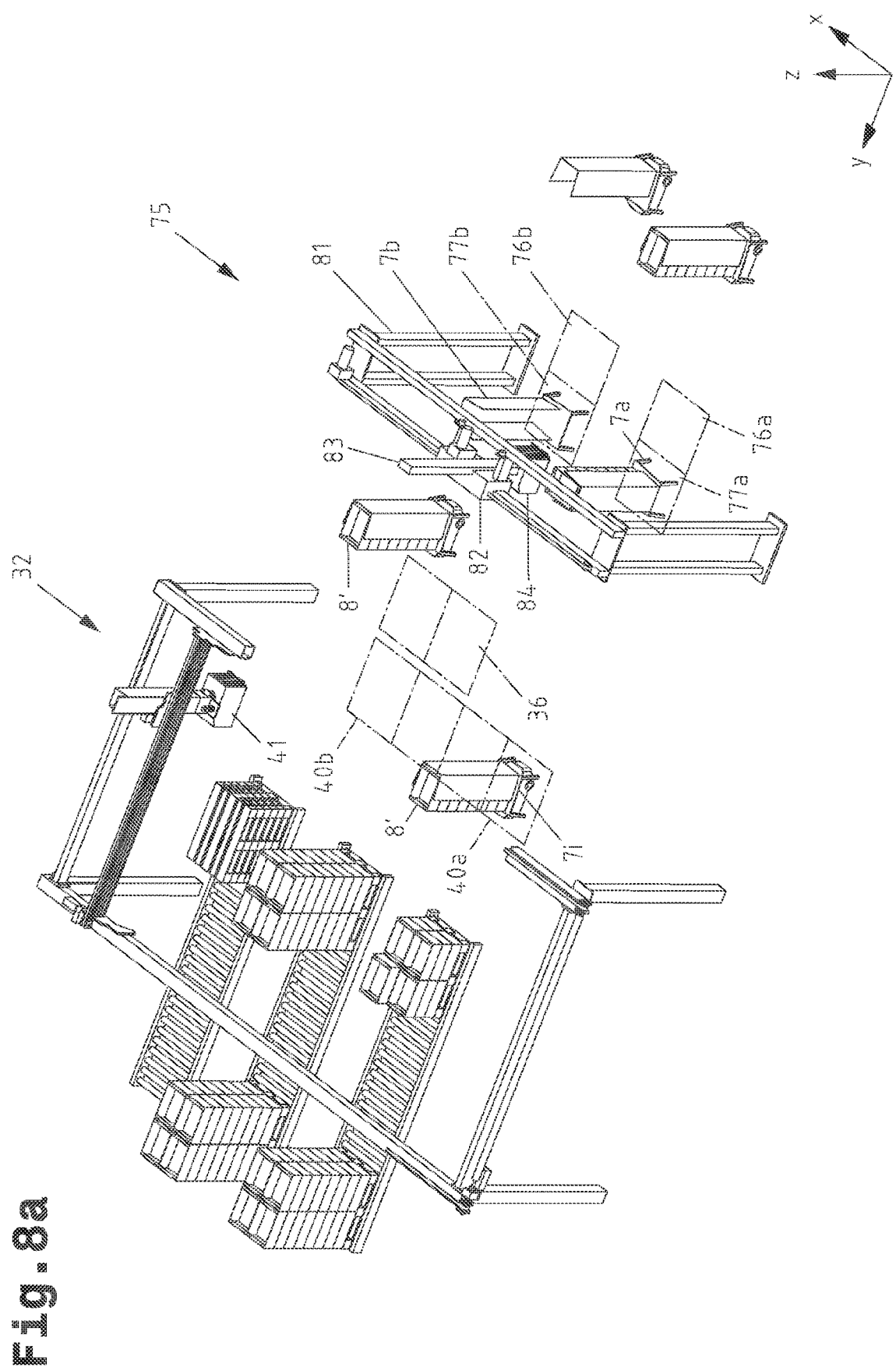

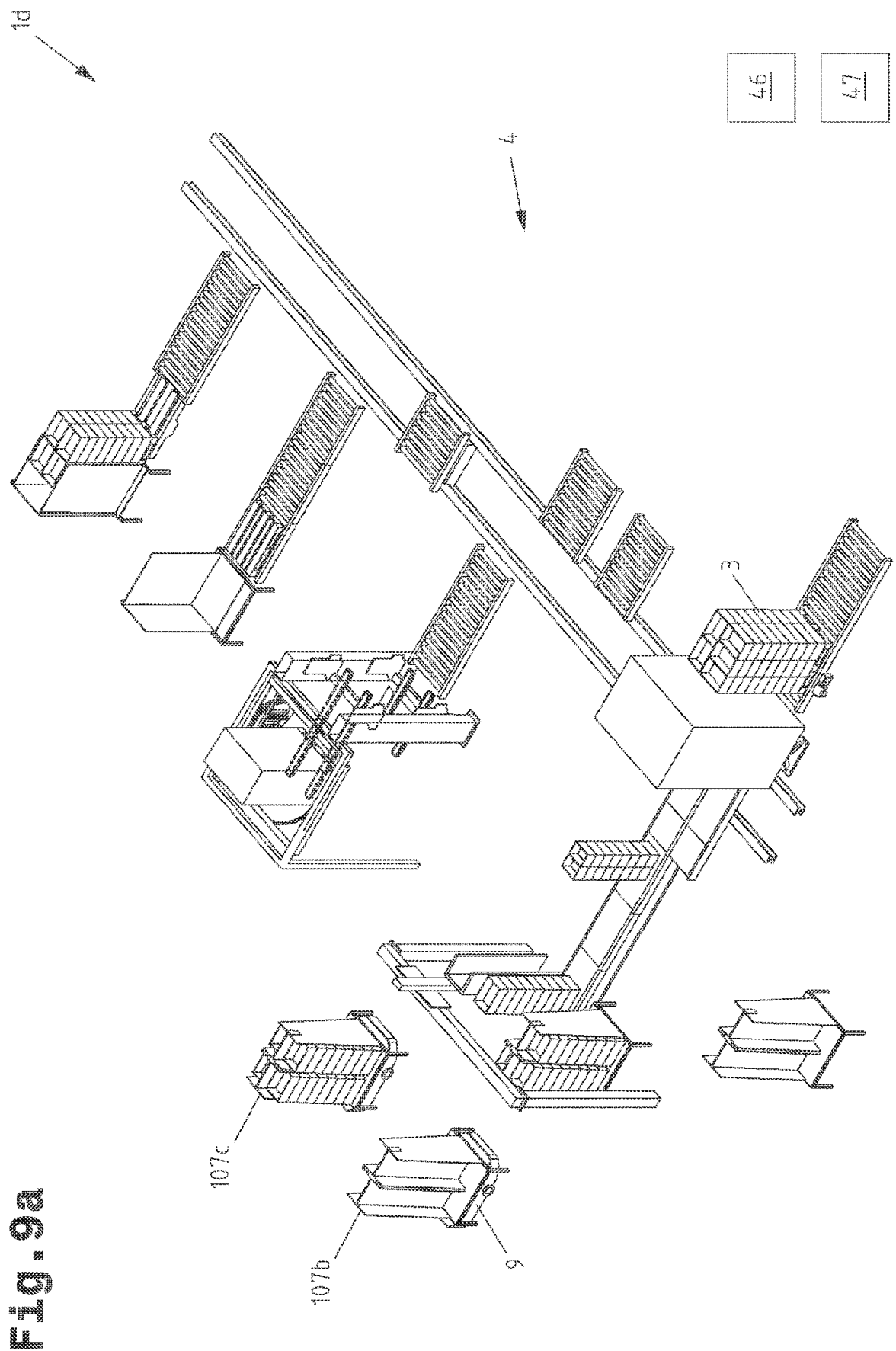

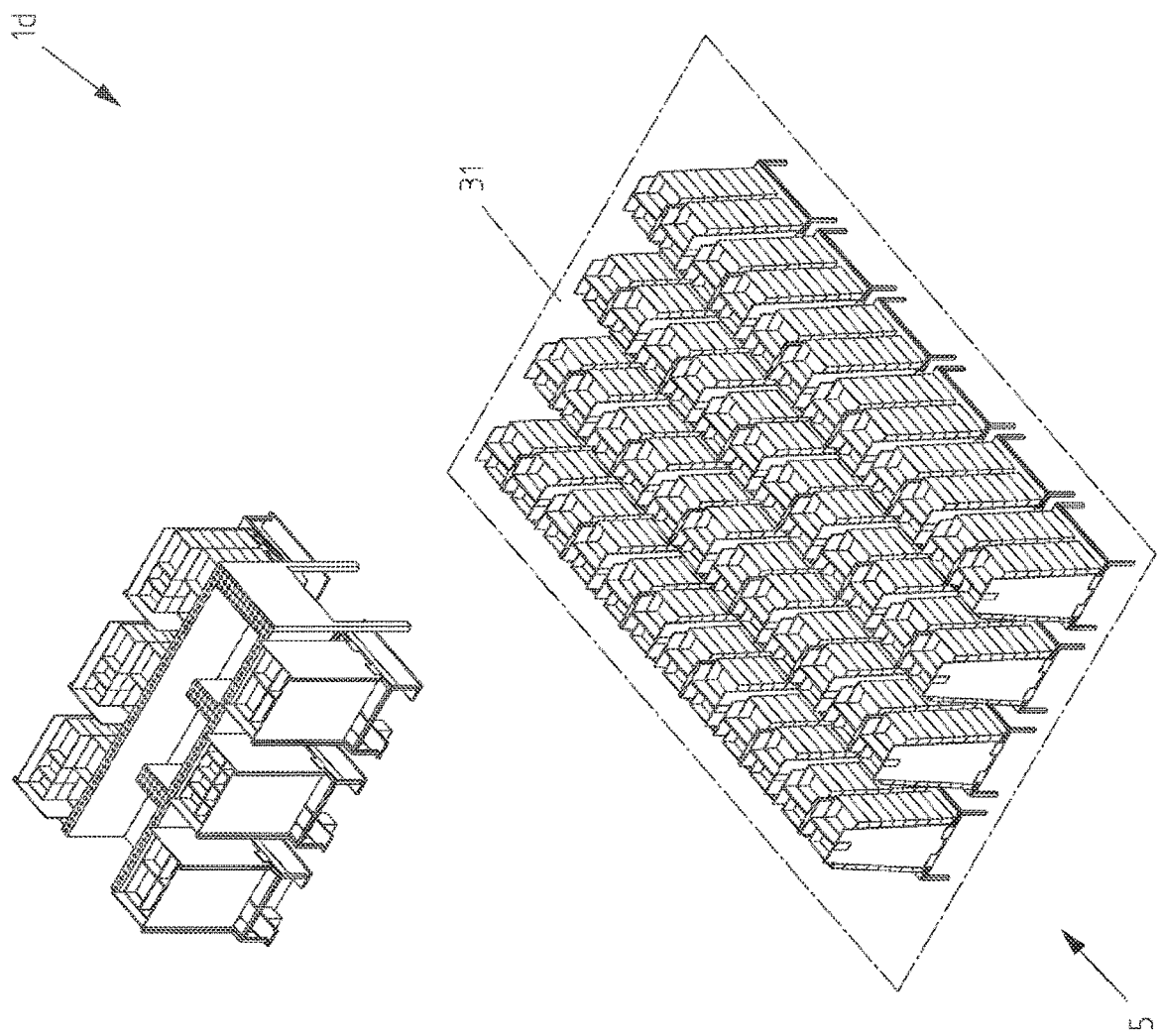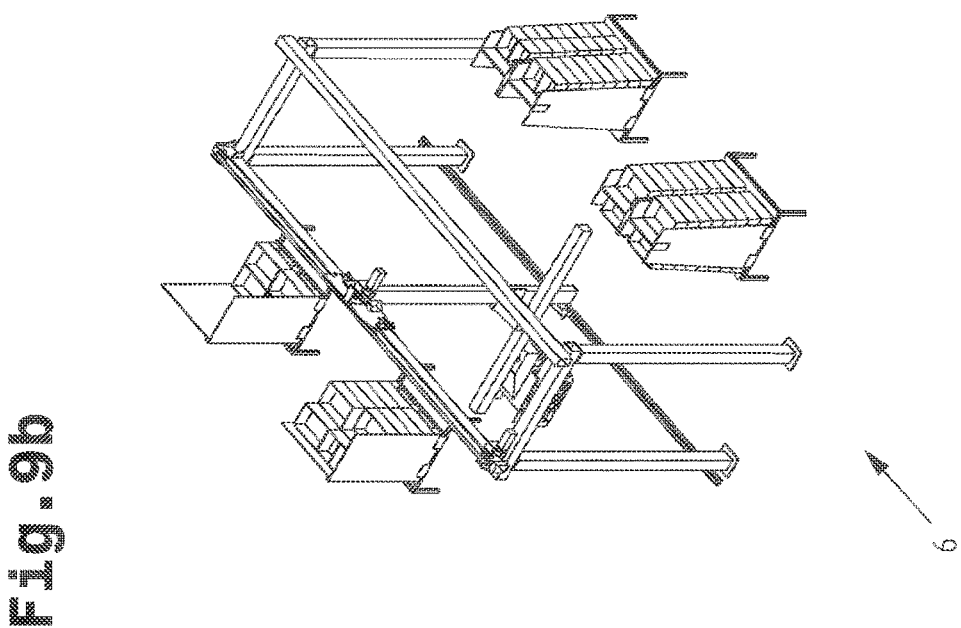
Fig. 9b

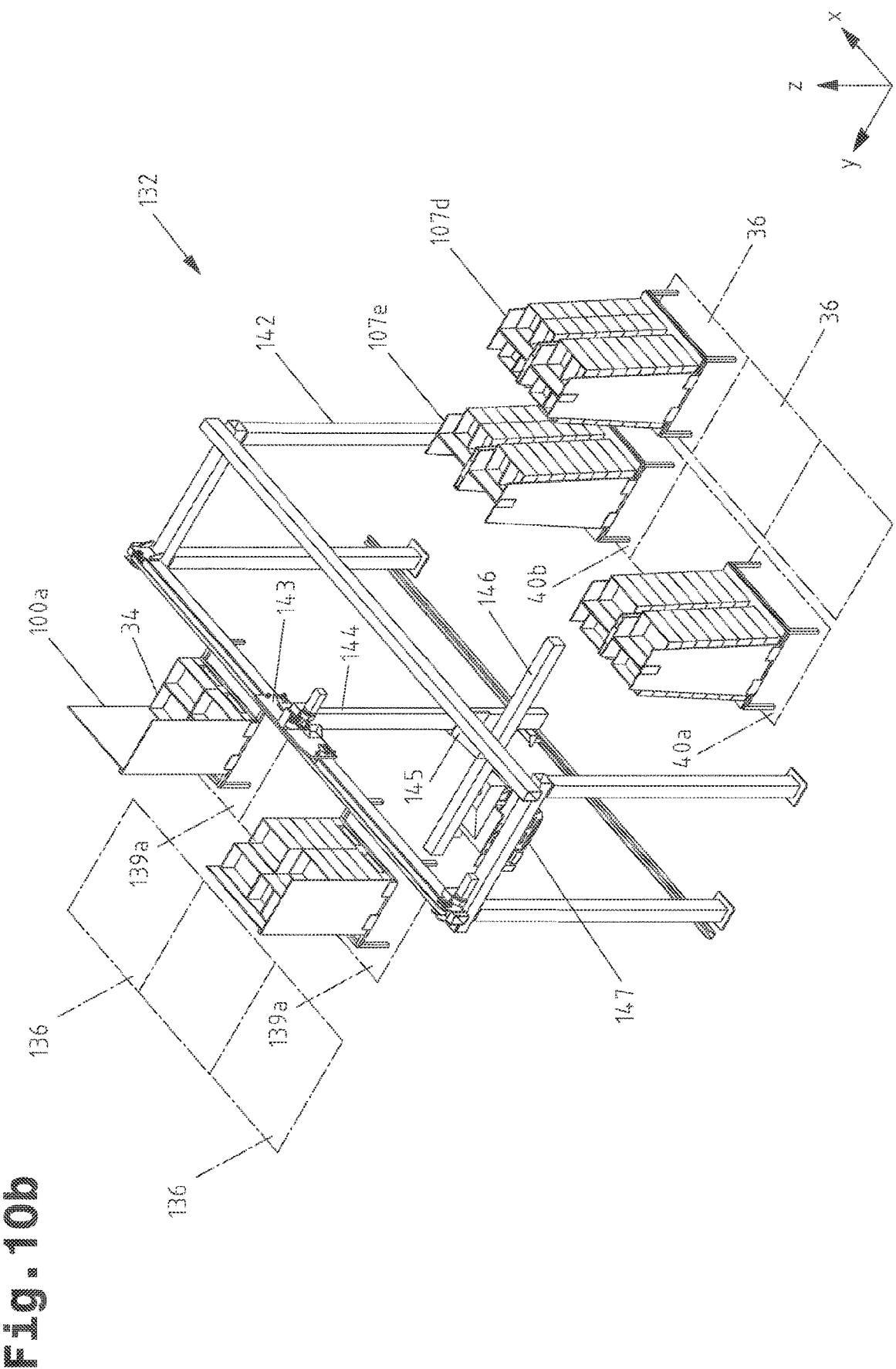

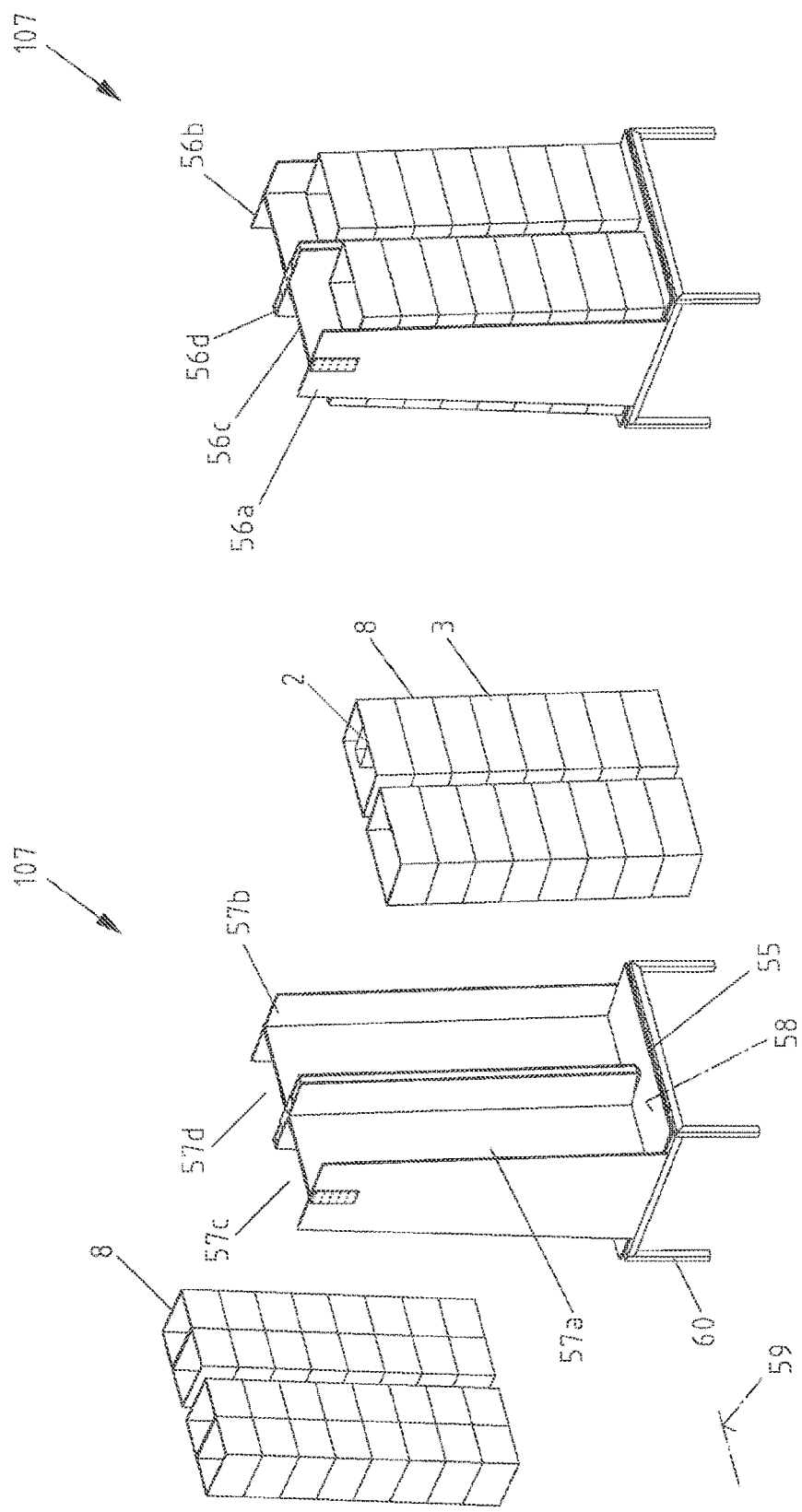

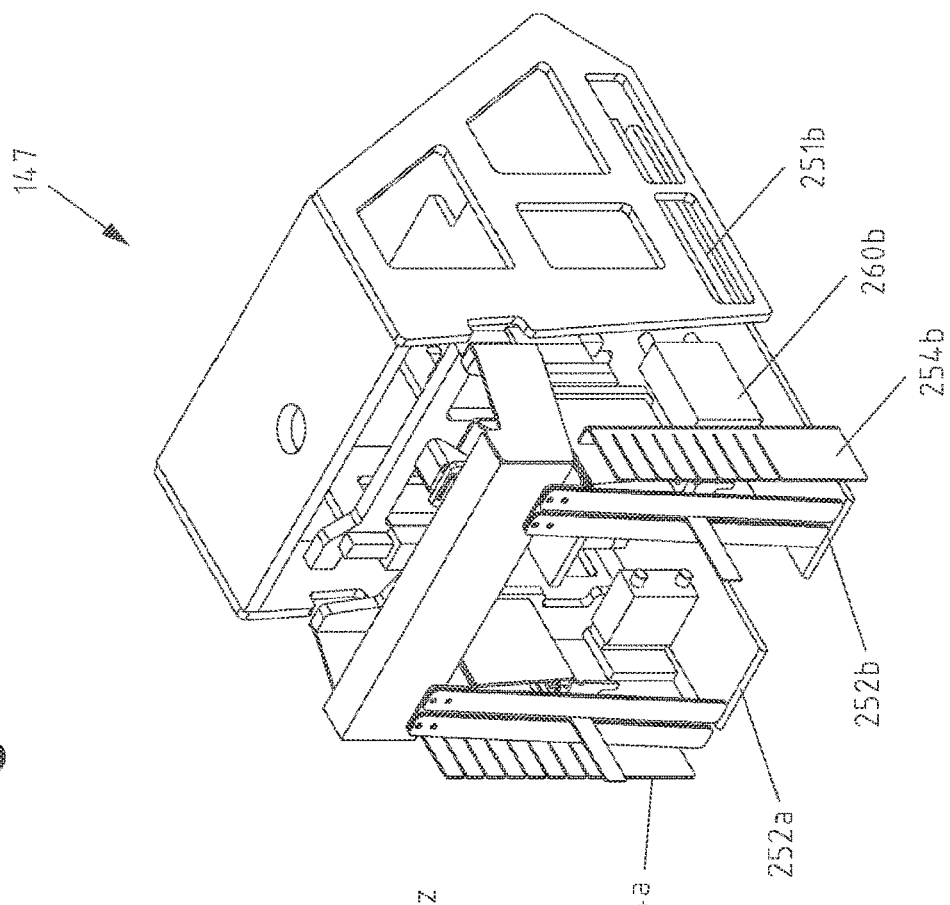
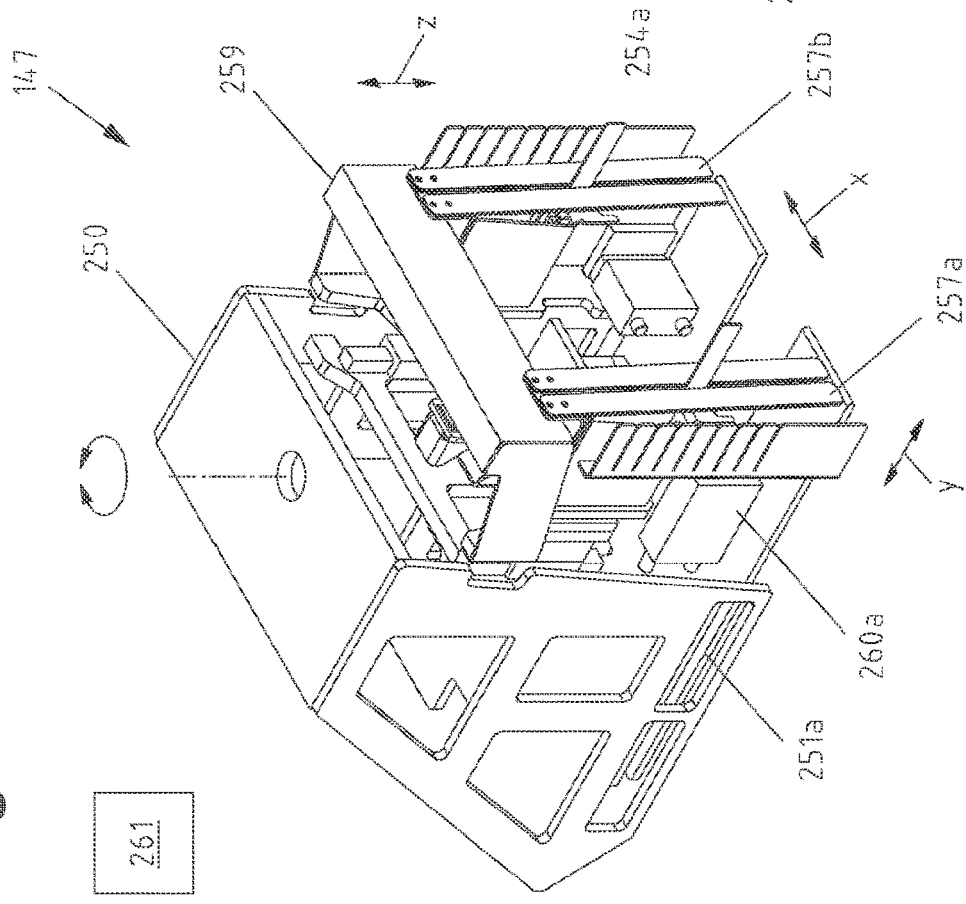

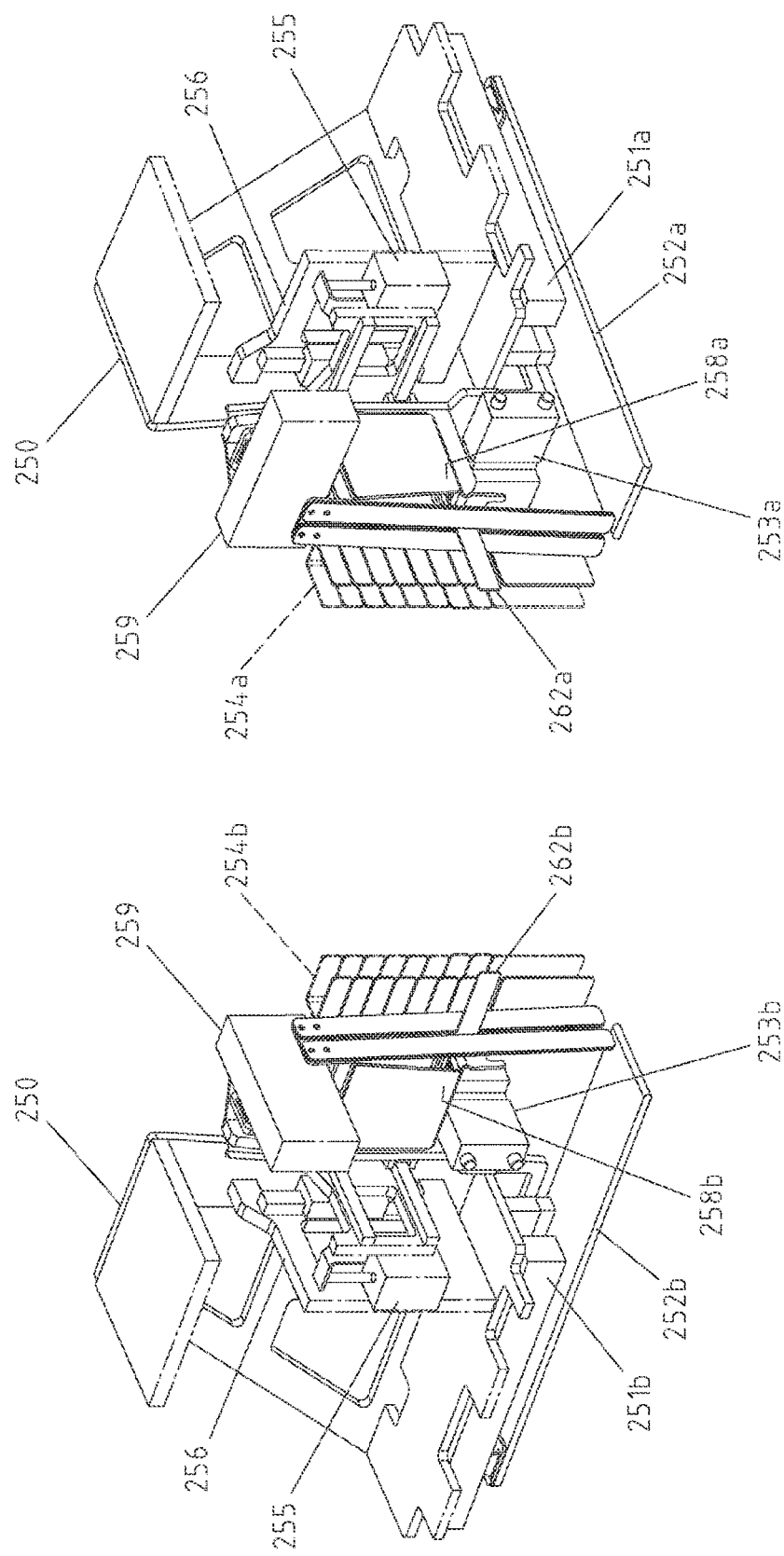

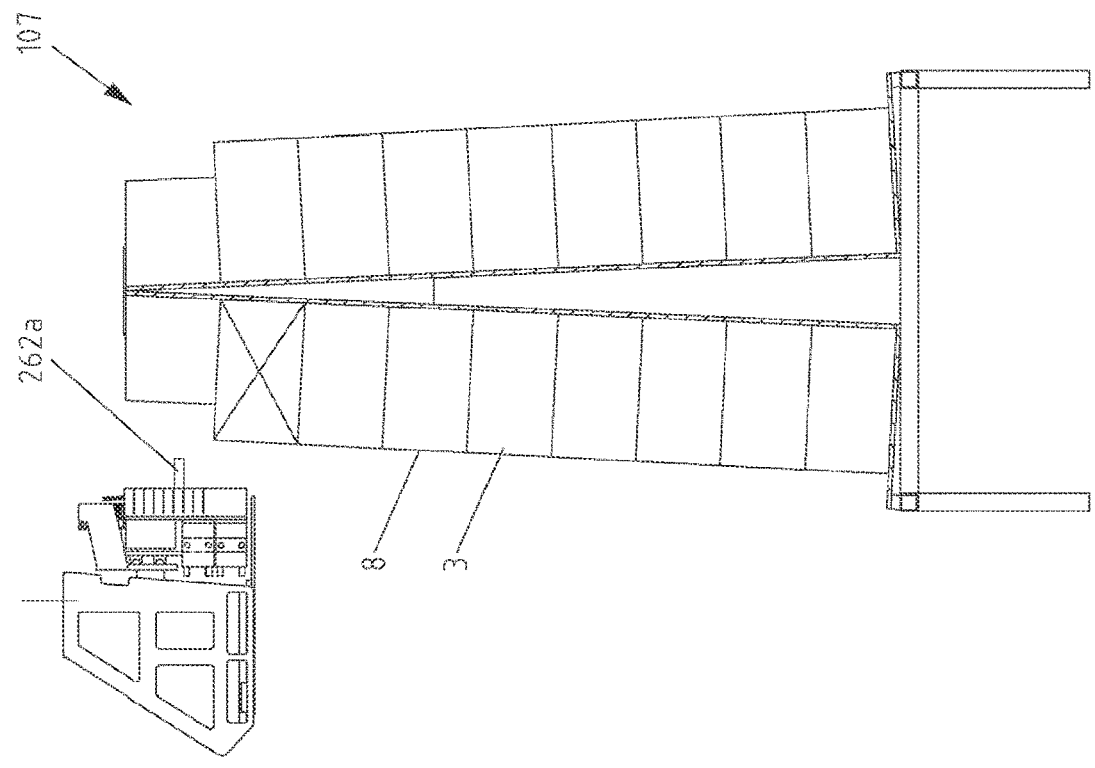
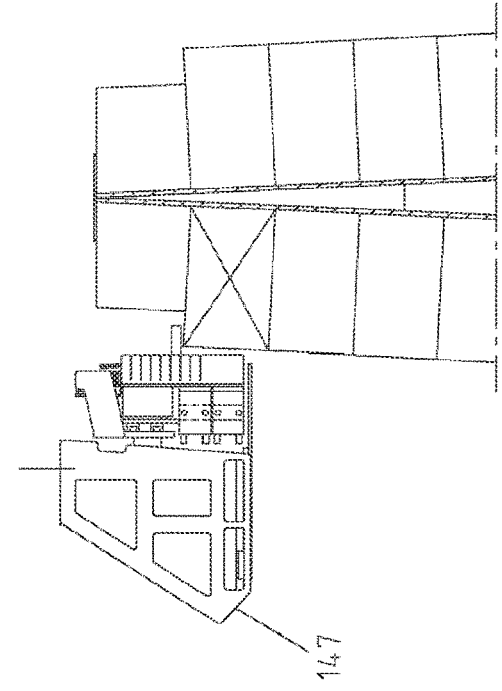
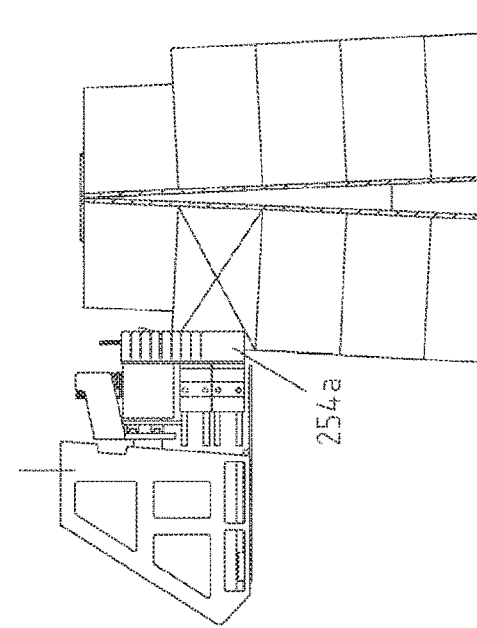

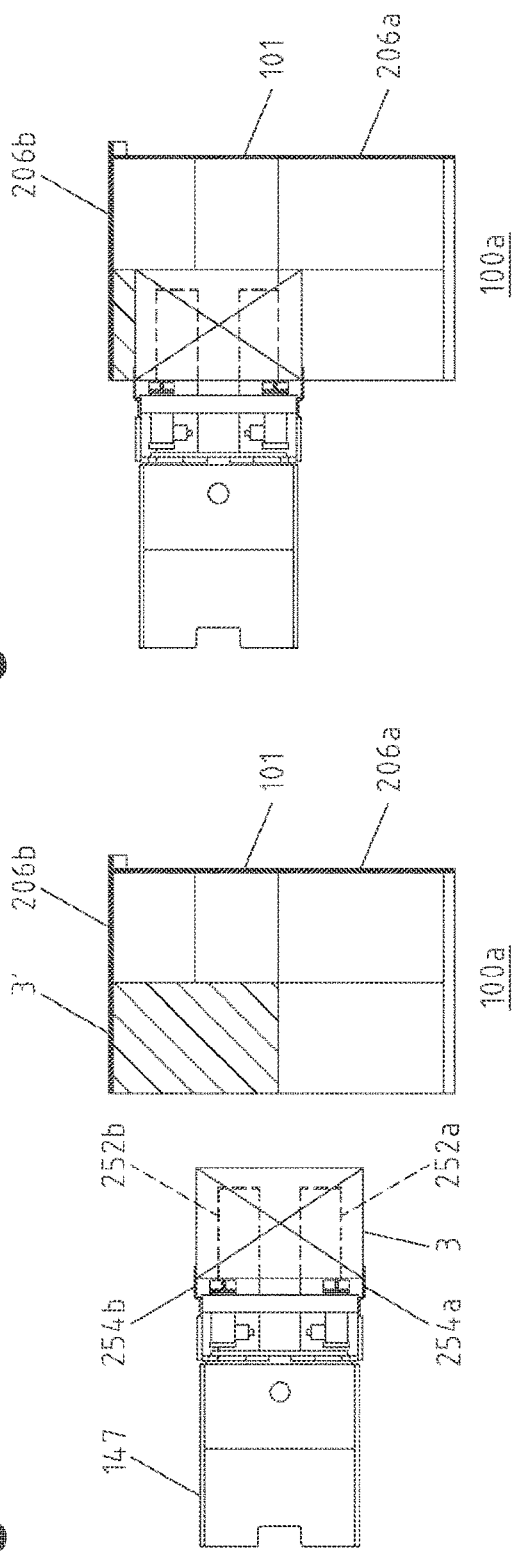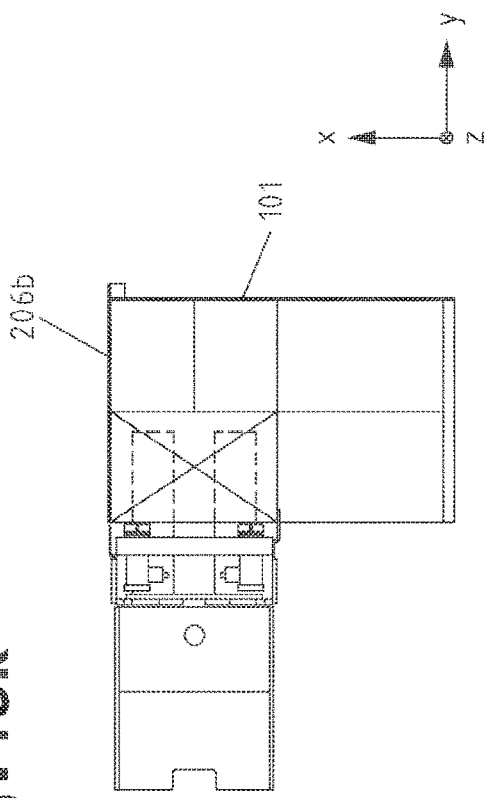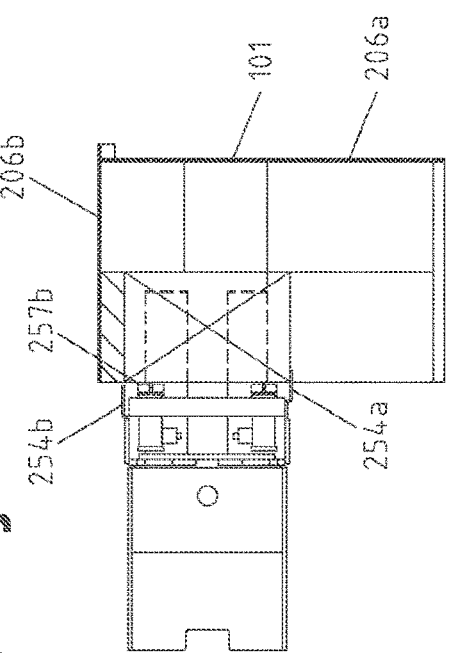

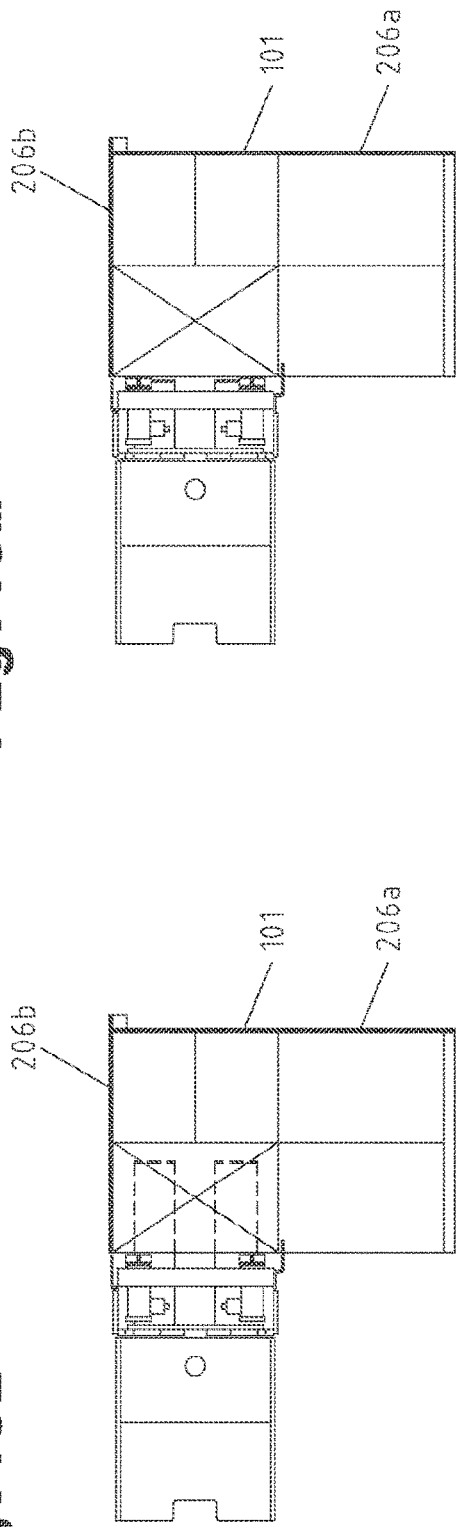
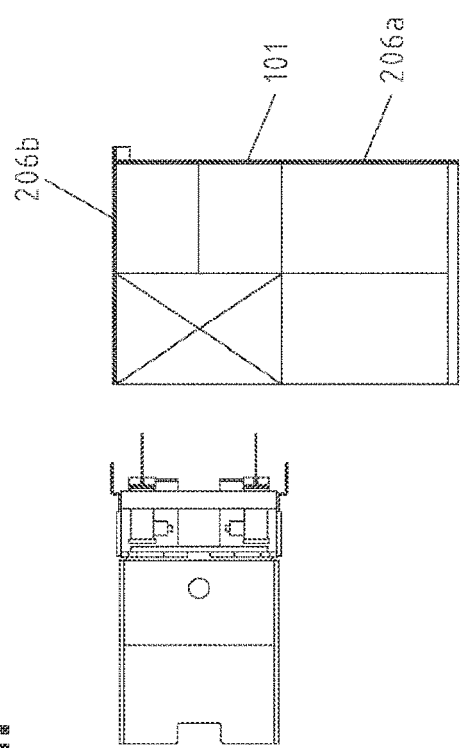
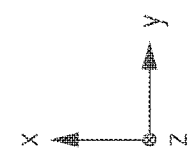

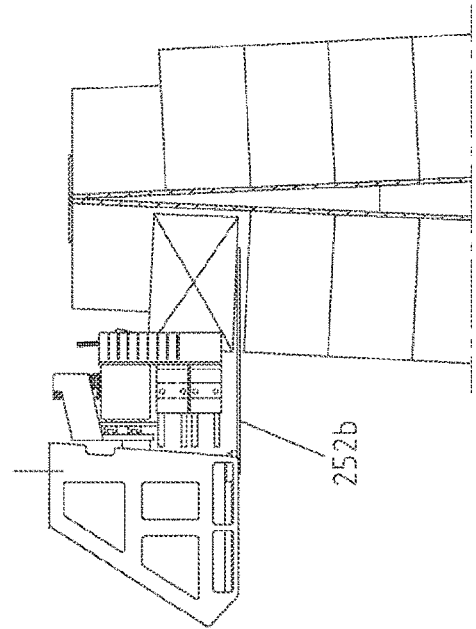
Fig. 16h
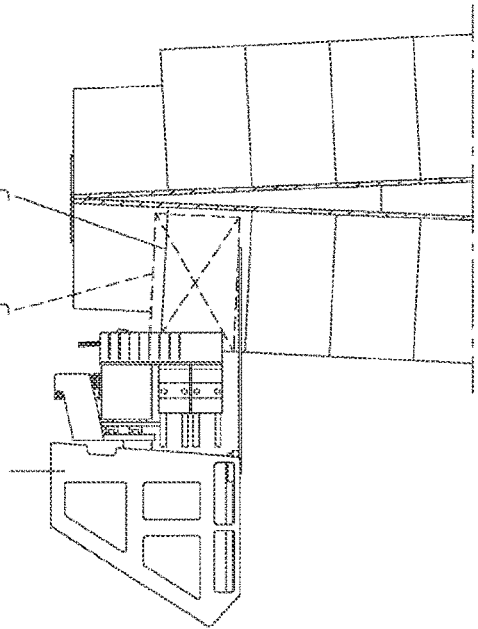
Fig. 16i
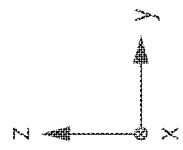
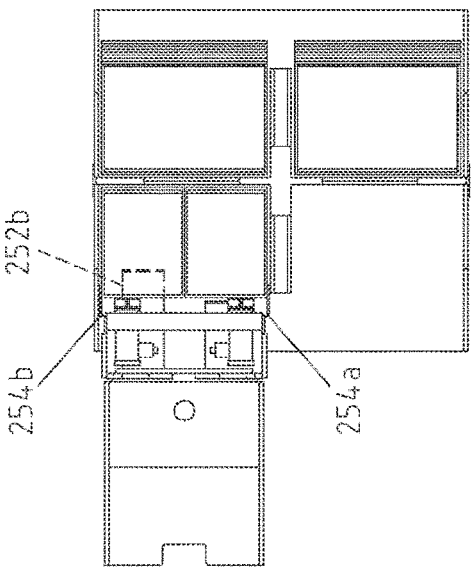
Fig. 16j
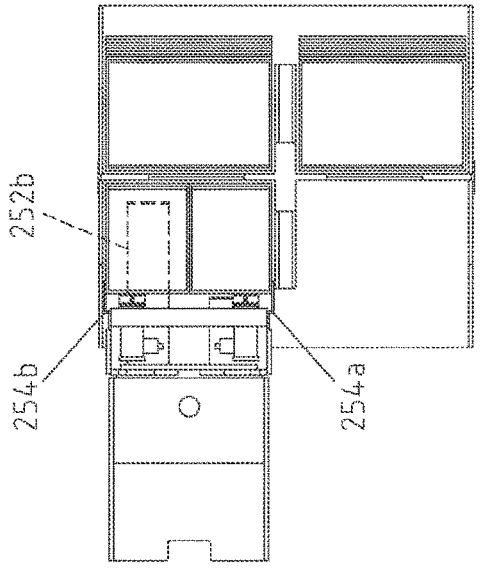
Fig. 16k
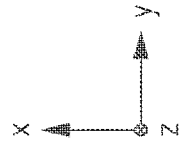

METHOD AND ORDER-PICKING STORAGE FACILITY FOR STORING AND ORDER-PICKING ARTICLES

CROSS REFERENCE TO RELATED APPLICATIONS

This application is the National Stage of PCT/AT2019/060240 filed on Jul. 19, 2019, which claims priority under 35 U.S.C. § 119 of Austrian Application No. A 50632/2018 filed on Jul. 20, 2018, the disclosure of which is incorporated by reference. The international application under PCT article 21(2) was not published in English.

BACKGROUND OF THE INVENTION

1. Field of the Invention

The invention relates to a method and an order fulfillment facility for storing and picking article carriers that contain articles, in particular groceries from the fresh food sector, and are stackable.

2. Description of the Related Art

From the prior art, order fulfillment facilities are known in which outgoing article units with different articles are formed from incoming article units with identical articles (incoming article units with articles of just one type).

The outgoing article units with different articles are for example required in the supply of retail stores and/or branches of food retailers, where articles delivered to a central warehouse in large incoming article units are divided into smaller consumption units and assembled with other articles for distribution.

The articles are stored in article carriers (containers, cartons). The incoming article units comprise article carrier stacks, which are placed on loading aids (pallets, roll containers), of multiple article carriers arranged on top of one another. For example, on a euro pallet (1200 mm×800 mm) four article carrier stacks each with a base area of 600 mm×400 mm or six article carrier stacks each with a base area of 300 mm×400 mm are stacked.

The order fulfillment facility comprises a delivery zone for the incoming article units, a storage zone, an order processing zone and a dispatch zone for the outgoing article units. In the delivery zone, automatically operated depalletizing devices are provided and are configured to separate article carrier stacks from the incoming article units. Subsequently, the article carrier stacks are stored in the storage zone. In the order processing zone, picking orders are processed by the required article carrier stacks being retrieved from the storage zone and being transported to the reloading devices (palletizing devices). At the reloading device, individual article carriers or the entire article carrier stack are loaded onto a target loading aid (pallet, roll container) according to the picking order. The transport between the delivery zone and the storage zone of the article carrier stack to be stored is performed by a storage conveyor system and the transport between the storage zone and the order processing zone of the article carrier stack to be picked is performed by a retrieval conveyor system. Such an order fulfillment facility is described for example in WO 2015/144139 A1. This known order fulfillment facility is predominantly suitable for transporting containers, less for transporting cartons. This is due to the fact that usually it is to be expected that the cartons absorb humidity and lose stability such that a stack of multiple cartons stacked on top of one another is at risk of falling over, in particular where there are acceleration forces. To counteract this, cartons may more or less be manipulated individually only, which strongly minimizes the power of such an order fulfillment facility.

WO 2012/127102 A1 discloses an order fulfillment facility which comprises a delivery zone for the incoming article units, a storage zone and a dispatch zone for the outgoing article units. The incoming article units are provided in the delivery zone and container stacks are separated therefrom. The separated container stacks are transported into the storage zone by a storage conveyor system and are provided at different storage buffer tracks in the storage zone. A gantry robot, which can remove individual containers or partial container stacks from the container stacks and park them on specified storage places on the base, is arranged in the storage zone. At each storage place, there is a stack of multiple containers arranged on top of one another with identical articles. Picking is performed by a gantry robot by individual containers or partial container stacks being removed from the container stacks and being assembled to order-related container stacks (outgoing article units) on free storage places in the storage zone. Subsequently, the order-related container stacks are dispatched onto different retrieval buffer tracks and are transported from the storage zone into the dispatch zone by the retrieval buffer tracks and a retrieval conveyor system. This order fulfillment facility is designed merely for storing and picking containers, not cartons.

Order fulfillment facilities in which mobile storage racks are transported by autonomously moveable, driverless transport vehicles are also known, for example from US 2017/022010 A1 or WO 2018/039423 A1. The storage racks comprise compartment bases, which are arranged in superimposed storage planes, on which articles are placed. Receiving an article carrier stack of multiple article carriers arranged on top of one another in the respective storage rack is not provided.

SUMMARY OF THE INVENTION

It is one object of the invention to provide an improved method for storing and picking article carriers which contain articles and are stackable and a corresponding order fulfillment facility. In particular, largely trouble-free operation and fast article handling should be possible regardless of the article carrier used (containers made of plastic materials or cartons).

The object of the invention is achieved by the following steps:
i) providing autonomously moveable, driverless transport vehicles in the order fulfillment facility, said transport vehicles each having a chassis with a drive unit and a loading platform arranged on the chassis for receiving a mobile transport loading aid,
ii) providing transport loading aids each for receiving and stabilizing the position of at least one article carrier stack of multiple article carriers arranged on top of one another, wherein the transport loading aids comprise mobile, empty (first) transport loading aids, iii) providing article carrier stacks of multiple article carriers arranged on top of one another in a delivery zone of the order fulfillment facility,
iv) transporting empty (first) transport loading aids by the autonomously moveable, driverless transport vehicles to a loading station and providing one or multiple empty (first) transport loading aid(s) either on one or on multiple automatically operated loading device(s) or on a buffer surface close to the loading device(s), v) loading one of the empty (first) transport loading aids, which is provided at the automatically operated loading device, with at least one article carrier stack from the delivery zone using the automatically operated loading device, vi) transporting the (first) transport loading aid loaded with at least one article carrier stack in step v) from the loading station to a storage zone using the autonomously moveable, driverless transport vehicle, vii) placing the (first) transport loading aid loaded with at least one article carrier stack on a storage surface in the storage zone, viii) storing the (first) transport loading aids loaded with at least one article carrier stack or the (first) transport loading aids loaded with individual article carriers in the storage zone, and ix) processing a picking order comprising the steps:

transporting one or multiple (first) transport loading aid(s) containing the article carriers required for a picking order from the storage zone to an unloading station and providing said (first) transport loading aid(s) either at one or at multiple automatically operated unloading device(s) or on a buffer surface close the unloading device(s) using one or multiple autonomously moveable, driverless transport vehicle(s), unloading one or multiple ones of the (first) transport loading aid(s), which is (are) provided at the automatically operated unloading device(s), by removing the article carriers required for processing the mentioned picking order, and assembling the article carriers to one order stack on one target loading aid or to one order stack on each one of multiple target loading aids for the mentioned picking order in an order processing zone.

In this regard, it is advantageous that regardless of which article carrier is used, the article carriers can be stacked directly on top of one another in larger numbers. The article carriers can be made of different materials, for instance containers made of plastic materials or cartons can be used. In the order fulfillment facility, either containers or cartons are picked. However, a combination of containers and cartons is also conceivable. Likewise, the article carrier can have different dimensions. Usually, a base surface of the article carriers is 600 mm×400 mm or 300 mm×400 mm. The transport trips can be performed more efficiently since a higher number of article carriers can be transported per transport trip.

For transporting the empty transport loading aids and transport loading aids loaded with article carrier stacks, autonomously moveable, steerable transport vehicles (of a driverless transport system) are used, which are automatically controlled by a superordinate main computer. Such transport vehicles are known to the person skilled in the art by "automated guided vehicles". Such a transport system comprises the transport vehicles, means for determining the location and detecting the position of the transport vehicles and means for transmitting data to and from the transport vehicles in the transport system. Each transport vehicle comprises a chassis having a drive unit and a loading platform for receiving/discharging/transporting a mobile (non-stationary) transport loading aid arranged on the chassis. Different technologies are known for navigating the transport vehicles. Hence, besides the track-guided, inductive or optical navigation, laser navigation is also used in which each transport vehicle is equipped with a laser scanner that detects stationary reference points in the environment and navigates the transport vehicle on the basis of the detected environmental features. Navigation is also possible using a GPS system, in particular a differential global positioning system (dGPS).

Such a transport system can be integrated into existing order fulfillment facilities without any problems and can be very well adjusted to fluctuating power requirements.

Although, advantageously, the transport vehicles are configured to have the same performance data (travel speed, acceleration values, load suspension and the like), groups of transport vehicles having different performance data can be used as well. This can prove advantageous where different temperature zones are provided in the order fulfillment facility. In this case, the transport vehicles of the first group and of the second group can have different control electronics or wheels with different material properties.

The provision of article carrier stacks comprises the provision of article carrier stacks containing articles of just one type. However, the provision can also solely comprise the provision of article carrier stacks containing articles of just one type. An article carrier stack containing articles of just one type consists of multiple article carriers with equal articles stacked on top of one another. Although this is rather an exception, the provision can also comprise the provision of mixed article carrier stacks. A mixed article carrier stack consists of multiple article carriers with different articles stacked on top of one another. In this regard, the lower article carriers in the article carrier stack can contain a first article and the upper article carriers can contain a second article.

To ensure a sufficient transport safety of high article carrier stacks and also during dynamic travel movements of the transport vehicles, transport loading aids are used. The transport loading aid can accommodate one or multiple article carrier stack(s) between side walls on a base and can delimit these against lateral displacement during the transport by a transport vehicle. Only by the use of transport loading aids, article carriers of bad quality, for example due to moisture absorption, damage and the like, can be transported as article carrier stacks on the one hand between a delivery zone and a storage zone and on the other hand between a storage zone and an order processing zone.

In one of the method steps, it is provided that empty (first) transport loading aids are transported to a loading station by the autonomously moveable, driverless transport vehicles and, there, are provided either at one or multiple automatically operated loading device(s) or on a buffer surface close to the loading device(s). The buffer surface is formed on a base.

The (first) transport loading aids are transported from the unloading station back to the loading station after removing of the last article carrier/article carrier stack and, there, the empty (first) transport loading aids are provided either at an automatically operated loading device or on the buffer surface. However, in principle, a supplier can also deliver empty (first) transport loading aids, which are taken over in the delivery zone and transported to the loading station.

It is also possible that the transport loading aids comprise mobile loaded (third) transport loading aids, which are taken over in the delivery zone and transported directly to the storage zone or order processing zone, bypassing the loading station, and are placed there. The (third) transport loading aids can be supplied by a supplier.

Loading an empty (first) transport loading aid with article carriers can be performed according to different loading methods. Hence, according to a first loading method, an (entire) article carrier stack of multiple article carriers arranged on top of one another can be transferred onto the first (empty) transport loading aid using the loading device.

The article carrier stack is transferred from the loading device onto the empty (first) transport loading aid "unamendedly"; however, individual article carriers of the article carrier stack are not manipulated. In this context, "unamended" means that no additional picking order is performed in the loading station, thus a first article carrier with a first article and a second article carrier with a second article are assembled to a picked article carrier stack. This proves advantageous in several aspects:

- Firstly, this proves advantageous for article carriers of carton, since the stacking lugs and the stacking recesses that are usually present in the area of the container walls remain engaged for mutual positional fixing of the article carriers arranged on top of one another, and damage to the stacking lugs and stacking recesses caused by repeated lifting and placing of article carriers is avoided.
- Secondly, this proves advantageous where the article carriers are made of a plastic material, since the stacking edges that are usually present in the area of the container walls remain engaged for mutual positional fixing of the article carriers arranged on top of one another, and wear to the stacking edges caused by repeated lifting and placing of article carriers is avoided.
- Thirdly, the loading device can be structured particularly simply, for example it comprises a stationary holding surface and a pushing device (pusher) by means of which the article carrier stack is pushed from the holding surface onto the empty (first) transport loading aid (without lifting).
- Fourthly, loading can be performed very quickly, which is of significant advantage in particular where rather less different articles and a high amount of articles are picked, as can be the case for example in the food sector. In this regard, the articles are supplied by different suppliers and in large amounts within a limited period of time. However, the articles must be transported into the storage zone and subsequently picked within a very short time. After the article carrier stacks are transported from the delivery zone to the loading station "unamendedly" and are transferred onto the empty (first) transport loading aids at one or multiple loading devices, no delays in processing the supplied articles occur.

Hence, according to a second loading method, a "pre-picked" article carrier stack of multiple article carriers arranged on top of one another can be transferred onto the first (empty) transport loading aid using the loading device. In this context, "pre-picked" means that an additional picking order is performed in the loading station, thus a first article carrier with a first article and a second article carrier with a second article are assembled to a picked article carrier stack. The picking operation can comprise assembling articles to article groups. An article group is the assembling of individual articles and/or article carriers to a group based on a common property. The common property can for example be a storage temperature.

After loading, the (first) transport loading aid is transported from the loading station in the delivery zone to the storage zone using one of the transport vehicles and is placed on a free storage place there. The transport vehicle comprises a loading platform, by means of which the (first) transport loading aid can be taken over on the transport vehicle and by means of which the (first) transport loading aid can be discharged from the transport vehicle and supported on the transport vehicle during the travel movement. For this purpose, the loading platform can for example be designed such that it can be lifted and lowered in relation to the chassis.

The (first) transport loading aids can be placed on storage places in the storage zone. The storage places are preferably formed on a base in the storage zone on a storage surface. In the storage zone, there are (first) transport loading aids which are still loaded with at least one article carrier, a partial stack of an article carrier stack or a complete article carrier stack. While some of the partially unloaded (first) transport loading aids are transported from the order processing zone back into the storage zone after unloading, the completely loaded (first) transport loading aid are transported from the delivery zone directly into the storage zone.

The storage zone is connected, in respect of a conveying stream, to the loading station in the delivery zone via some of the transport vehicles of the transport system and to the unloading station in the order processing zone via some of the transport vehicles of the transport system. The unloading station in the order processing zone can additionally be connected, in respect of a conveying stream, to the loading station in the delivery zone via some of the transport vehicles. In a particular embodiment of the order fulfillment facility (FIG. 8), the unloading station and the reloading station in the order processing zone can be connected, in respect of a conveying stream, to the loading station in the delivery zone and/or the storage zone via some of the transport vehicles.

Lastly, for processing one of multiple picking orders (which are electronically detected in an order-processing computer), at least one (first) transport loading aid containing the required (equal) articles/article carriers is transported from the storage zone to the unloading station using one of the transport vehicles. Where different articles/article carriers are required, the (first) transport loading aids containing these articles/article carriers are transported from the storage zone to the unloading station using multiple transport vehicles. The unloading station comprises one or multiple automatically operated unloading devices, by means of which unloading of one or multiple ones of the (first) target loading aid(s) is performed automatically by removing the article carriers required for processing the mentioned picking order and assembling the article carriers on one or multiple target loading aids, thus without any manual processing steps. In other words, according to this embodiment the unloading station forms a fully automatic unloading station.

For example, a picking order comprises article carriers of a first article 24, article carriers of a second article 18, article carriers of a third article 3 and article carriers of a fourth article 3. The first article is contained in 4 article carrier stacks of 6 article carriers each. The second article is contained in 3 article carrier stacks of 6 article carriers each. The third article is contained in an article carrier stack of 6 article carriers. The fourth article is contained in an article carrier stack of 6 article carriers.

The (first) transport loading aid can accommodate an article carrier stack of preferably up to twenty (low) article carriers arranged on top of one another.

In the described exemplary embodiment, the (first) transport loading aid can accommodate an article carrier stack of up to six (high) article carriers arranged on top of one another. A first transport vehicle transports a (first) transport loading aid with a first article(s) carrier stack containing the first article(s) from the storage zone to the unloading station, a second transport vehicle transports a (first) transport loading aid with a second article carrier stack containing the first article(s) from the storage zone to the unloading station, a third transport vehicle transports a (first) transport loading aid with a third article carrier stack containing the first article(s) from the storage zone to the unloading station and a fourth transport vehicle transports a (first) transport loading aid with a fourth article carrier stack containing the first article(s) from the storage zone to the unloading station.

The (first) transport loading aids are provided at a single unloading device one after the other or at least two of the (first) transport loading aid are provided at one single unloading device next to one another or at least two of the (first) transport loading aids are in each case provided to multiple unloading devices next to one another.

If a previous picking order is still processed at the unloading device(s), the (first) transport loading aid(s) can be first placed on a buffer surface close to the unloading device(s) by the transport vehicle(s). As soon as the unloading device has unloaded a (first) transport loading aid of the previous picking order and the empty (first) transport loading aid has been transported away from said unloading device, a (first) transport loading aid of the present picking order can be transported from the buffer surface to the unloading device using a transport vehicle and can be provided there.

Then, the (first) transport loading aid, which is (are) provided at the automatically operated unloading device(s), is unloaded by the unloading device by removing the article carriers required for processing a picking order.

Unloading one or multiple ones of the (first) transport loading aid(s) can comprise removing an individual article carrier. If the article carrier is located in an article carrier stack, the uppermost article carrier in the stack is removed. Unloading one or multiple ones of the (first) transport loading aid(s) can comprise removing a partial article carrier stack of at least two article carriers arranged on top of one another. If the article carrier is located in an article carrier stack, the uppermost article carriers in the stack are removed as a partial stack. Unloading one or multiple ones of the (first) transport loading aid(s) can comprise removing an entire article carrier stack of all article carriers arranged on top of one another.

According to the last embodiment, the article carrier stack is unloaded from the (first) transport loading aid by the unloading device "unamendedly", but individual article carriers of the article carrier stack are not manipulated. This proves advantageous in several aspects:

Firstly, this proves advantageous for article carriers of carton, since the stacking lugs and the stacking recesses that are usually present in the area of the container walls remain engaged for mutual positional fixing of the article carriers arranged on top of one another, and damage to the stacking lugs and stacking recesses caused by repeated lifting and placing of article carriers is avoided.

Secondly, this proves advantageous where the article carriers are made of a plastic material, since the stacking edges that are usually present in the area of the container walls remain engaged for mutual positional fixing of the article carriers arranged on top of one another, and wear to the stacking edges caused by repeated lifting and placing of article carriers is avoided.

Thirdly, the unloading device can be structured particularly simply, for example it comprises a holding surface and a pushing device (pusher) by means of which the article carrier stack is pushed from the (first) transport loading aid onto the holding surface (without lifting).

Fourthly, unloading can be performed very quickly, which is of significant advantage in particular where rather less different articles and a high amount of articles are picked, as can be the case for example in the food sector.

After or while unloading the (first) transport loading aid(s), the article carriers are assembled on one or multiple target loading aids for the mentioned picking order.

Unloading the (first) transport loading aids can also be performed in a sequence determined by the control system. The article carriers/article carrier stacks are provided at the unloading station in this sequence (FIG. 1) or at the reloading station in this sequence (FIG. 7) and are transferred onto the target loading aid in this sequence. On the other hand, a sequence in the provision of the (first) transport loading aid(s) at the unloading station (FIG. 1) or the provision of the (second) transport loading aid(s) at the reloading station (FIG. 8) can also be established via the transport vehicles.

According to the above example, the (unamended) four article carrier stacks are assembled on a first target loading aid, i.e. the 24 article carries with the first article. On a second target loading aid, the (unamended) three article carrier stacks are assembled, i.e. the 18 article carriers with the second article(s), and a mixed article carrier stack is assembled, i.e., 3 article carriers with the third article(s) and 3 article carriers with the fourth article(s) in an article carrier stack.

As this example shows, either article carriers of a single article or article carriers of different articles can be assembled on a target loading aid (outgoing article unit) according to a picking order.

Despite the fact that the invention is not to be understood as being restricted to use in the fresh food sector, this is the preferred field of application. This is mainly because perishable goods, such as fresh fruit and vegetables, require a fast turnover of articles and usually only a limited number of different types have to be picked at the same time. In general, the advantages of this application can also be well implemented in the area of "general merchandise" or in the textile sector.

A particularly simple design results if the assembling of the article carriers for the mentioned picking order is performed in such a way that the article carriers removed from the article carrier stack (containing articles of just one type) at the unloading device(s) or the at least one article carrier stack (containing articles of just one type) removed at the unloading device(s)

is/are either discharged onto a stationary conveyor system, which is arranged between the unloading device and at least one automatically operated reloading device (palletizing), and the article carrier or article carrier stack is (are) transported by the conveyor system from the unloading device(s) to the reloading device, or is/are discharged onto at least one mobile empty (second) transport loading aid comprising the transport loading aids, and the at least one loaded (second) transport loading aid with the article carrier or article carrier stack is (are) transported by an autonomously moveable, driverless transport vehicle from the unloading device(s) to at least one reloading device, whereupon the article carrier or the article carrier stack is transferred to a target loading aid by the reloading device.

In this way, goods handling in the order fulfillment facility can be optimized once again, since the unloading process of the transport loading aids and the reloading process (palletizing) are decoupled from each other. In general, the unloading operation of the transport loading aids required less time as compared to the reloading operation (palletizing). After the unloading process has been performed at the unloading station, which is located separately from the reloading station, the transport loading aids are available earlier for other transport tasks. This minimizes the number of transport loading aids in the order fulfillment facility. In addition, only the article carriers and/or article carrier stacks required for the picking order in question are made available at the reloading station, so that there is no need to return article carriers or article carrier stacks not required for the picking order in question.

According to a further embodiment of the invention, the article carriers removed from the article carrier stack (containing articles of just one type) at the unloading device(s) or the article carrier stacks removed at the unloading device(s) are discharged onto the stationary conveyor system or the at least one mobile empty (second) transport loading aid one after the other and are consecutively transported to the at least one reloading device. Preferably, the article carriers or article carrier stacks are discharged one after the other onto the stationary conveyor system or the at least one mobile empty (second) transport loading aid in a sequence provided by the packing order of the article carriers at the target loading aid and are transported in this sequence one after the other to the at least one reloading device.

It is also advantageous if the article carriers removed from the article carrier stack (containing articles of just one type) at the unloading device(s) is discharged onto the stationary conveyor system or the at least one mobile empty (second) transport loading aid such that at least one (pre-picked) article carrier stack of multiple article carriers arranged on top of one another is assembled, which is subsequently transported to the at least one reloading device. Preferably, the article carriers or article carrier stacks are assembled to (pre-picked) article carrier stacks on the stationary conveyor system or the at least one mobile empty (second) transport loading aid a sequence provided by the packing order of the article carriers at the target loading aid and subsequently the (pre-picked) article carrier stacks are consecutively transported to the at least one reloading device.

The method according to the invention can also comprise the steps:

acquiring picking orders on an order-processing computer, determining the articles (required quantity) required for one of the picking orders, analysis of a stock of those articles which are required for the mentioned picking order, which picking order comprises one or multiple first article carrier(s) containing the article(s) and one or multiple second article carrier(s) containing the article(s), assembling the article carriers for the mentioned picking order in consecutive picking steps if a required quantity of an article exceeds the stock of said article, wherein i) in a first picking step, the (second) transport loading aid is loaded with one or multiple first article carrier(s) at the unloading device, and subsequently said (second) transport loading aid is transported from the unloading device to a buffer surface using an autonomously moveable, driverless transport vehicle and is buffered there, and ii) in a second picking step, the (second) transport loading aid is transported from the buffer surface to the unloading device using an autonomously moveable, driverless transport vehicle and is provided there, if a required quantity of an article falls below the stock of said article, and subsequently the (second) transport loading aid is loaded with one or multiple second article carriers(s), transporting the (second) transport loading aid from the unloading device to the reloading device using an autonomously moveable, driverless transport vehicle after steps i) and ii) have been concluded, and transferring the article carrier stack onto a target loading aid using the reloading device.

The first article carrier and the second article carrier can each contain the same articles or different articles.

A picking order can comprise multiple first article carriers and/or second article carriers containing the articles, which are discharged onto the (second) transport loading aid as partial article carrier stacks using the unloading device in the first picking step and/or second picking step. So as to not unnecessarily block the unloading device, it proves advantageous if the (second) transport loading aid is buffered on a buffer surface for a short time between the first picking step and the second picking step.

In practice, it is not uncommon for time delays to occur in the delivery of articles and for certain articles to be briefly available in the order fulfillment facility only in insufficient quantities (when the stock is lower than the required quantity, therefore the stock is lower than the picking order of articles/article carriers required) or not at all, while other articles are available in sufficiently high quantities (when the stock is higher than the required quantity, therefore the stock is higher than the picking order of articles/article carriers required).

According to this method measure, delays in the replenishment of articles can be compensated, because the picking order is processed even if not all article carriers are available in the stock.

For example, a picking order can include one or multiple article carriers of salad and one or multiple article carriers of tomatoes. The article carriers of tomatoes are not available in sufficient quantity (the stock level can also be zero). The article carriers of tomatoes are available in sufficient quantity (the stock level can be the required quantity, therefore the quantity needed to cover the picking order). The article carriers of salad can be already assembled in the (second) transport loading aid at the unloading device. Then, the (second) transport loading aid loaded with the article carrier(s) of salad is briefly buffered. As soon as the article carriers of tomatoes are available in a sufficient quantity and the stock covers the required quantity, the (second) transport loading aid can be provided at the unloading device and the article carriers of tomatoes can be assembled there.

The first picking step and the second picking step are preferably performed sequentially in time at an unloading device. If multiple unloading devices are provided in the unloading station, the first picking step can be performed at a first unloading device and the second picking step can be performed at a second unloading device sequentially in time.

It proves favorable if assembling the article carriers for the mentioned picking order is carrier out such that the article carriers removed from the article carrier stack (containing articles of just one type) at the unloading device or the article carrier stack (containing articles of just one type) is transferred onto a target loading aid by the unloading device. Such a variant is particularly suitable if the order fulfillment facility has to be set up in a particularly compact manner.

The following method step(s) also prove favorable
transporting a transport loading aid from the unloading station back to the storage zone after removing of the article carriers, if not all article carriers have been removed from the mentioned transport loading aid, and/or
transporting a transport loading aid from a first unloading device to a second unloading device after removing of the article carriers, if not all article carriers have been removed from the mentioned transport loading aid and if said article carriers are needed at the second unloading device for a picking order, and/or
transporting a transport loading aid from the unloading device to a waiting zone in the unloading station after removing of the article carriers, if not all article carriers have been removed from the mentioned transport loading aid and if said article carriers are needed at the mentioned unloading device or one of the unloading devices for an already advised picking order, and/or
transporting a transport loading aid back to the loading station after removing of the article carrier stack and providing the transport loading aid either at the automatically operated loading device or on the buffer surface, if all article carriers have been removed from the mentioned transport loading aid.

The main computer controls the transport vehicles depending on the picking orders that are actively being processed. If not all articles are required for a first picking order and the remaining articles are sufficient for a second picking order, a transport vehicle can transport the transport loading aid containing these articles/article carriers from the respective unloading device or reloading device for instance to another unloading device or reloading device if these are soon required. Moreover, an intermediate buffering of the transport loading aid on the one hand on a buffer surface close to the unloading device or reloading device is possible and on the other hand in a waiting zone comprising the unloading station, which is located at a shorter distance from the unloading device or reloading device than the storage zone. Empty transport loading aids are instead transported to the loading station directly and via the shortest way. Thus, path-optimized trips of the transport vehicles result.

The following method steps also prove particularly favorable
providing a depalletizing station in the delivery zone, and separating article carrier stacks of an article carrier stack group (incoming article unit) assembled of article carrier stacks each of multiple article carriers arranged on top of one another using an automatically operated depalletizing device of the depalletizing station.

Usually, the article carrier stacks are delivered at the delivery zone as article carrier stack groups on pallets or roll containers (delivery load carrier). In this case, an article carrier stack group of a depalletizing station is supplied, in which article carrier stacks of multiple article carriers, arranged on top of one another, from one article carrier stack group are separated.

Such article carrier stack groups are most times made up of article carrier stacks containing articles of just one type. The article carrier stacks containing articles of just one type are subsequently loaded onto the transport loading aids in the loading station.

The following method step also proves favorable
assembling article carrier stacks on the target loading aid (outgoing article unit) with multiple article carrier stacks using the automatically operated reloading device (palletizing) of the reloading station.

The following method steps also prove particularly advantageous
providing a cleaning system with an automatically operated cleaning robot, and
cleaning the transport loading aids and/or the base in the loading station and/or unloading station and/or storage surface in the storage zone using the cleaning robot.

Despite the fact that the automatic cleaning of the transport loading aids and/or the base in the loading station and/or unloading station and/or storage surface in the storage zone using the cleaning robot is preferred, manual cleaning is possible in addition, too. For instance, it can be advantageous if the transport loading aids are transported to a separate washing zone by the transport vehicles. In the washing zone, alternatively or additionally to the washing robot, automatic washing machines, wherein the transport loading aids are cleaned, can be provided. The picking system can be cleared at said surface areas for the purpose of cleaning such that thorough cleaning is possible. In principle, cleaning is also possible during operation of the loading station, unloading station, reloading station and/or traveling operation of the transport vehicles.

The following steps also prove advantageous
providing a first temperature zone in the storage zone, in which the transport loading aids with the at least one article carrier stack of article carriers arranged on top of one another and containing articles of a first article group,
providing a second temperature zone in the storage zone, in which the transport loading aids with the at least one article carrier stack of article carriers arranged on top of one another and containing articles of a second article group,
definition of a first article group and of a second article group, to which first article group articles of a first storage temperature are assigned and to which second article group articles of a second storage temperature are assigned, and detecting data containing data on the first article group, in particular a first storage temperature for the articles, and the second article group, in particular a second storage temperature for the articles, on a computer system,
identifying the article carriers and/or article carrier stacks and/or transport loading aids using a detection device by reading a data carrier (RFID, barcode) in the delivery zone, which data carrier is affixed in each case on the article carriers and/or article carrier stacks and/or transport loading aids,
selectively transporting the (first) transport loading aids, each loaded with at least one article carrier stack, using the autonomously moveable, driverless transport vehicles either in the first temperature zone or second temperature zone,
storing the (first) transport loading aids with the at least one article carrier stack of article carriers arranged on top of one another and containing articles of the first article group in the first temperature zone, and/or
storing the (first) transport loading aids with the at least one article carrier stack of article carriers arranged on top of one another and containing articles of the second article group in the second temperature zone.

By selectively storing the articles depending on the article group, the high quality requirement is met. For example, in the food sector (fresh food sector), the first temperature zone can have a temperature range of 2° C. to 7° C. and the second temperature zone can have a temperature range of 10° C. to 15° C.

The following steps are also advantageous
- transporting one or multiple (first) transport loading aid(s) containing the article carriers required for a first picking order from the first temperature zone and transporting one or multiple (first) transport loading aid(s) containing the article carriers required for a second picking order from the second temperature zone to the unloading station using a shared, automatically operated unloading device,
- providing the mentioned (first) transport loading aid(s) for the first picking order either at the automatically operated unloading device or on a buffer surface near the unloading device using the autonomously moveable, driverless transport vehicle(s),
- providing the mentioned (first) transport loading aid(s) for the second picking order either at the automatically operated unloading device or on a buffer surface near the unloading device using the autonomously moveable, driverless transport vehicle(s), and
- sequentially assembling article carrier stacks on a first target loading aid (outgoing article unit) with multiple article carrier stacks of article carriers arranged on top of one another and containing articles of a first article group, and assembling article carrier stacks on a second target loading aid (outgoing article unit) with multiple article carrier stacks of article carriers arranged on top of one another and containing articles of a second article group at the removal station with a shared, automatically operated removal device or reloading station with a shared, automatically operated reloading device.

Regardless of the temperature zone from which the articles/article carriers are retrieved, they can be manipulated at the same removal station or reloading station. This simplifies the complexity of the picking system and also reduces the acquisition costs.

Particularly quick loading of the transport loading aids is achieved if the article carrier stacks with which the (first) transport loading aids in the loading station are loaded, are each assembled of article carriers with equal articles arranged on top of one another. Hence, the articles can be transported from the delivery zone into the storage zone immediately after their delivery, such that large amounts of articles can also be processed very quickly. Thus, the goods receipt is accelerated.

The method measures comprising the following step(s) are also advantageous
- providing stack loading aids in each case for stabilizing the position of an order stack assembled of the article carriers according to the mentioned picking order, of which the stack loading aids comprise at least one first stack loading aid and/or at least one second stack loading aid, and which, in turn, comprise a base and stack walls connected thereto,
- lading the first stack loading aid with a target loading aid at a lading station using one or multiple automatically operated lading device(s), by the target loading aid being placed on the base if a first stack loading aid is used in the order fulfillment facility, and/or
- defining the second stack loading aid as the target loading aid if a second stack loading aid is used in the order fulfillment facility.

The use of the first stack loading aid or second stack loading aid allows for the reliable transport of the order stack regardless of which article carriers have been stacked. Hence, article carriers, in particular containers and cartons can be stacked mixed. Practice has shown that it is sufficient if the first stack loading aid/second stack loading aid have a first stack wall and a second stack wall. A stack layer is filled starting from the corner from back to front and from left to right or from right to left. On the other hand, a stack layer can be filled starting from the corner from left to right or from right to left and back to front. An article carrier can be positioned and stacked precisely in the corner by the transfer device (in particular a clamping gripper unit). In this way, the order stack is given a high degree of stability.

A first stack loading aid can be used in the order fulfillment facility when the target loading aid with the order stack is delivered to the customer. A second stack loading aid can be used in the order fulfillment facility if the target loading aid is to be exchanged by a distribution load carrier, preferably a roll container, a pallet and the like. The distribution load carrier is for example loaded with the order stack in the load securing station and then delivered to the customer.

The following steps also prove advantageous
- transporting stack loading aids using the autonomously moveable, driverless transport vehicles to the unloading station and providing one or multiple stack loading aid(s) either on one or on multiple automatically operated unloading device(s) or on a buffer surface close to the unloading device(s), and
- assembling the article carriers according to the mentioned picking order to the order stack on the target loading aid in the first stack loading aid or on the base of the second stack loading aid, said first stack loading aid or second stack loading aid being provided at the automatically operated unloading device(s).

Like the transport loading aids, the stack loading aids can also be transported between the loading station and the unloading station using the autonomously moveable, driverless transport vehicles. Either those transport vehicles that also transport the transport loading aids can be used, or additional autonomously moveable, driverless transport vehicles are provided, which assume the transport of the stack loading aids.

In the order fulfillment facility, article carriers (which cannot be picked automatically), so-called "ugly article carriers", can also be picked manually. While a large part of the article carrier, namely more than 90% of the overall article carrier assortment, is automatically picked using the automatically operated unloading device(s), the remaining part of the article carriers is manually picked at the semi-automated unloading device(s). Automatic picking of article carriers is in particular possible if these have a first longitudinal dimension of approx. 600 mm or a second longitudinal dimension of approx. 300 mm or a third longitudinal dimension of between 600 mm and 300 mm. A width can amount to between 300 mm and 400 mm. If the article carriers have a longitudinal dimension of less than 300 mm and/or if the article carriers have a lower dimensional stability, they are picked manually.

In this regard, the following steps prove advantageous
- providing one or multiple automatically operated second loading device(s),
- providing article carrier stack groups of multiple article carrier stacks arranged next to one another with article carriers arranged on top of one another in the delivery zone of the order fulfillment facility, providing empty (third) transport loading aids each for receiving and stabilizing the position of an article carrier stack group, transporting empty (third) transport loading aids using the autonomously moveable, driverless transport vehicles to the loading station and providing one or multiple empty (third) transport loading aid(s) either on one or on multiple automatically operated second loading device(s) or on a buffer surface close to the second loading device(s), loading one of the empty (third) transport loading aids, which is provided at the automatically operated second loading device, with at least one article carrier stack group from the delivery zone using the automatically operated second loading device, transporting the (third) transport loading aid loaded with the article carrier stack group from the loading station to the storage zone using the autonomously moveable, driverless transport vehicle, placing the (third) transport loading aid loaded with at least one article carrier stack group on the storage surface in the storage zone, and storing the (third) transport loading aid loaded with the article carrier stack group in the storage zone, processing a picking order comprises the following steps:

transporting one or multiple (third) transport loading aid(s) containing the article carriers required for the picking order from the storage zone to the unloading station and providing said (third) transport loading aid(s) either at one or at multiple semi-automated unloading device(s) or on a buffer surface close the unloading device(s) using one or multiple autonomously moveable, driverless transport vehicle(s), manually unloading one or multiple ones of the (first) transport loading aid(s), which is (are) provided at the semi-automated unloading device(s), by removing the article carriers required for processing the mentioned picking order, and manually assembling the article carriers on one or multiple target loading aids for the mentioned picking order, if the target loading aid(s) is (are) provided at the semi-automated unloading device(s).

Providing the mentioned (third) transport loading aid(s) at one or multiple semi-automated loading device(s) may comprise the following steps:

taking over of a (third) transport loading aid from an autonomously moveable, driverless transport vehicle to a lifting platform of the unloading device(s), and providing the article carriers at a provisioning level by lifting the (third) transport loading aid, which is placed on the lifting platform, in order to enable ergonomic unloading of the article carriers by a picker.

This enables ergonomic working even during manual picking (unloading the article carriers from the transport loading aid and loading the target loading aid with article carriers).

According to an embodiment of the invention, the method comprises the following steps:

transporting empty target loading aids using the autonomously moveable, driverless transport vehicles to the unloading station and providing said empty target loading aids either at one or at multiple semi-automated unloading device(s) or on a buffer surface close the unloading device(s) using one or multiple autonomously moveable, driverless transport vehicle(s), and manually assembling the article carriers on one or multiple empty target loading aids for the mentioned picking order, if the empty target loading aid(s) is (are) provided at the semi-automated unloading device(s).

In this case, different article carriers (articles) are assembled to a picking order on a target loading aid.

According to an embodiment of the invention, the method comprises the following steps:

transporting partially loaded target loading aids using the autonomously moveable, driverless transport path from the automatically operated unloading device to the semi-automated unloading device or to a buffer surface close to the semi-automated unloading device(s) after the articles carriers have been assembled on the partially loaded target loading aid at the automatically operated unloading device and if article carriers are still required for the mentioned picking order which are provided via the (third) target loading aids at the semi-automated unloading device(s), and manually assembling the article carriers on one or multiple partially loaded target loading aids for the mentioned picking order, if the partially loaded target loading aid(s) is (are) provided at the semi-automated unloading device(s).

The picking order comprises article carriers (articles) which can be automatically picked at an automatically operated unloading device, and article carriers which have to be picked manually at a semi-automated unloading device. First, the article carriers (articles) on the target loading aid are picked at the automatically operated unloading device. Then, the target loading aid with the order stack is transported to the semi-automated unloading device by an autonomously moveable, driverless transport vehicle. Then, picking of the order stack is finished there manually.

The following steps according to the invention are also advantageous transporting stack loading aids using the autonomously moveable, driverless transport vehicles to the unloading station and providing one or multiple stack loading aid(s) either on one or on multiple semi-automated unloading device(s) or on a buffer surface close to the unloading device(s), and assembling the article carriers according to the mentioned picking order to the order stack on the target loading aid in the first stack loading aid or on the base of the second stack loading aid, said first stack loading aid or second stack loading aid being provided at the semi-automated unloading device(s).

As already described above, reliable transport of the order stack is possible using the first stack loading aid/second stack loading aid, irrespective of which article carriers have been stacked. In case of manual picking, a stack layer is also filled starting from the corner from back to front and from left to right or from right to left. On the other hand, a stack layer can be filled starting from the corner from left to right or from right to left and back to front. An article carrier can be positioned and stacked precisely in the corner by the picker. In this way, the order stack is given a high degree of stability.

It also proves advantageous if the method comprises the following steps:

providing an order stack load securing station either with one or multiple automatically operated load securing device(s) or with one or multiple automatically operated load securing device(s) and a buffer surface close to the load securing device(s), said load securing devices being formed for secure transport of an order stack with a securing means, transporting stack loading aids each loaded with at least one order stack using the autonomously moveable, driverless transport vehicles to the mentioned order stack load securing station and providing one or multiple stack loading aid(s) either on one or on multiple automatically operated load securing device(s) or on a buffer surface close to the load securing device(s), removing the order stack from the stack loading aid using a lifting device, by means of which the target loading aid with the order stack is lifted from the first stack loading aid, if the order fulfillment facility comprises the first stack loading aid, or by means of which the order stack is lifted from the second stack loading aid if the order fulfillment facility comprises the second stack loading aid, securing the order stack with the securing means using the automatically operated load securing device, in that the securing means is placed circumferentially around the order stack, and transporting the secured order stack, in particular using the autonomously moveable, driverless transport vehicles, from the load securing station to a dispatch zone, transporting the unloaded stack loading aids using the autonomously moveable, driverless transport vehicles, comprising:

transporting the first stack loading aid from the load securing station to the lading station with one or multiple automatically operated lading device(s), if a first stack loading aid is used in the order fulfillment facility, and/or transporting the second stack loading aid from the load securing station to the unloading station and providing the second stack loading aid(s) either at an automatically operated unloading device or on a buffer surface close to the reloading device, if a second stack loading aid is used in the order fulfillment facility.

A "central" load securing station is provided, to which the order stacks with a first stack loading aid/second stack loading aid or the order stacks without a first stack loading aid/second stack loading aid are transported using the autonomously moveable, driverless transport vehicles. There, the order stack is secured with a securing means, for example a winding film or a fastening tape. The "secured" order stacks can preferably be transported away using the autonomously moveable, driverless transport vehicles. It is also advantageous if the (first) transport loading aid (from which article carriers are removed) and/or the (second) transport loading aid (onto which article carriers are discharged) has a base and side walls connected thereto, at least one (vertically continuous) accommodating shaft bounded by the side walls for accommodating at least one article carrier stack and a loading and unloading opening, and that the side walls are used to stabilize the position of the at least one article carrier stack when the it is placed on the base, exclusively comprise first side walls arranged parallel or inclined to each other, or comprise first side walls arranged parallel or inclined to each other and a second side wall arranged between these.

In this regard, the base can comprise a placing surface on its upper side, on which at least one article carrier stack can be placed, and a transport surface on its lower side, against which a loading platform of the transport vehicle can be placed. The (first) transport loading aid can form one or multiple accommodating shafts, wherein an accommodating shaft is bounded by side walls on at least two sides, preferably three sides. The accommodating shaft is accessible on at least one side via the loading and unloading opening. Loading and unloading the (first) transport loading aid is performed via the loading and unloading opening and, in the simplest embodiment, by "pushing on" or "pushing off" an article carrier stack. The placing surface at the base is used as a sliding surface/pushing surface in this context.

It can also prove advantageous if the second side wall comprises a side wall part which is inclined at an inclination angle towards a vertical plane spanned between the first side walls such that the side wall part is inclined backwards with increasing vertical distance from the base.

Moreover, it can be provided that the base comprises a base wall part which is inclined downwards in the direction towards the second side wall at an inclination angle towards a horizontal plane spanned between the first side walls.

The article carriers lean against the side wall part(s) and are displaced with the center of gravity in the center direction of the transport loading aid as the height distance from the floor increases. Using the transport loading aids, particularly high article carrier stacks can be transported reliably, even if the autonomously moveable, driverless transport vehicles are driven dynamically. Moreover, the transfer device is enabled to perform improved removing of the article carriers from the transport loading aid.

It proves advantageous if the order fulfillment facility uses one or multiple stack loading aids in each case for stabilizing the position of an order stack assembled of the article carriers according to the mentioned picking order, which comprise at least one first stack loading aid and/or at least one second stack loading aid, and which, in turn, comprise a base and stack walls connected thereto.

Preferably, the at least one first stack loading aid at the base on its upper side forms a placing surface on which a target loading aid, in particular a pallet, with the order stack stacked thereon can be placed.

Preferably, the at least one second stack loading aid at the base on its upper side forms protruding placing blocks separated from each other by receiving channels, on which the article carriers of the order stack can be placed, so that the at least one second stack loading aid forms the target loading aid.

According to an embodiment, it is provided that the base of the first stack loading aid/second stack loading aid on its lower side comprises a transport surface against which a loading platform of the transport vehicle can be placed.

It is also advantageous if the order fulfillment facility comprises an order stack load securing station either with one or multiple automatically operated load securing device(s) or with one or multiple automatically operated load securing device(s) and a buffer surface close to the load securing device(s), the load securing device being formed for secure transport of an order stack with a securing means, and which comprises a lifting device, by means of which the target loading aid with the order stack is lifted from the stack loading aid, if the order fulfillment facility comprises the first stack loading aid, or by means of which the order stack is lifted from the stack loading aid if the order fulfillment facility comprises the second stack loading aid, in order to stabilize the order stack with the securing means.

The invention also relates to a transfer device for unloading a transport loading aid with article carriers arranged on top of one another and for loading a target loading aid with article carriers by clamping gripping and an unloading station for an order fulfillment facility.

A vacuum gripping system for gripping at least one article carrier is known from DE 199 59 285 B4, which comprises a base frame and at least one suction unit arranged on the base frame, wherein a loading tongue is arranged on the base frame. The loading tongue can be pushed at least partially under at least one of the article carriers lifted by the suction unit. The vacuum gripping system can be used on smooth surfaces only, which significantly limits the range of applications. In particular, containers with ribs and recesses are usually used in an order fulfillment facility, which almost completely exclude the use of the vacuum gripping system. Thus, only cartons can be gripped.

It is an object of the invention to create an improved transfer device for unloading a transport loading aid with article carriers arranged on top of one another and for loading a target loading aid with article carriers by clamping gripping and an unloading station for an order fulfillment facility. In particular, largely trouble-free operation and fast article handling should be possible regardless of the article carrier used (containers made of plastic materials or cartons).

The object of the invention is achieved by a transfer device, which comprises
 a base frame,
 loading tongues movable by first drive devices relative to the base frame and in a first direction (y) independently of one another between a retracted initial position and an extended receiving position, said loading tongues receiving at least one article carrier in an extended receiving position,
 clamping jaws movable relative to one another in a second direction (x) by at least one second drive device between a retracted opened position and an abutting clamping position for clampingly gripping at least one article carrier, and
 a lifting frame movable in a third direction (z) relative to the base frame by a third drive device, on which lifting frame the clamping jaws are stored and by means of which the clamping jaws are movable between a lower height position and an upper height position, such that, for unloading the transport loading aid
 the at least one article carrier can be lifted by the clamping jaws set against the at least one article carrier, and
 at least one of the loading tongues can be pushed at least partially under the at least one article carrier lifted by the clamping jaws in order to accommodate the at least one article carrier in the extended receiving position.

The transfer device comprises a clamping gripper unit with a first clamping jaw and a second clamping jaw, in the abutting clamping position, are applied in a force-fit against the article carrier walls of an article carrier facing away from each other or of article carriers arranged next to one another. Almost regardless of how the article carrier walls are designed, a sufficiently high clamping is possible to lift the at least one article carrier such that at least one of the loading tongues can be pushed at least partially under the at least one article carrier lifted by the clamping jaws. When the at least one article carrier is located on the at least one loading tongue, which is extended into the receiving position, the weight of the at least one article carrier rests on the loading tongue.

According to an embodiment, the stop device is provided with one or multiple stop elements which can be placed against the at least one article carrier can be placed.

The at least one article carrier can be positioned on the loading tongue and against the stop elements. Additionally, the at least one article carrier can be centered between the clamping jaws. Hence, the at least one article carrier can be discharged onto a target loading aid in a precise positional orientation.

It also proves advantageous for the first clamping jaw to be arranged on a first clamping jaw frame and for the second clamping jaw to be arranged on a second clamping jaw frame and for one of the first and second clamping jaw frames to be adjustable in a second direction (x) at least between a first configuration width and a second configuration width by at least one fourth drive device, so as to receive an article carrier with the first longitudinal dimension in the first configuration width between the first clamping jaw and the second clamping jaw and to receive an article carrier with the second longitudinal dimension in the second configuration width between the first clamping jaw and the second clamping jaw.

Hence, using the transfer device, first article carriers with a first longitudinal dimension and/or second article carriers with a second longitudinal dimension can be unloaded from a transport loading aid with article carriers arranged on top of one another and can be loaded onto a target loading aid. The first longitudinal dimension and the second longitudinal dimension differ.

A particularly advantageous design of the transfer device is achieved if the second drive device and one of multiple stop elements of the stop device are also mounted on the first or second clamping jaw frame, which can be adjusted in a second direction (x) by the at least one fourth drive device.

It can also prove advantageous if at least one of the clamping jaws for loading the target loading aid is additionally movable in the first direction (y) relative to the frame into a retracted release position by a fifth drive device.

In the retracted release position, the stop element(s) project(s) beyond the mentioned at least one clamping jaw, such that, for loading the target loading aid, the at least one article carrier can be stacked onto the target loading aid unhindered by the at least one loading tongue. Thus, said clamping jaw also does not hinder placing an article carrier just next to a stack wall of a stack loading aid, if stack loading aids are used in the order fulfillment facility, and/or an article carrier wall of an article carrier already placed at the order stack. Moreover, clamping of an article carrier can be maintained until just before discharge of the article carrier onto the order stack.

The object of the invention is also achieved by an unloading station for an order fulfillment facility, which comprises at least one automatically operated unloading device with a transfer device, which is spatially movable in relation to a support construction, for unloading a transport loading aid and for loading a target loading aid with article carriers having the same and/or different longitudinal dimensions by clamping gripping.

However, the object of the invention is also achieved by an unloading station for an order fulfillment facility comprising at least one automatically operated unloading device with a transfer device, which is spatially movable in relation to a support construction, for unloading a transport loading aid with articles carriers arranged on top of one another and/or next to one another in a stack layer by clamping gripping, said transfer device comprising
 a base frame,
 loading tongues movable by first drive devices relative to the base frame and in a first direction (y) independently of one another between a retracted initial position and an extended receiving position, clamping jaws movable relative to one another in a second direction (x) by at least one second drive device between a retracted opened position and an abutting clamping position, and a lifting frame movable in a third direction (z) relative to the base frame by a third drive device, on which lifting frame the clamping jaws are stored and by means of which the clamping jaws are movable between a lower height position and an upper height position, wherein a first clamping jaw of the clamping jaws is arranged on a first clamping jaw frame and a second clamping jaw of the clamping jaws is arranged on a second clamping jaw frame and one of the first and second clamping jaw frames can be adjusted in a second direction (x) at least between a first configuration width and a second configuration width by at least one fourth drive device, and wherein the first drive device, second drive device, third drive device and fourth drive device are connected to a control device of the unloading device, wherein the control device is configured for controlling the transfer device and its drive devices so as to carry out subsequent method steps for unloading one of the article carriers arranged next to one another in a stack layer moving the transfer device relative to the article carrier stacks in the transport loading aid, positioning the clamping jaws relative to a stack layer and laterally besides article carrier walls of the article carriers arranged next to one another by moving the transfer device, clamping the article carriers arranged next to one another by actuating the at least one second drive device in order to move the clamping jaws relative to one another in the second direction (x) and from a retracted opened position into the abutting clamping position, lifting the article carriers arranged next to one another of at least one stack layer by the clamping jaws placed against the article carriers at the article carrier walls by actuating the at least one third drive device so as to move the lifting frame in the third direction (z) relative to the base frame and the clamping jaws out of the lower height position into the upper height position, sliding one of the loading tongues under one of the article carriers, which are lifted and arranged next to one another, by actuating the first drive devices relative to the base frame to receive the one of the article carriers in the extended receiving position, releasing the clamping of the article carriers by actuating the at least one second drive device in order to move at least one of the clamping jaws in the second direction (x) from the abutting clamping position into the retracted opened position, such that the article carrier which is not supported from below tilts back onto the article stack in the transport loading aid, changing the configuration width from the first configuration width to the second configuration width by the at least one fourth drive device in a second direction (x), and clamping the article carrier, which is received on the loading tongue moved into the extended receiving position, by actuating the at least one second drive device in order to move the clamping jaws relative to one another in the second direction (x) and from a retracted opened position into the abutting clamping position.

The transfer device allows for the separation of article carriers from one stack layer or separation of a partial article carrier stack from stack layers. A partial article carrier stack is understood as a stack of at least two article carriers arranged on top of one another. This enables storage of two article carrier stacks closely next to each other in a receiving shaft of a transport loading aid. The article carrier stacks can support one another such that a reliable transport is possible also in case of a small base area of the article carriers and high article carrier stacks.

However, using the transfer device according to the invention, unloading from the transport loading aid and/or reloading onto a target loading aid can be performed separately for article carriers of a first longitudinal dimension, pair-wise for article carriers of a second longitudinal dimension, separately for partial article carrier stacks or pair-wise for partial article carrier stack of a second longitudinal dimension.

For the purpose of better understanding of the invention, it will be elucidated in more detail by means of the figures below.

BRIEF DESCRIPTION OF THE DRAWINGS

These show in a respectively very simplified schematic representation:

FIG. 1 a first embodiment of an order fulfillment facility for storing and picking articles in a perspective view;

FIG. 2b a loading station of the order fulfillment facility of FIG. 1 in an enlarged view;

FIGS. 4a, 4b a first embodiment of an (non-loaded) transport loading aid without article carriers, and a (loaded) transport loading aid with article carriers, in a perspective view;

FIGS. 5a, 5b a second embodiment of an (non-loaded) transport loading aid without article carriers, and a (loaded) transport loading aid with article carriers, in a perspective view;

FIG. 7 a second embodiment of an order fulfillment facility for storing and picking articles in a perspective view;

FIG. 8 a third embodiment of an order fulfillment facility for storing and picking articles in a perspective view;

FIG. 8a an unloading station of the order fulfillment facility of FIG. 8 in an enlarged view;

FIGS. 9a, 9b a fourth embodiment of an order fulfillment facility for storing and picking articles in a perspective view;

FIG. 10b an unloading station (reloading station) of the order fulfillment facility of FIGS. 9a, 9b with an automatically operated unloading device in an enlarged view;

FIGS. 11a, 11b a fourth embodiment of an (non-loaded) transport loading aid without article carriers, and a (loaded) transport loading aid with article carriers, in a perspective view;

FIGS. 13a, 13b a transfer device for an automatically operated unloading device in perspective views;

FIGS. 13c, 13d the transfer device in section according to FIGS. 13a, 13b in perspective views;

FIGS. 15a to 15g a sequence for an unloading operation of an article carrier from a transport loading aid, using the example of an article carrier with a (long) first longitudinal dimension;

FIGS. 15h to 15n a sequence for a loading operation of an article carrier onto a target loading aid, using the example of an article carrier with a (long) first longitudinal dimension;

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 2A:
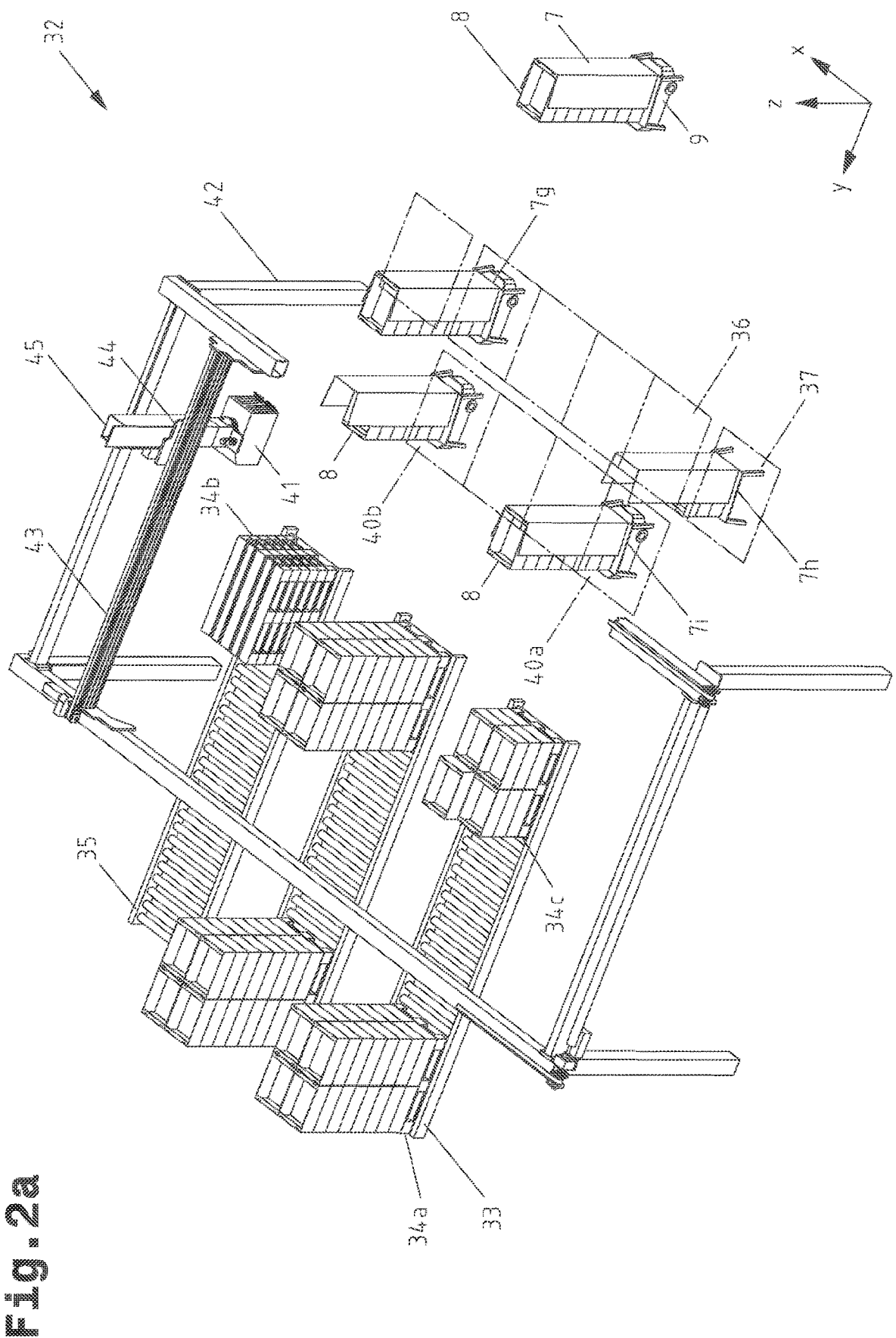
FIG. 2a an unloading station (reloading station) of the order fulfillment facility of FIG. 1 in an enlarged view.

FIGS. 1, 2a and 2b show a first embodiment of an order fulfillment facility 1a for storing and picking article carriers 3 that contain articles 2 (as only shown in FIG. 4b for reasons of clarity) and are stackable. The order fulfillment facility 1a comprises a delivery zone 4, a storage zone 5, an order processing zone 6, a plurality of transport loading aids 7 each for accommodating and stabilizing the position of at least one article carrier stack 8 and a plurality of autonomously moveable, driverless transport vehicles 9 for transporting transport loading aids 7. The article carrier stack 8 is formed by multiple article carriers 3 arranged (stacked) on top of one another.

In the delivery zone 4, the provision of article carrier stacks 8 is envisaged. The article carrier stacks 8 can be provided as separate article carrier stacks 8 and/or as article carrier stack groups 10 assembled of article carrier stacks 8 arranged next to one another. In general, the provision of individual article carriers 3 would also be possible.

Usually, the article carrier stacks 8 are delivered into the delivery zone 4 as article carrier stack groups 10 on pallets or roll containers (delivery load carrier). In this case, an article carrier stack group 10 of a depalletizing station is supplied, in which article carrier stacks 8 of multiple article carriers 3, arranged on top of one another, from one article carrier stack group 10 are separated. Such article carrier stack groups 10 are most times made up of article carrier stacks 8 containing articles of just one type.

In contrast to this, the separated article carrier stacks 8 are delivered into the delivery zone 4 without pallets or roll containers (delivery load carrier). In this case, the article carrier stacks 8 do not have to be fed to a depalletizing station and a depalletizing station can be dispensed with.

FIGS. 1 and 2b show a possible embodiment, in which a depalletizing station with at least one automatically operated depalletizing device 11 (schematically adumbrated), a first conveying device 12a following the depalletizing device 11 for supplying article carrier stack groups 10 (incoming article units), a second conveying device 12b following the depalletizing device 11 for transporting delivery load carriers away, a loading station with at least one automatically operated loading device 13 (schematically adumbrated), a third conveying device 14a connecting, in respect of a conveying stream, the depalletizing device 11 to the loading station 13 for supplying article carrier stacks 8 and/or a fourth conveying device 14b connecting, in respect of a conveying stream, the depalletizing device 11 to the loading station 13 for supplying article carrier stacks 8 may be provided in the delivery zone 4. The fourth conveying device 14b for supplying article carrier stacks 8 is optional and may also be omitted.

As not shown in further detail, for example, the depalletizing device 11 can rotate, clamp and lift the article carrier stacks 8 along the circumference on at least two sides and/or lower the delivery load carrier (pallet) and discharge it using the second conveyor device 12b and deliver the article carrier stacks 8 to the third conveyor device 14a and the fourth conveyor device 14b, by means of which the article carrier stacks 8 can be further transported individually and/or in pairs. The article carrier stacks 8 are provided at the loading device 13 "unamendedly" and each in a transfer position. The first transfer location 15a is preferably formed on the third conveying device 14a and the second transfer location 15b is preferably formed on the fourth conveying device 14b. In case the fourth conveying device 14b is not provided, only the transfer location 15a is provided.

As described in the following, the loading station comprises the at least one automatically operated loading device 13 (schematically adumbrated) and additionally a buffer surface 30 near said loading device 13.

The schematically depicted loading device 13 comprises a first provisioning location 16a for the first transport loading aid 7a, an (optional) second provisioning location 16b for the second transport loading aid 7b and a transfer device 17 for transferring a first article carrier stack 8 from the first transfer location 15a onto the first transport loading aid 7a and possibly for transferring a second article carrier stack 8 from the second transfer location 15b onto the second transport loading aid 7b. The first provisioning location 16a and the first transfer location 15a are arranged so as to be located opposite one another. The optional (second) provisioning location 16b and the optional (second) transfer location 15b are arranged so as to be located opposite one another.

In concrete terms, the automatically operated loading device 13 comprises a transfer device 17 that is movable relative to the transfer location 15a, 15b in order to move an article carrier stack 8 (or possibly individual article carriers 3) provided in a transfer position at the transfer location 15a, 15b to the transport loading aid 7a, 7b. The transfer device 17 may be formed for example by a pusher actuatable by an actuating drive. The transfer device 17 is arranged above the conveying device 14a, 14b.

According to a first embodiment, the loading device 13 may specifically comprise a gantry robot. Gantry robots are understood to be industrial robots, which in their base axes are constructed from linear axles. Using a line gantry is sufficient for loading.

The gantry robot comprises vertical uprights, longitudinal beams and transverse beams, which are connected to one another, forming a support construction 18. Additionally, the gantry robot comprises a gantry slide 19, that is movable in a first direction (x-direction-horizontal movement) along a guide assembly via a first drive device, and a gantry arm 20 arranged on the gantry slide 19. A transfer device 17 is arranged on the gantry arm 20. The first drive device comprises a traction drive connected to the gantry slide 19. The traction drive comprises an endlessly revolving traction means, which is guided around a deflection wheel and a drive wheel coupled with an electric actuating motor. A clockwise or counter-clockwise rotating motion of the drive wheel moves the gantry slide 19 and the transfer device 17 mounted thereon relative to the transfer location 15a, 15b either in a first pushing direction or second pushing direction (x-direction). The gantry robot may comprise a displacement measurement device not depicted, by means of which the readjustment movements of the gantry slide 19 (and/or of the transfer device 17) are captured. Here, the measurement method of absolute and incremental displacement measurement is utilized.

It may prove useful if the gantry arm 20 is also movable in a second direction (z-direction-vertical movement) along a guide assembly via a second drive device.

In the course of the pushing movement, the first article carrier stack 8a is moved from the first transfer location 15a onto the empty first transport loading aid 7a, which is provided at the provisioning location 16a, or the second article carrier stack 8b is moved from the second transfer location 15b onto the empty second transport loading aid 7b, which is provided at the second provisioning location 17b. In FIG. 2b, the first article carrier stack 8a has already been discharged onto the first transport loading aid 7a, while the second article carrier stack 8b is still being transported to the loading device 13 and the second transport loading aid 7b is still empty.

The described loading device 13 may be constructed very simply and requires on principle only a stationary holding surface (transfer location 15a, 15b) and a pushing device (pusher), by means of which the "unamended" article carrier stack 8 is pushed from the holding surface onto the empty (first) transport loading aid.

According to an embodiment, which is not depicted, the loading device 13 may comprise a jointed-arm robot. The jointed-arm robot comprises a gripping system that is movable relative to a robot base, by means of which gripping system an "unamended" article carrier stack 8 (or possibly individual article carriers 3) can be transferred from the transfer position on the first/second transfer location 15a, 15b to the first transport loading aid 7a/second transport loading aid 7b. In this regard, the "unamended" article carrier stack 8 can be pushed from the holding surface (transfer location 15a, 15b) onto the empty (first) transport loading aid or individual article carriers 3 can be lifted off the article carrier stack 8 and placed on the empty (first) transport loading aid 7a, 7b.

As depicted in FIG. 2b, an empty (first) transport loading aid 7c may be transported to the provisioning location 16a, 16b using an autonomously moveable, driverless transport vehicle 9 and be placed there. While loading the (first) transport loading aid 7, 7a . . . 7c, said transport vehicle 9 may be used for other transport purposes.

However, in principle, it is also possible that the autonomously moveable, driverless transport vehicle 9 is transported to the provisioning location 16a, 16b and placed there but remains at the provisioning location 16a, 16b while the (first) transport loading aid 7a, 7b is loaded. This is particularly advantageous if loading the (first) transport loading aid 7, 7a . . . 7c takes place with an "unamended" article carrier stack 8, 8a . . . 8c as this allows loading to be performed particularly quickly and the transport vehicle 9 is "unproductive" only for a short time.

If a (first) transport loading aid 7a, 7b is already placed at the provisioning location 16a or if (first) transport loading aids 7a, 7b are already placed at the provisioning locations 16a, 16b or if the (first) transport loading aid 7a is or the (first) transport loading aids 7a, 7b are currently being loaded, the empty (first) transport loading aids 7c, 7d can be buffered on the buffer surface 30 provided near the loading device 13.

Even though, in the depicted embodiment, the loading station is shown having a single loading device 13 for reasons of clarity, the number of loading devices 13 may vary depending on the required picking performance. For example, the loading station and/or the order fulfillment facility 1a may have a second loading device 13, third loading device 13 etc. These loading devices 13 are preferably constructed identically. It also proves advantageous if a separate buffer surface 30 is arranged near each loading device 13. However, in principle, the loading station may also comprise only one buffer surface 30. The buffer surface 30 is preferably formed on a base of the order fulfillment facility 1a.

This way, it is possible that the empty (first) transport loading aid(s) 7d are buffered on the buffer surface 30, near the loading device(s) 13, and are transported as needed to the respective provisioning location 16a, 16b of the loading device(s) 13 over a short distance using the transport vehicles 9.

After being loaded (with at least one article carrier stack 8), the (first) transport loading aids 7e are transported from the loading station, in particular from the first loading station 13, or from the first loading devices 13 to the storage zone 5 using the autonomously moveable, driverless transport vehicles 9 and are placed on a storage area 31 in the storage zone 5. The storage surface 31 is preferably formed on a base of the order fulfillment facility 1a. As will be described below, using the autonomously moveable, driverless transport vehicles 9, also at the unloading station, not completely unloaded (partially loaded) "opened" (first) transport loading aids 7f are transported from the unloading station back to the storage zone 5 and placed on the storage surface 31 in the storage zone 5.

As evident in FIGS. 1 and 2a, an unloading station with at least one automatically operated unloading device 32 (schematically adumbrated), a first conveying device 33 following the unloading device 32 for transporting completely loaded target loading aids 34a (outgoing article units) away and optionally a second conveying device 35 following the unloading device 32 for supplying empty target loading aids 34b are arranged in the order processing zone 6. According to this embodiment, the unloading station with the automatically operated unloading device 32 or the multiple automatically operated unloading devices 32 simultaneously forms a reloading station with the one automatically operated reloading device (palletizing device) or the multiple automatically operated reloading devices (palletizing devices), by means of which the article carriers 3 or article carrier stacks 8 are transferred from the transport loading aid 7 onto the target loading aid 34c or the target loading aids 34c. Therefore, the term "unloading device" may be used synonymously with "reloading device".

As described in the following, the unloading station comprises the at least one automatically operated unloading device 32 (schematically adumbrated). Even though, in the depicted embodiment, the unloading station is shown having a single unloading device 32 for reasons of clarity, the number of unloading devices 32 may vary depending on the required picking performance. For example, the unloading station and/or the order fulfillment facility 1a may have a second unloading device 32, third unloading device 32 etc. These unloading devices 32 are preferably constructed identically.

It also proves advantageous if the unloading station has at least one separate buffer surface 36 near the unloading device 32 or near each unloading device 32. In the depicted embodiment, the unloading device 32 is assigned one buffer surface 36 per provisioning location 40a . . . 40b. However, in principle, the unloading station may also comprise only one buffer surface 36. The buffer surface 36 is preferably formed on a base of the order fulfillment facility 1a. This way, it is possible that the loaded (first) transport loading aid(s) 7g are buffered on the buffer surface 36, near the unloading device(s) 32, and are transported as needed to the respective provisioning location 40a . . . 40b of the unloading device(s) 32 over a short distance using the transport vehicles 9.

It is also advantageous if the unloading station has one or multiple waiting zone(s) 37. A transport loading aid 7h can be placed at the waiting zone 37 or at the waiting zones 37 after removing of at least one article carrier 3, if not all article carriers 3 have been removed from the mentioned transport loading aid 7h and if these article carriers 3 are needed at the mentioned unloading device 32 or one of the unloading devices 32 for an already advised picking order. However, in principle, the loading station may also comprise only one waiting zone 37.

This way, it is possible that the partially unloaded (first) transport loading aid(s) 7h are buffered in the waiting zone 37, near the unloading device(s) 32, and are transported as needed to the respective provisioning location 40a . . . 40b of the unloading device(s) 32 over a short distance using the transport vehicles 9.

The schematically shown embodiment of the automatically operated unloading device 32 comprises a first provisioning location 40a for the loaded first transport loading aid 7i, an (optional) second provisioning location 40b for the loaded second transport loading aid 7i and a transfer device 41 movable relative to the provisioning location 40a . . . 40b for unloading the transport loading aid 7i provided at the provisioning location 40a . . . 40b. If the unloading station has more than one automatically operated unloading device 32, each unloading device 32 comprises a first provisioning location 40a for the loaded first transport loading aid 7i, and an (optional) second provisioning location 40b for the loaded second transport loading aid 7i and a transfer device 41 movable relative to the provisioning location 40a . . . 40b for unloading the transport loading aid 7i provided at the provisioning location 40a, 40b.

The transfer device 41 may for example be formed by a gripping system. The gripping system may comprise for example a base body, a vacuum suction unit with at least one suction gripper or multiple suction grippers and/or adjacently arranged on top of one another (and/or next to one another) and a support base movably mounted on the base body. Unloading the transport loading aid 7i with this gripping system is performed such that an article carrier 3 or a partial article carrier stack is first lifted on one side by the suction unit so that a gap opens between the top article carrier 3 and the one below it and the support base is then pushed in under the article carrier 3 lifted on one side or the partial article carrier stack lifted on one side using the suction unit in a horizontal direction so as to accommodate said article carrier 3 or partial article carrier stack. Such a gripping system thus makes it possible to unload an individual article carrier 3 but also a partial article carrier stack. In principle, it is also conceivable that the number of suction grippers arranged on top of one another is selected such that the entire article carrier stack 8 can be lifted on one side and the support base can accommodate the entire article carrier stack 8.

Moreover, the gripping system may also be configured such that a gripping unit acts according to the positive engagement principle and/or friction principle and grips an individual article carrier 3, partial article carrier stack or article carrier stack 8 in a positively engaging or friction-type manner.

According to a first embodiment, the unloading device 32 may specifically comprise a gantry robot. Gantry robots are understood to be industrial robots, which in their base axes are constructed from linear axles. An area gantry is used for loading.

The gantry robot comprises
i) vertical uprights, longitudinal beams and transverse beams, which are connected to one another, forming a support construction 42
ii) a first gantry slide 43 mounted on the support structure 42 and horizontally movable in a first direction (x-direction) along a guide assembly (which are arranged on the longitudinal beams) via a first drive device,
iii) a second gantry slide 44 mounted on the first gantry slide 43 and horizontally movable in a second direction (y-direction) along a guide assembly via a second drive device, and
iv) a gantry arm 45 mounted on the second gantry slide 44 and vertically movable in a third direction (z-direction) along a guide assembly via a third drive device, and
v) the transfer device 41, which is arranged on the gantry arm 45 and is mounted on the gantry arm 45 so as to be rotatable about a vertical axis.

The first drive device comprises a first traction drive connected to the first gantry slide 43. The first traction drive comprises endlessly revolving traction means, each of which is guided around a deflection wheel and a drive wheel. The drive wheels are coupled to an electric actuating motor. A clockwise or counter-clockwise rotating motion of the drive wheels moves the first gantry slide 43 and transfer device 41 mounted thereon in the x-direction relative to the provisioning location 40a . . . 40b.

The second drive device comprises a second traction drive connected to the second gantry slide 44. The traction drive comprises an endlessly revolving traction means, which is guided around a deflection wheel and a drive wheel coupled with an electric actuating motor. A clockwise or counter-clockwise rotating motion of the drive wheel moves the second gantry slide 44 and transfer device 41 mounted thereon in the y-direction relative to the provisioning location 40a . . . 40b.

The third drive device comprises a traction drive (not shown) connected to the second gantry slide 44. The traction drive comprises an endlessly revolving traction means, which is guided around a deflection wheel and a drive wheel coupled with an electric actuating motor. A clockwise or counter-clockwise rotating motion of the drive wheel moves the gantry arm 45 and transfer device 41 mounted thereon in the z-direction relative to the provisioning location 40a . . . 40b.

The adjustment movements of the first gantry slide 43, the second gantry slide 44, the gantry arm 45 and/or the transfer device 41 can be detected by the displacement measurement devices not depicted. Here, the measurement method of absolute and incremental displacement measurement is utilized.

In the course of the unloading movement, the article carrier 3, partial article carrier stack or article carrier stack 8 is picked up from the transport loading aid 7i by the gripping system, which is provided at the provisioning location 40a . . . 40b, and subsequently transferred onto a target loading aid 34c.

According to an embodiment, which is not depicted, the unloading device 32 (reloading device) may comprise a jointed-arm robot. The jointed-arm robot comprises the gripping system, which is described above and movable relative to a robot base, by means of which individual article carriers 3, partial article carrier stacks or "unamended" article carrier stacks 8 can be transferred from the first transport loading aid 7i/second transport loading aid 7i onto the target loading aid 34c.

As schematically depicted in FIG. 1, the order fulfillment facility 1a comprises an order-processing computer 46 for detecting picking orders and for determining articles 2 which are required for the picking order. In this regard, a picking order comprises one order line (for example six article carriers 3 with a first article 2) or multiple order lines (for example three article carriers 3 with a first article 2 and three article carriers 3 with a second article 2). A sales order comprises at least one picking order. The picking orders are present in the form of data sets and are electronically detected by the order-processing computer 46 and transmitted to a control system 47. Each picking order comprises one or multiple order lines. If the picking order specifies multiple order lines, different articles 2 are needed. Each order line has at least specifications on a number of pieces of an ordered article 2 and on a type of article.

For transporting the empty transport loading aids 7 and transport loading aids 7 loaded with article carrier stacks, autonomously moveable, steerable transport vehicles 9 (of a driverless transport system) are used, which are automatically controlled by a superordinate main computer. The control system 47 may comprise said main computer.

Figure 3:
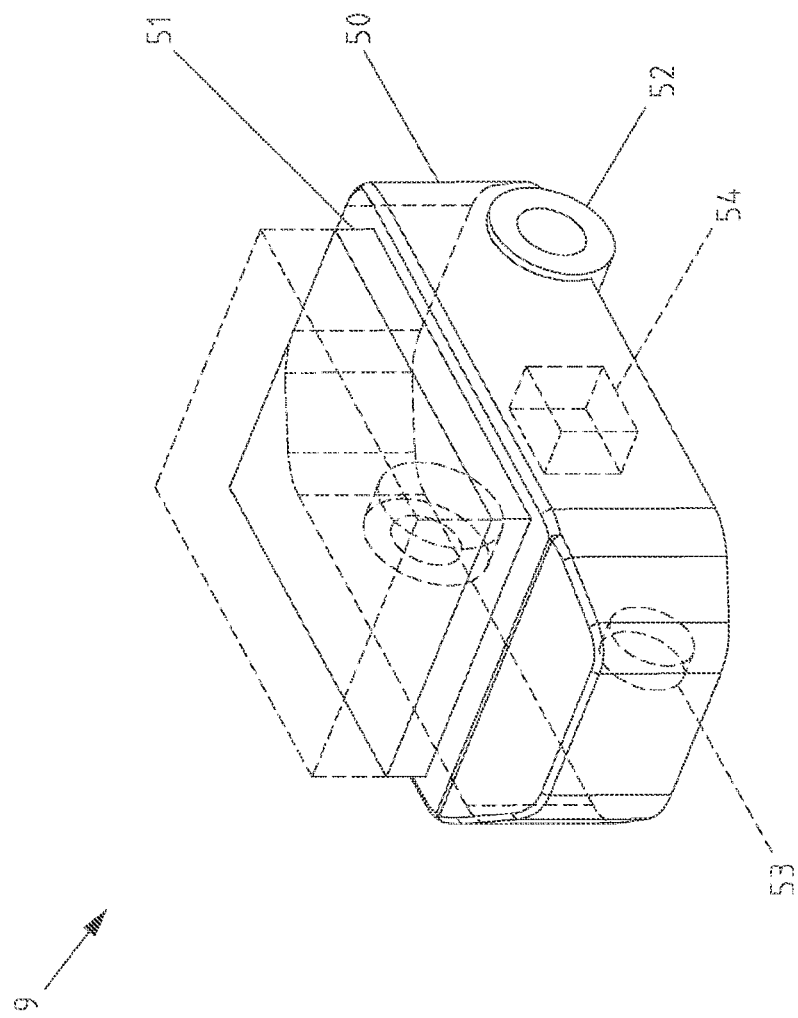
FIG. 3 a transport vehicle (automated guided vehicle) in a perspective view.

FIG. 3 shows a possible embodiment of one of the autonomously moveable, steerable transport vehicles 9. The transport vehicle 9 is configured as a floor conveyor.

The transport vehicle 9 comprises a chassis 50 with a drive unit and a loading platform 51 arranged on the underframe 50 for picking up/discharging/transporting a mobile (non-stationary) transport loading aid 7 and/or a mobile (non-stationary) transport loading aid 107 and/or a mobile (non-stationary) transport loading aid 150 and/or a mobile (non-stationary) stack loading aid 100a and/or a mobile (non-stationary) stack loading aid 100b. The drive unit comprises wheels 52, 53 rotatably mounted on the chassis 50, of which at least one of the wheels 52 is coupled with a drive (not depicted) and at least one of the wheels 53 can be steered. It is also possible for both wheels 52 to be coupled with the drive and be driven by it. However, the transport vehicle 9 may also comprise four wheels, of which two wheels can be steered.

According to the shown embodiment, the loading platform 51 is mounted on the chassis 50 so as to be adjustable between an initial position (represented in continuous lines) and a transport position (represented in dashed lines). In the initial position, a transport loading aid 7, 7a . . . 7i placed on the base of the order fulfillment facility 1a, in particular on a buffer surface 30, 36, of the storage surface 31, in the waiting zone 37 or at the provisioning location 16a, 16b, 40a, 40b, can be driven under, in order to accommodate said transport loading aid 7, 7a . . . 7i on the loading platform 51. If the loading platform 51 is adjusted out of the initial position in the direction of the transport position, a transport loading aid 7, 7a . . . 7i placed on the base can be lifted and subsequently transported. In the transport position, the transport loading aid 7, 7a . . . 7i is lifted off the base of the order fulfillment facility 1a and it can be transported between the delivery zone 4, storage zone 5 and the order processing zone 6. If the loading platform 51 is adjusted out of the transport position in the direction of the initial position, the transport loading aid 7, 7a . . . 7i can be placed on the base.

The transport vehicle 9 further comprises a travel control 54, represented schematically in dashed lines, for receiving commands from the superordinate main computer and for controlling/regulating the movements of the autonomous transport vehicle 9. The travel control 54 may also comprise means for (wirelessly) transfer data to and from the transport vehicle 9. Finally, the transport vehicle 9 comprises sensors, which are not shown, for detecting the environment of the autonomous transport vehicle 9 and for spatial orientation. The drive of the drive unit and the sensors are connected to the travel control 54.

FIGS. 4a and 4b show a first embodiment of a transport loading aid 7. FIG. 4a shows the unloaded, empty transport loading aid 7 and FIG. 4b shows the loaded transport loading aid 7. The transport loading aid 7 comprises a base 55 and side walls 56a, 56b, 56c connected thereto for the stabilization of the position of the article carrier stack 8 and a loading and unloading opening 57 located opposite the side wall 56c. The side walls 56a, 56b, 56c are preferably designed essentially at the height of the article carrier stack 8, however at least at a sufficient height for the topmost article carrier 3 in the article carrier stack 8 to be surrounded by the side walls 56a, 56b, 56c at least in some regions. Preferably, the loading and unloading opening 57 extends over the entire height of the side walls 56a, 56b.

The transport loading aid 7 may comprise first side walls 56a, 56b running in parallel to one another or (as shown) first side walls 56a, 56b diverging in the direction towards the loading and unloading opening 57. The latter embodiment allows loading and/or unloading the transport loading aid 7 easily. The second side wall 56c extends between the first side walls 56a, 56b and is arranged in the edge region of the base 55 such that the side walls 56a, 56b, 56c delimit a single accommodating shaft in which the article carrier stack 8 can be accommodated for transport/for storage.

The base 55 comprises on its upper side a placing surface 58, on which the article carrier stack 8 can be placed, and on its bottom side a transport surface 59, against which the loading platform 51 of the transport vehicle 9 can be placed.

Additionally, the transport loading aid 7 may comprise adjustable feet 60 which are affixed to the base 55. The transport loading aid 7 is placed via the adjustable feet 60 on the base. In an embodiment that is not shown, wheels instead of adjustable feet 60 may also be provided on the base 55.

In the different embodiments of the order fulfillment facilities 1*a*, 1*b*, 1*c*, the transport loading aid 7 described in FIGS. 4*a* and 4*b* is used. It is self-evident that the embodiments of the transport loading aids 7', 7", 107 described in the following can also be used in the order fulfillment facilities 1*a*, 1*b*, 1*c*.

FIGS. 5*a* and 5*b* show a second embodiment of a transport loading aid 7'. FIG. 5*a* shows the unloaded, empty transport loading aid 7' and FIG. 5*b* shows the loaded transport loading aid 7'. Such a transport loading aid 7' can provide multiple article carrier stacks 8, 8', 8" consecutively at the provisioning locations 16*a*, 16*b*, 40*a*, 40*b*, 67*a*, 67*b*, 77*a*, 77*b* by a "rotating motion" about the vertical axis. The "rotating motion" is preferably performed by a transport vehicle 9.

The transport loading aid 7' again comprises the base 55 and side walls 56*a*, 56*b*, 56*c* connected thereto, each for the stabilization of the position of article carrier stacks 8 and a first loading and unloading opening 57*a* located opposite the side wall 56*c* on a first side, and a second loading and unloading opening 57*b* located opposite the side wall 56*c* on a second side. The side walls 56*a*, 56*b*, 56*c* are preferably designed essentially at the height of the article carrier stack 8, however at least at a sufficient height for the topmost article carrier 3 in the article carrier stack 8 to be surrounded by the side walls 56*a*, 56*b*, 56*c* at least in some regions. Preferably, the first/second loading and unloading opening 57 each extend over the entire height of the side walls 56*a*, 56*b*.

The transport loading aid 7' can comprise first side walls 56*a*, 56*b* running in parallel to one another. It proves to be advantageous if the first side walls 56*a*, 56*b* are configured having lead-in chamfers 61 for making an easy loading and/or unloading of the transport loading aid 7' possible. The second side wall 56*c* extends between the first side walls 56*a*, 56*b* and is arranged in the center region of the base 55 such that the side walls 56*a*, 56*b*, 56*c* delimit two accommodating shafts, in each of which at least one article carrier stack 8 can be accommodated for transport/for storage. In the depicted embodiment, one article carrier stack 8 with a base area of the article carriers of 600 mm×400 mm is accommodated in the first accommodation shaft, and two article carrier stacks 8 each with a base area of the article carriers of 300 mm×400 mm are accommodated in the second accommodation shaft. This transport loading aid 7' can transport multiple article carrier stacks 8 simultaneously. In principle, however, the side wall 56*c* could also be omitted, so that only one accommodation shaft is present, in which one or more article carrier stacks 8 can be accommodated.

The base 55 again comprises on its upper side a placing surface 58, on which the article carrier stacks 8 can be placed, and on its bottom side a transport surface 59, against which the loading platform 51 of the transport vehicle 9 can be placed.

Additionally, the transport loading aid 7' may comprise adjustable feet 60 which are affixed to the base 55. The transport loading aid 7' is placed via the adjustable feet 60 on the base. In an embodiment that is not shown, wheels instead of adjustable feet 60 may also be provided on the base 55.

Figure 6B:
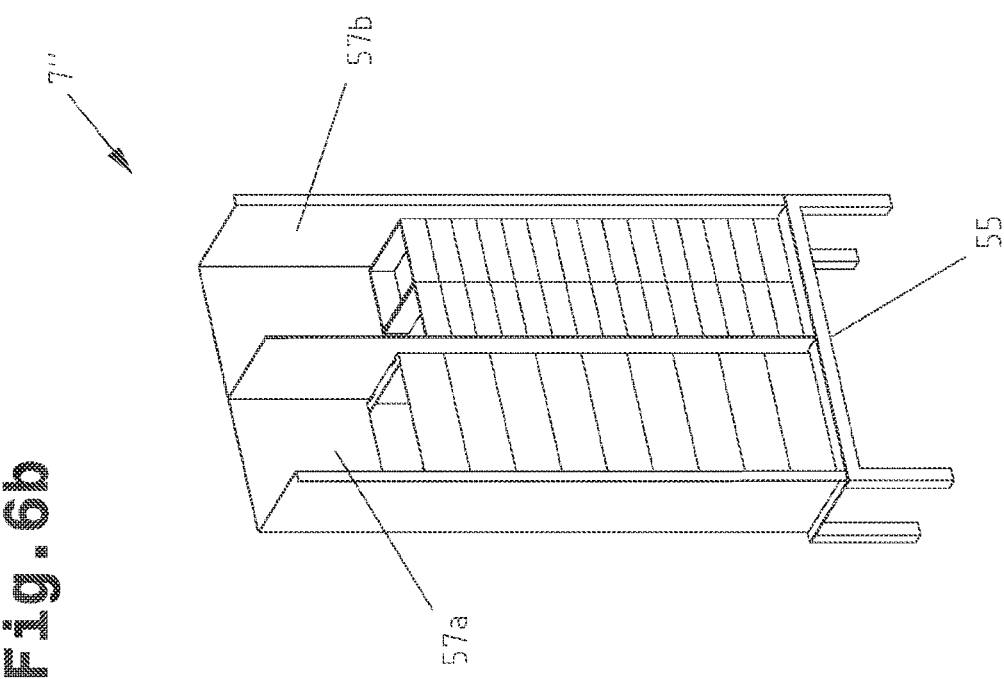
FIGS. 6a, 6b a third embodiment of an (non-loaded) transport loading aid without article carriers, and a (loaded) transport loading aid with article carriers, in a perspective view.
Figure 6A:
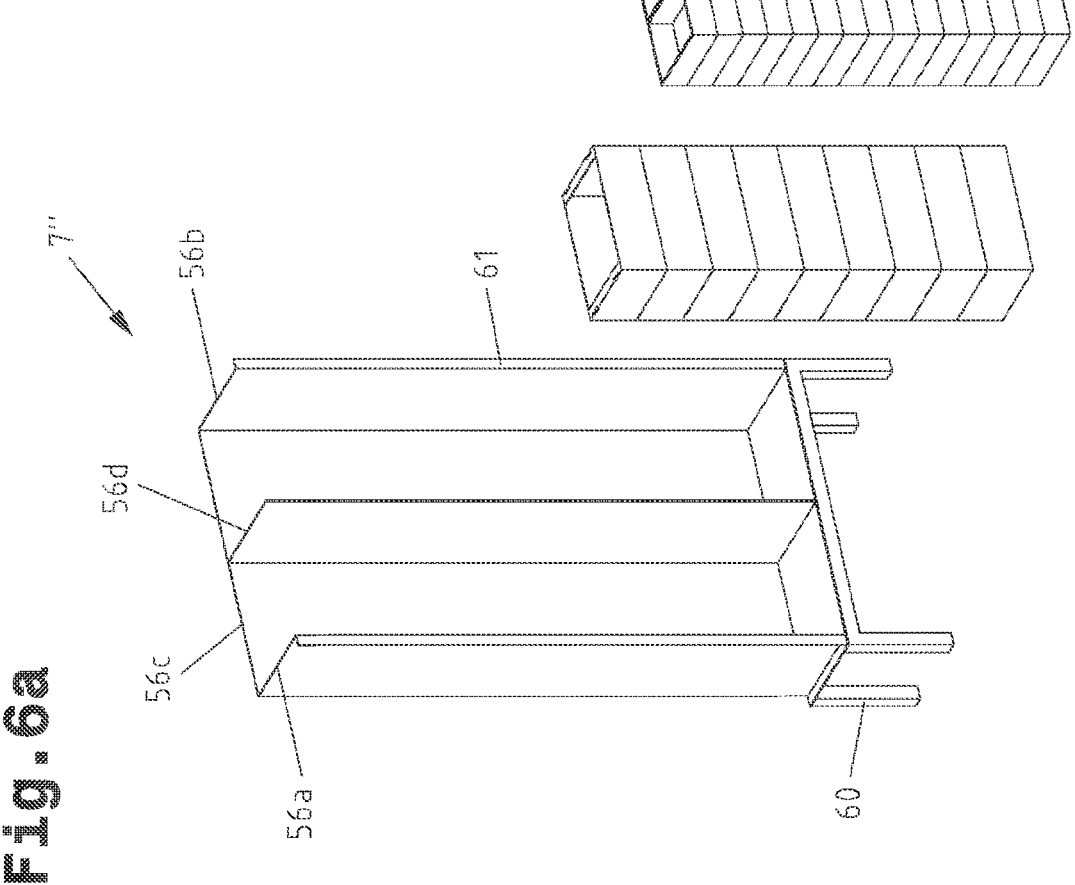

FIGS. 6*a* and 6*b* show a third embodiment of a transport loading aid 7". FIG. 6*a* shows the unloaded, empty transport loading aid 7" and FIG. 6*b* shows the loaded transport loading aid 7". Such a transport loading aid 7' can provide multiple article carrier stacks 8, 8', 8" consecutively at the provisioning locations 16*a*, 16*b*, 40*a*, 40*b*, 67*a*, 67*b*, 77*a*, 77*b* by a short "offset motion". The "offset motion" is preferably performed by a transport vehicle 9.

The transport loading aid 7" again comprises the base 55 and side walls 56*a*, 56*b*, 56*c*, 56*d* connected thereto, each for the stabilization of the position of article carrier stacks 8 and loading and unloading openings 57*a*, 57*b* located opposite the side wall 56*c* on a single side. The side walls 56*a*, 56*b*, 56*c*, 56*d* are preferably designed essentially at the height of the article carrier stack 8, however at least at a sufficient height for the topmost article carrier 3 in the article carrier stack 8 to be surrounded by the side walls 56*a*, 56*b*, 56*c*, 56*d* at least in some regions. Preferably, the first/second loading and unloading opening 57 each extend over the entire height of the side walls 56*a*, 56*b*, 56*d*.

The transport loading aid 7" may comprise outer first side walls 56*a*, 56*b* running in parallel to one another and a parallel inner side wall 56*d*. The second side wall 56*c* extends between the first side walls 56*a*, 56*b*, 56*d*. The inner first side wall 56*d* is arranged in the center region of the base 55 such that the side walls 56*a*, 56*b*, 56*c*, 56*d* delimit two accommodating shafts, in each of which at least one article carrier stack 8 can be accommodated for transport/for storage. In the depicted embodiment, one article carrier stack 8 with a base area of the article carriers of 600 mm×400 mm is accommodated in the first accommodation shaft, and two article carrier stacks 8 each with a base area of the article carriers of 300 mm×400 mm are accommodated in the second accommodation shaft. This transport loading aid 7" can transport multiple article carrier stacks 8 simultaneously.

It proves to be advantageous if the outer first side walls 56*a*, 56*b* and possibly also the inner first side wall 56*d* are configured having lead-in chamfers (not depicted) for making an easy loading and/or unloading of the transport loading aid 7" possible.

The base 55 again comprises on its upper side a placing surface 58, on which the article carrier stacks 8 can be placed, and on its bottom side a transport surface 59, against which the loading platform 51 of the transport vehicle 9 can be placed.

It should also be noted at this point that the transport loading aid 7, 7', 7" may have centering elements (not depicted) on the first side walls 56*a*, 56*b*, 56*d* or on the first side walls 56*a*, 56*b*, 56*d* and on the second side wall 56*c* and facing the respective accommodating shaft, which centering elements can be used to center the article carriers 3/article carrier stacks 8 and to stabilize the position of the article carriers 3/article carrier stacks 8.

FIG. 7 shows a second embodiment of an order fulfillment facility 1*b* for storing and picking article carriers 3 that contain articles 2 and are stackable. The order fulfillment facility 1*b* again comprises the delivery zone 4, the storage zone 5, the order processing zone 6, a plurality of transport loading aids 7 each for accommodating and stabilizing the position of at least one article carrier stack 8 and a plurality of autonomously moveable, driverless transport vehicles 9 for transporting transport loading aids 7.

This embodiment is different with respect to the order fulfillment facility 1a in that an unloading station separate of the reloading station is provided in the order processing zone 6.

Figure 7A:
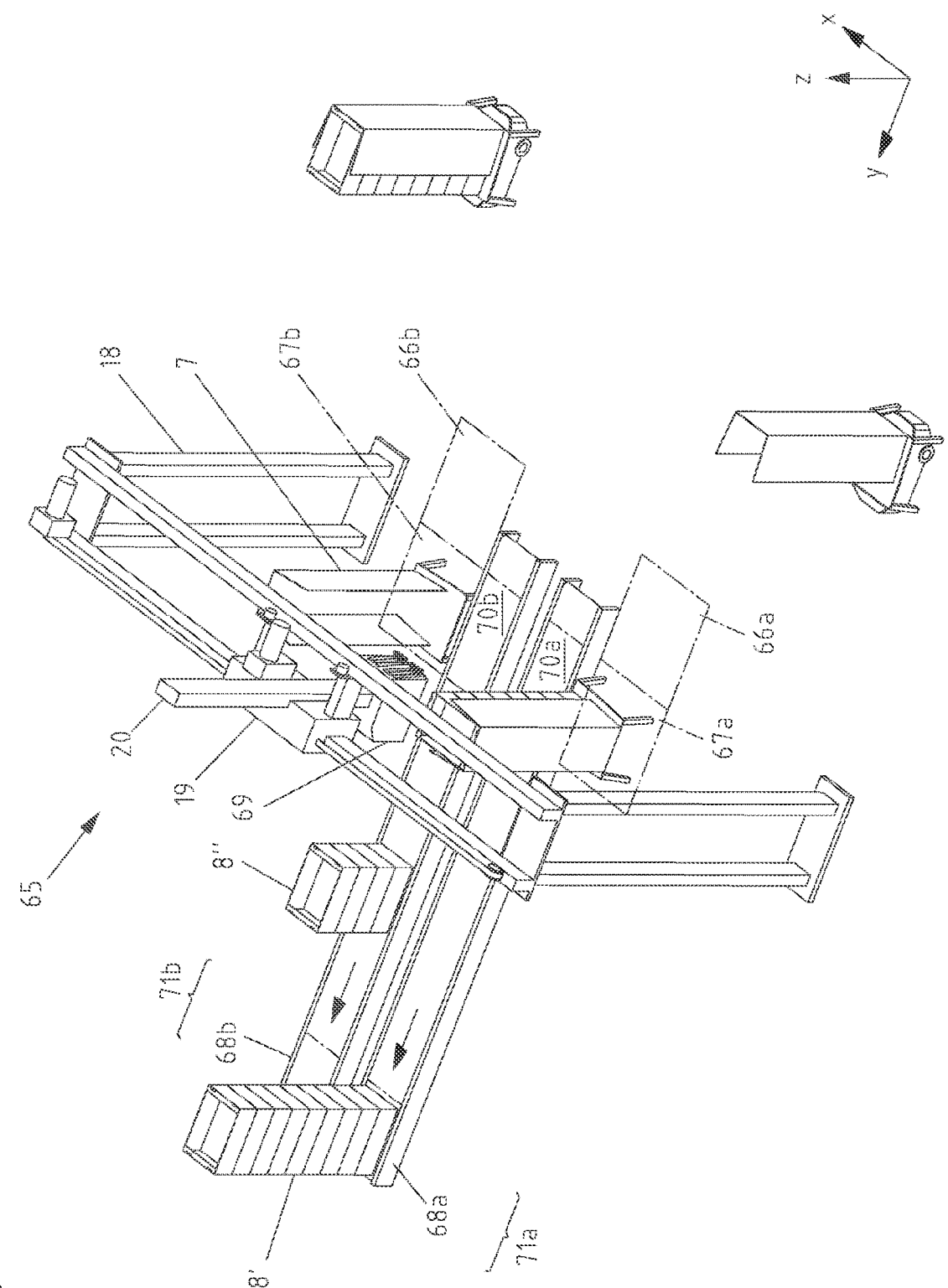
FIG. 7a an unloading station of the order fulfillment facility of FIG. 7 in an enlarged view.

The unloading station shown in an enlarged view in FIG. 7a comprises the at least one automatically operated unloading device 65 (schematically adumbrated). Even though, in the depicted embodiment, the unloading station is shown having a single unloading device 65 for reasons of clarity, the number of unloading devices 65 may vary depending on the required picking performance. For example, the unloading station and/or the order fulfillment facility 1b may have a second unloading device 65, third unloading device 65 etc. These unloading devices 65 are preferably constructed identically.

It also proves advantageous if the unloading station has at least one separate buffer surface 66 near the unloading device 65 or near each unloading device 65. In the depicted embodiment, the unloading device 66 is assigned one buffer surface 66a, 66b per provisioning location 67a, 67b. However, in principle, the unloading station may also comprise only one buffer surface 66. The buffer surface 66 is preferably formed on a base of the order fulfillment facility 1b. This way, it is possible that the loaded (first) transport loading aid(s) 7g, not shown here, are buffered on the buffer surface 66, near the unloading device(s) 65, and are transported as needed to the respective provisioning location 67a, 67b of the unloading device(s) 65 over a short distance using the transport vehicles 9.

The reloading station comprises the at least one reloading device 32 (schematically adumbrated) operated in an automated manner, as described above. Even though, in the depicted embodiment, the unloading station is shown having a single reloading device 32 for reasons of clarity, the number of reloading devices 32 may vary depending on the required picking performance. For example, the reloading station and/or the order fulfillment facility 1b may have a second reloading device 32, third reloading device 32 etc. These reloading devices 32 are preferably constructed identically.

According to this embodiment, a fixed-installation conveying system is arranged between the unloading station and the reloading station, by means of which conveying device article carriers 3, partial article carrier stacks or article carrier stacks 8 are transported from the unloading device 65 or the unloading devices 65 to the reloading device 32 or reloading devices 32. In the course of this, the article carriers 3 required for a picking order are assembled on the fixed-installation conveying system by the unloading device 65.

As is evident in FIG. 7a, the fixed-installation conveying system comprises a first conveying device 68a for supplying article carriers 3, partial article carrier stacks or article carrier stacks 8 and/or a second conveying device 68b for supplying article carriers 3, partial article carrier stacks or article carrier stacks 8. The second conveying device 68b for supplying article carriers 3, partial article carrier stacks or article carrier stacks 8 is optional and may also be omitted.

The schematically shown unloading device 65 comprises a first provisioning location 67a for the loaded first transport loading aid 7, an (optional) second provisioning location 67b for the loaded second transport loading aid 7 and a transfer device 69 movable relative to the provisioning location 67a, 67b for unloading the transport loading aid 7 provided at the provisioning location 67a, 67b. The transport loading aid 7 at the provisioning location 67a is yet to be unloaded while the transport loading aid 7 at the provisioning location 67b has already been unloaded. During the unloading operation, an article carrier 3, partial article carrier stack or the article carrier stack 8 is transferred from the first transport loading aid 7 to a first take-over location 70a and possibly an article carrier 3, partial article carrier stack or the article carrier stack 8 is transferred from the second transport loading aid 7 to a second take-over location 70b.

The first take-over location 70a and the second take-over location 70b are formed on the fixed-installation conveying system. In concrete terms, the first take-over location 70a is formed on the first conveying device 68a and the second take-over location 70b is formed on the second conveying device 68b. In case the second conveying device 70b is not provided, only the first take-over location 70a is provided. The first provisioning location 67a and the first take-over location 70a are arranged so as to be located opposite one another. The optional (second) provisioning location 70b and the optional (second) take-over location 70b are arranged so as to be located opposite one another. The transfer device 69 is arranged above the conveying device 68a, 68b.

The transfer device 69 may for example be formed by a gripping system. The gripping system may comprise for example a base body, a vacuum suction unit with at least one suction gripper or multiple suction grippers arranged on top of one another and a support base movably mounted on the base body, as described above and transferable to the unloading device 65.

Moreover, the gripping system may also be configured such that a gripping unit acts according to the positive engagement principle and/or friction principle and grips an individual article carrier 3, article carrier partial stack or article carrier stack 8 in a positively engaging or friction-type manner.

According to a first embodiment, the unloading device 65 may specifically comprise a gantry robot which constructively corresponds to the loading device 13. Gantry robots are understood to be industrial robots, which in their base axes are constructed from linear axles. Using a line gantry is sufficient for loading.

The gantry robot comprises vertical uprights, longitudinal beams and transverse beams, which are connected to one another, forming a support construction 18. Additionally, the gantry robot comprises a gantry slide 19, that is movable in a first direction (x-direction-horizontal movement) along a guide assembly via a first drive device, and a gantry arm 20 arranged on the gantry slide 19. A transfer device 69 is arranged on the gantry arm 20. The first drive device comprises a traction drive connected to the gantry slide 19. The traction drive comprises an endlessly revolving traction means, which is guided around a deflection wheel and a drive wheel coupled with an electric actuating motor. A clockwise or counter-clockwise rotating motion of the drive wheel moves the gantry slide 19 and the transfer device 69 mounted thereon relative to the provisioning location 67a, 67b either in a first unloading direction or second unloading direction (x-direction).

The gantry arm 20 is movable along a guide assembly in a second direction (z-direction-vertical movement) via a second drive device. The transfer device 69 (gripping system) is mounted on the gantry arm 20 so as to be rotatable about a vertical axis.

The adjustment movements of the gantry slide 19, the gantry arm 20 and/or the transfer device 69 can be detected by the displacement measurement devices not depicted. Here, the measurement method of absolute and incremental displacement measurement is utilized.

In the course of the unloading movement, the article carrier 3, partial article carrier stack or article carrier stack 8 is picked up from the transport loading aid 7 by the gripping system, which is provided at the provisioning location 67a, 67b, and subsequently discharged onto the take-over location 70a, 70b.

According to an embodiment, which is not depicted, the unloading device 65 may comprise a jointed-arm robot. The jointed-arm robot comprises a gripping system that is movable relative to a robot base, by means of which gripping system an article carrier 3, partial article carrier stack or an "unamended" article carrier stack 8 can be transferred from the first transport loading aid 7/second transport loading aid 7 onto the take-over location 70a, 70b.

After the unloading operation, the article carriers 3, partial article carrier stacks or article carrier stacks 8 are transported, by the fixed-installation conveying system, in particular the first conveying device 68a and/or second conveying device 68b, from the unloading device(s) 65 to the automatically operated reloading device(s) 32 (palletizing device(s)), and provided at one or multiple provisioning locations 71a, 71b on the fixed-installation conveying system.

The reloading device 32 can take over the article carriers 3, partial article carrier stacks or article carrier stacks 8 successively from the provisioning location/the provisioning locations 70a . . . 70b with the transfer device 41 (gripping system) in the manner described above and subsequently place them on the target loading aid 34c.

It is noted at this point that according to this embodiment as well, the reloading device 32 can be formed for example by the gantry robot or jointed-arm robot described above. To avoid repetition reference is made to the above disclosure.

FIG. 8 shows a third embodiment of an order fulfillment facility 1c for storing and picking article carriers 3 that contain articles 2 and are stackable. The order fulfillment facility 1c again comprises the delivery zone 4, the storage zone 5, the order processing zone 6, a plurality of transport loading aids 7 each for accommodating and stabilizing the position of at least one article carrier stack 8 and a plurality of autonomously moveable, driverless transport vehicles 9 for transporting transport loading aids 7.

This embodiment is different with respect to the order fulfillment facility 1a in that an unloading station separate of the reloading station is provided in the order processing zone 6.

The unloading station comprises the at least one unloading device 75 (schematically adumbrated) operated in an automated manner. Even though, in the depicted embodiment, the unloading station is shown having a single unloading device 75 for reasons of clarity, the number of unloading devices 75 may vary depending on the required picking performance. For example, the unloading station and/or the order fulfillment facility 1c may have a second unloading device 75, third unloading device 75 etc. These unloading devices 75 are preferably constructed identically.

It also proves advantageous if the unloading station has at least one separate buffer surface 76 near the unloading device 75 or near each unloading device 75. In the depicted embodiment, in the unloading device 75, a provisioning location 77a is assigned a buffer surface 76a and a provisioning location 77b is assigned a buffer surface 76b. The buffer surface 76, 76a, 76b is preferably formed on a base of the order fulfillment facility 1c.

This way, on the one hand, it is possible that a loaded transport loading aid 7g, not shown here, is buffered on the buffer surface 76a, near the unloading device(s) 75, and is transported as needed to the respective provisioning location 77a of the unloading device(s) 65 over a short distance by a transport vehicle 9. On the other hand, it is possible that an empty transport loading aid 7d, not shown here, is buffered on the buffer surface 76b, near the unloading device(s) 75, and is transported as needed to the respective provisioning location 77b of the unloading device(s) 75 over a short distance by a transport vehicle 9.

The reloading station comprises at least one reloading device 32 (schematically adumbrated) operated in an automated manner. Even though, in the depicted embodiment, the unloading station is shown having a single reloading device 32 for reasons of clarity, the number of reloading devices 32 may vary depending on the required picking performance. For example, the reloading station and/or the order fulfillment facility 1c may have a second reloading device 32, third reloading device 32 etc. These reloading devices 32 are preferably constructed identically.

To avoid repetition, reference is made to the above description with regard to the disclosure of the reloading station.

There is merely a difference in the provision of the article carrier stacks with the transport loading aids 7 at the first provisioning location 40a and possibly second provisioning location 40b. While, according to the first embodiment (FIG. 1), the article carrier stacks are provided at the first provisioning location 40a and possibly second provisioning location 40b as article carrier stacks 8 containing articles of just one type, according to the embodiment shown (FIG. 8), a first transport loading aid 7i with a first pre-picked article carrier stack 8' is provided at the first provisioning location 40a, and possibly, a second transport loading aid 7i, not shown, with a second pre-picked article carrier stack 8' is provided at the second provisioning location 40b.

Picking article carriers 3 according to a picking order to form an article carrier stack 8' takes place in the unloading station using at least one automatically operated unloading device 75.

The schematically depicted unloading device 75 comprises at least one first provisioning location 77a for the first transport loading aid 7a, which contains article carriers 3 containing articles of just one type and from which article carriers 3 can be removed according to a picking order, and at least one second provisioning location 77b for the second transport loading aid 7b, onto which article carriers 3 are discharged according to a picking order, and a transfer device 84, which is movable relative to the provisioning location 77a, 77b, for unloading the transport loading aid 7a provided at the provisioning location 77a and for loading the transport loading aid 7b provided at the provisioning location 77b. The first provisioning location 77a and the second provisioning location 77b are arranged so as to be located opposite one another. The transfer device 84 is arranged above the provisioning locations 77a, 77b.

If a picking order comprises different articles 2, article carriers 3 are successively taken out of different transport loading aids 7a. In order to do so, the transport loading aids 7a can be provided successively at the provisioning location 77a, and the required article carriers 3 can be unloaded successively and discharged onto the transport loading aids 7b. In this regard, individual article carriers 3 or partial article carrier stacks can be taken from the first transport loading aid 7a and discharged onto the second transport loading aid 7b. If a picking order requires an entire article carrier stack 8, it is removed from the storage area 5 using a transport vehicle 9, as described above, and transported to the order processing zone 6 and provided at a provisioning location 40a . . . 40b.

The transfer device 84 may for example be formed by a gripping system. The gripping system may comprise for example a base body, a vacuum suction unit with at least one suction gripper or multiple suction grippers arranged on top of one another and a support base movably mounted on the base body, as described above and transferable to the unloading device 75.

Moreover, the gripping system may also be configured such that a gripping unit acts according to the positive engagement principle and/or friction principle and grips an individual article carrier 3 or partial article carrier stack in a positively engaging or friction-type manner.

According to a first embodiment, the unloading device 75 may specifically comprise a gantry robot.

The gantry robot comprises vertical uprights, longitudinal beams and transverse beams, which are connected to one another, forming a support construction 81. Additionally, the gantry robot comprises a gantry slide 82, that is movable in a first direction (x-direction-horizontal movement) along a guide assembly via a first drive device, and a gantry arm 83 arranged on the gantry slide 82. A transfer device 84 is arranged on the gantry arm 83. The first drive device comprises a traction drive connected to the gantry slide 82. The traction drive comprises an endlessly revolving traction means, which is guided around a deflection wheel and a drive wheel coupled with an electric actuating motor. A clockwise or counter-clockwise rotating motion of the drive wheel will move the gantry slide 82 and the transfer device 84 mounted thereon relative to the provisioning location 77 in an unloading direction (x-direction).

The gantry arm 83 is movable along a guide assembly in a second direction (z-direction-vertical movement) via a second drive device. The transfer device 84 (gripping system) is mounted on the gantry arm 83 so as to be rotatable about a vertical axis.

The gantry robot may comprise a displacement measurement device not depicted, by means of which the readjustment movements of the gantry slide 82, gantry arm 83 and/or of the transfer device 84 are captured. Here, the measurement method of absolute and incremental displacement measurement is utilized.

In the course of the unloading movement, the article carrier 3 or partial article carrier stack is picked up by the gripping system from the transport loading aid 7a, which is provided at the provisioning location 77a and contains an article carrier stack 8 containing articles of just one type, and is subsequently discharged in the course of the loading movement of the article carriers 3 or partial article carrier stacks onto the transport loading aid 7b, which is provided at the provisioning location 77b and in which article carriers 3 are picked.

After the loading operation, the transport loading aid 7b with the pre-picked article carrier stack 8' is transported to the reloading station using a transport vehicle 9 and is provided at the at least one reloading device 32.

According to an embodiment, which is not depicted, the unloading device 75 may comprise a jointed-arm robot. The jointed-arm robot comprises a gripping system that is movable relative to a robot base, by means of which gripping system an article carrier 3 or partial article carrier stack can be removed from the first transport loading aid 7a and transferred to the second transport loading aid 7b.

In the following, the method for storing and picking article carriers 3 that contain articles 2 and are stackable in the order fulfillment facility 1a (first embodiment) is described.

The method comprises the steps:
i) providing autonomously moveable, driverless transport vehicles 9,
ii) providing transport loading aids 7 each for receiving and stabilizing the position of at least one article carrier stack 8 of multiple article carriers 3 arranged on top of one another, wherein the transport loading aids 7 comprise mobile, empty transport loading aids 7,
iii) providing article carrier stacks 8 of multiple article carriers 3 arranged on top of one another in a delivery zone 4,
iv) transporting empty transport loading aids 7 using the autonomously moveable, driverless transport vehicles 9 to a loading station and providing one or multiple empty (first) transport loading aid(s) 7 either on one or on multiple automatically operated loading device(s) 13 or on a buffer surface 30 close to the loading device(s) 13,
v) loading one of the empty transport loading aids 7, which is provided at the automatically operated loading device 13, with at least one article carrier stack 8 from the delivery zone 4 using the automatically operated loading device 13,
vi) transporting the transport loading aid 7 loaded with at least one article carrier stack 8 from the loading station to a storage zone 5 using the autonomously moveable, driverless transport vehicle 9,
vii) placing the transport loading aid 7 loaded with at least one article carrier stack 7 on a storage surface 31 in the storage zone 5,
viii) storing the transport loading aids 7 loaded with at least one article carrier stack 8 or the transport loading aids 7 loaded with individual article carriers 3 in the storage zone 5,
ix) processing a picking order comprising the steps:
transporting one or multiple transport loading aid(s) 7 containing the article carriers 3 required for a picking order from the storage zone 5 to an unloading station and providing said transport loading aid(s) 7 either at one or at multiple automatically operated unloading device(s) 32 or on a buffer surface 36 close the unloading device(s) 32 using one or multiple autonomously moveable, driverless transport vehicle(s) 9,
unloading one or multiple ones of the transport loading aid(s) 7, which is (are) provided at the automatically operated unloading device(s) 32, by removing the article carriers 3 required for processing the mentioned picking order, and
assembling the article carriers 3 on one or multiple target loading aid 34 using the unloading device(s) 32 for the mentioned picking order by the article carrier 3 or the at least one article carrier stack 8 being removed from the provided transport loading aid(s) 7 using the unloading device 32 and transferred from said unloading device 32 to the target loading aid(s) 34.

Providing autonomously moveable, driverless transport vehicles 9 according to step i) may comprise providing transport vehicles 9, which are used exclusively for transporting the transport loading aid(s) 7 between the delivery zone 4 (loading station) and the storage zone 5, and may comprise providing transport vehicles 9, which are used exclusively for transporting the transport loading aid(s) 7 between the storage zone 5 and the order processing zone 6 (removal station). However, step i) may just as well comprise providing transport vehicles 9, which are used both for transporting the transport loading aid(s) 7 between the delivery zone 4 (loading station) and the storage zone 5 and for transporting the transport loading aid(s) 7 between the storage zone 5 and the order processing zone (removal zone).

Providing transport loading aids 7 according to step ii) may comprise providing structurally identical transport loading aids 7 or structurally different transport loading aids 7. Likewise, structurally different transport loading aids 7 may be used in the order fulfillment facility 1*a*.

On the one hand, step iii) may comprise providing separate article carrier stacks 8 without pallets or roll container (delivery load carriers).

On the other hand, step iii) may comprise providing article carrier stacks 8 as article carrier stack groups 10 on pallets or roll containers (delivery load carriers), which are previously fed to a depalletizing station in order to separate the article carrier stacks 8 out of an article carrier stack group 10.

For example, the article carriers 3 may carry fruit or vegetables, wherein a first article carrier stack group 10 contains a first type of vegetable and a second article carrier stack group 10 contains a second type of vegetable.

Step iv) may comprise transporting empty transport loading aids 7 using the autonomously moveable, driverless transport vehicles 9 to a loading station and directly providing (an) empty loading aid(s) 7 on one or multiple automatically operated loading device(s) 13.

However, step iv) may also comprise transporting empty transport loading aids 7 using the autonomously moveable, driverless transport vehicles 9 to a loading station onto a buffer surface 30 close to the loading device(s) 13 and transporting said empty transport loading aid(s) 7 using the autonomously moveable, driverless transport vehicles 9 to the loading device(s) 13 and providing said empty transport loading aid(s) 7 on one or multiple automatically operated loading device(s) 13.

Providing an empty transport loading aid 7 on one or multiple automatically operated loading device(s) 13 according to step iv) may comprise the following step:

placing the empty transport loading aid 7 at a provisioning location 16*a*, 16*b* having the relevant loading device 13 and having the transport vehicle 9 remain at the provisioning location 16*a*, 16*b* during the loading operation of the empty transport loading aid 7 according to step v), or placing the empty transport loading aid 7 at a provisioning location 16*a*, 16*b* having the relevant loading device 13 and subsequently having the transport vehicle 9 move on from the provisioning location 16*a*, 15*b*, thus even before the start or during the loading operation of the empty transport loading aid 7 according to step v).

The loading of the empty transport loading aids 7 according to step v) may comprise loading one of the empty transport loading aids 7 with at least one article carrier stack 8 and/or loading one of the empty transport loading aids 7 with at least one partial article carrier stack 8 and/or loading one of the empty transport loading aids 7 with individual article carriers 3 and/or a combination thereof.

Step ix) may comprise transporting loaded transport loading aids 7 using the autonomously moveable, driverless transport vehicles 9 from the storage zone 5 (but possibly also from the loading station in the delivery zone 4) to an unloading station and directly providing (a) loaded loading aid(s) 7 on one or multiple automatically operated unloading device(s) 32.

However, step ix) may also comprise transporting loaded transport loading aids 7 using the autonomously moveable, driverless transport vehicles 9 from the storage zone 5 (but possibly also from the loading station in the delivery zone 4) to an unloading station onto a buffer surface 36 close to the unloading device(s) 32 and transporting said loaded transport loading aid(s) 7 using the autonomously moveable, driverless transport vehicles 9 from the buffer surface 36 to the unloading device(s) 32 and providing said loaded transport loading aid(s) 7 on one or multiple automatically operated unloading device(s) 32.

The transport vehicles 9 may also be controlled by the main computer such that they arrive at the unloading station in a sequence provided by the packing order of the article carriers 3 at the target loading aid 34. Thus, a sequencing of the transport loading aids 7 and/or article carrier stacks 8 is achieved.

Providing a loaded transport loading aid(s) 7 on one or multiple automatically operated loading device(s) 32 according to step ix) may comprise the following step:

placing the loaded transport loading aid(s) 7 at a provisioning location 40*a* . . . 40*b* having the relevant unloading device 32 and having the transport vehicle 9 remain at the provisioning location 40*a* . . . 40*b* during the unloading operation of the loaded transport loading aid(s) 7 according to step ix), or placing the loaded transport loading aid(s) 7 at a provisioning location 40*a* . . . 40*b* having the relevant unloading device 32 and subsequently having the transport vehicle 9 move on from the provisioning location 40*a* . . . 40*b*, thus even before the start or during the unloading operation of the loaded transport loading aid(s) 7 according to step ix).

In the following, the method for storing and picking article carriers 3 that contain articles 2 and are stackable in the order fulfillment facility 1*b* (second embodiment) is described.

The method comprises the steps i) to viii) as described above and the step ix) processing a picking order comprising the steps:

transporting one or multiple transport loading aid(s) 7 containing the article carriers 3 required for a picking order from the storage zone 5 to an unloading station and providing said transport loading aid(s) 7 either at one or at multiple automatically operated unloading device(s) 65 or on a buffer surface 66 close the unloading device(s) 65 using one or multiple autonomously moveable, driverless transport vehicle(s) 9, unloading one or multiple ones of the transport loading aid(s) 7, which is (are) provided at the automatically operated unloading device(s) 65, by removing the article carriers 3 required for processing the mentioned picking order, and assembling the article carrier 3 on one or multiple target loading aids 34 using the unloading device(s) 32 for the mentioned picking order by performing the assembly of the article carriers 3 for the mentioned picking order such that the article carriers 3 removed from the article carrier stack 8 at the unloading device(s) 65 or the at least one or the article carrier stack(s) 8 removed at the unloading device(s) 65 is (are) transferred to a fixed-installation conveying system using the provided transport loading aid(s) 7, and the article carrier 3 or article carrier stack 8 is transported from the unloading device(s) 65 to the reloading device(s) 32 using the conveying system and is/are subsequently taken over from the fixed-installation conveying system by means of the reloading device(s) 32 and is/are transferred from it to the target loading aid(s) 34.

In this regard, the fixed-installation conveying system is arranged between the unloading station with the at least one automatically operated unloading station 65 and the reloading station with the at least one automatically operated reloading device 32 (palletizing).

During the unloading operation using the relevant unloading device 65, individual article carriers 3 or a partial article carrier stack (with articles of just one type) are removed from the article carrier stack 8.

The article carriers 3 may be successively transferred onto the fixed-installation conveying system and be transported as separate article carriers 3. In this regard, the article carriers 3 can advantageously be successively discharged onto the fixed-installation conveying system in a sequence provided by the packing order of the article carriers 3 at the target loading aid 34 and be transported to the at least one reloading device 32 successively in said order.

By contrast, article carriers 3 required for a picking order can also be stacked on the fixed-installation conveying system and pre-picked partial article carrier stacks 8" or article carrier stacks 8' can be transported from the unloading device 65 or the unloading devices 65 to the reloading device 32 or reloading devices 32, as shown in an exemplary manner in FIG. 7*a*. In this regard, the article carriers 3 can advantageously be discharged onto the fixed-installation conveying system in a sequence provided by the packing order of the article carriers 3 at the target loading aid 34 such that at least one (pre-picked) partial article carrier stack 8" or article carrier stack 8' is made up of multiple article carriers 3 arranged on top of one another and is then transported to the at least one reloading device 32.

Said packing order may be determined by a computer and considers for example the stability of the article carrier 3 and/or the dimensions of the article carriers and/or the weight of the articles 2/article carriers 3. At the target loading aid 34, heavy article carriers 3 are accommodated at the bottom of the stack while lightweight article carriers 3 are accommodated at the top of the stack. Containers are arranged at the bottom of the stack, cartons at the top of the stack. The control system 47 may comprise said computer.

Step ix) may comprise transporting loaded transport loading aids 7 using the autonomously moveable, driverless transport vehicles 9 from the storage zone 5 (but possibly also from the loading station in the delivery zone 4) to an unloading station and directly providing (a) loaded loading aid(s) 7 on one or multiple automatically operated unloading device(s) 65.

However, step ix) may also comprise transporting loaded transport loading aids 7 using the autonomously moveable, driverless transport vehicles 9 from the storage zone 5 (but possibly also from the loading station in the delivery zone 4) to an unloading station onto a buffer surface 66 close to the unloading device(s) 65 and transporting said loaded transport loading aid(s) 7 using the autonomously moveable, driverless transport vehicles 9 to the unloading device(s) 65 and providing said loaded transport loading aid(s) 7 on one or multiple automatically operated unloading device(s) 65.

Providing a loaded transport loading aid(s) 7 on one or multiple automatically operated loading device(s) 65 according to step ix) may comprise the following step:

placing the loaded transport loading aid(s) 7 at a provisioning location 67*a*, 67*b* having the relevant unloading device 65 and having the transport vehicle 9 remain at the provisioning location 67*a*, 67*b* during the unloading operation of the loaded transport loading aid(s) 7 according to step ix), or placing the loaded transport loading aid(s) 7 at a provisioning location 67*a*, 67*b* having the relevant unloading device 65 and subsequently having the transport vehicle 9 move on from the provisioning location 67*a*, 67*b*, thus even before the start or during the unloading operation of the loaded transport loading aid(s) 7 according to step ix).

In the following, the method for storing and picking article carriers 3 that contain articles 2 and are stackable in the order fulfillment facility 1*c* (third embodiment) is described.

The method comprises the steps i) to viii) as described above and the step ix) processing a picking order comprising the steps:

transporting one or multiple transport loading aid(s) 7 containing the article carriers 3 required for a picking order from the storage zone 5 to an unloading station and providing said transport loading aid(s) 7 either at one or at multiple automatically operated unloading device(s) 75 or on a buffer surface 66 close the unloading device(s) 75 using one or multiple autonomously moveable, driverless transport vehicle(s) 9, unloading one or multiple ones of the transport loading aid(s) 7, which is (are) provided at the automatically operated unloading device(s) 75, by removing the article carriers 3 required for processing the mentioned picking order, and assembling the article carrier 3 on one or multiple target loading aids 34 using of the unloading device(s) 32 for the mentioned picking order by performing the assembly of the article carriers 3 for the mentioned picking order such that the article carriers 3 removed from the article carrier stack 8 at the unloading device(s) 75 or the at least one or the article carrier stack(s) 8 removed at the unloading device(s) 75 is (are) transferred from the provided (first) transport loading aid(s) 7 to at least one mobile, empty (second) transport loading aid 7 comprising the transport loading aids 7, and the at least one loaded (second) transport loading aid 7*k* with the article carrier 3 or (pre-picked) article carrier stack 8' is (are) transported from the unloading device(s) 75 to the reloading device(s) 32 using the autonomously moveable, driverless transport vehicle 9 and is/are subsequently taken over from the (second) transport loading aid(s) 7 using the reloading device(s) 32 and is/are transferred from it to the target loading aid(s) 34.

The article carriers 3 required for a picking order can also be stacked on the (second) transport loading aid(s) 7 and the (second) transport loading aid(s) 7 with the pre-picked article carrier stack 8' can be transported from the unloading device 75 or the unloading devices 75 to the reloading device 32 or reloading devices 32. In this regard, the article carriers 3 can advantageously be discharged onto the (second) transport loading aid(s) 7 in a sequence provided by the packing order of the article carriers 3 at the target loading aid 34.

Said packing order may be determined by a computer and considers for example the stability of the article carrier 3 and/or the dimensions of the article carriers and/or the weight of the articles 2/article carriers 3. At the target loading aid 34, heavy article carriers 3 are accommodated at the bottom of the stack while lightweight article carriers 3 are accommodated at the top of the stack. Containers are arranged at the bottom of the stack, cartons at the top of the stack. The control system 47 may comprise said computer.

Step ix) may comprise transporting loaded (first) transport loading aids 7 using the autonomously moveable, driverless transport vehicles 9 to an unloading station and directly providing (a) loaded (first) transport loading aid(s) 7 on one or multiple automatically operated loading device(s) 75.

However, step ix) may also comprise transporting loaded (first) transport loading aids 7 using the autonomously moveable, driverless transport vehicles 9 to an unloading station onto a buffer surface 76 close to the unloading device(s) 75 and transporting said loaded (first) transport loading aid(s) 7j using the autonomously moveable, driverless transport vehicles 9 from the buffer surface 76 to the unloading device(s) 75 and providing said loaded transport loading aid(s) 7 on one or multiple automatically operated unloading device(s) 75.

The transport vehicles 9 may also be controlled by the main computer such that they arrive at the unloading station in a sequence provided by the packing order of the article carriers 3 at the target loading aid 34. Thus, a sequencing of the (second) transport loading aids 7 and/or article carrier stacks 8' is achieved.

Providing a loaded (first) transport loading aid(s) 7 on one or multiple automatically operated loading device(s) 75 according to step ix) may comprise the following step:
  placing the loaded (first) transport loading aid(s) 7 at a provisioning location 77a, 77b having the relevant unloading device 75 and having the transport vehicle 9 remain at the provisioning location 77a, 77b during the unloading operation of the loaded (first) transport loading aid(s) 7 according to step ix), or
  placing the loaded (first) transport loading aid(s) 7 at a provisioning location 77a, 77b having the relevant unloading device 75 and subsequently having the transport vehicle 9 move on from the provisioning location 77a, 77b, thus even before the start or during the unloading operation of the loaded (first) transport loading aid(s) 7 according to step ix).

Providing an empty (second) transport loading aid(s) 7 on one or multiple automatically operated loading device(s) 75 according to step ix) may comprise the following step:
  placing the empty (second) transport loading aid(s) 7 at a provisioning location 77a, 77b having the relevant unloading device 75 and having the transport vehicle 9 remain at the provisioning location 77a, 77b during the loading operation of the empty (second) transport loading aid(s) 7 according to step ix), or
  placing the empty (second) transport loading aid(s) 7 at a provisioning location 77a, 77b having the relevant unloading device 75 and subsequently having the transport vehicle 9 move on from the provisioning location 77a, 77b, thus even before the start or during the unloading operation of empty (second) transport loading aid(s) 7 according to step ix).

Providing an empty (second) transport loading aid(s) 7 on one or multiple automatically operated loading device(s) 32 according to step ix) may comprise the following step:
  placing the loaded (second) transport loading aid(s) 7 at a provisioning location 40a . . . 40b having the relevant unloading device 32 and having the transport vehicle 9 remain at the provisioning location 40a . . . 40b during the unloading operation of the loaded (second) transport loading aid(s) 7 according to step ix), or
  placing the loaded (second) transport loading aid(s) 7 at a provisioning location 40a . . . 40b having the relevant unloading device 32 and subsequently having the transport vehicle 9 move on from the provisioning location 40a . . . 40b, thus even before the start or during the unloading operation of the loaded (second) transport loading aid(s) 7 according to step ix).

The method for storing and picking articles 2 in the order fulfillment facility 1c can additionally comprise the following steps:
  acquiring picking orders on an order-processing computer 46,
  determining the articles required for one of the picking orders (demand),
  analysis of a stock of those articles 2 which are required for the mentioned picking order, which picking order comprises one or multiple first article carrier(s) 3 containing the article(s) 2 and one or multiple second article carrier(s) 3 containing the article(s),
  assembling the article carriers 3 for the mentioned picking order in consecutive picking steps if a required quantity of an article 2 exceeds the stock of said article 2, wherein
  i) in a first picking step, the (second) transport loading aid 7 is loaded with one or multiple first article carrier(s) 3 at the unloading device 75, and subsequently said (second) transport loading aid 7 is transported from the unloading device 75 to a buffer surface 76 using an autonomously moveable, driverless transport vehicle 9 and is buffered there, and
  ii) in a second picking step, the (second) transport loading aid 7 is transported from the buffer surface 76 to the unloading device 75 using an autonomously moveable, driverless transport vehicle 9 and is provided there, if a required quantity of an article 2 falls below the stock of said article 2, and subsequently the (second) transport loading aid 7 is loaded with one or multiple second article carriers 3,
  transporting the (second) transport loading aid 7 from the unloading device 75 to the reloading device 32 using an autonomously moveable, driverless transport vehicle 9 after steps i) and ii) have been concluded, and
  transferring the article carrier stack 8, 8' onto a target loading aid 34 using the reloading device 32.

The method for storing and picking articles 2 in the order fulfillment facility 1a, 1b, 1c can additionally comprise the step x):
  transporting a transport loading aid 7 from the unloading station back to the storage zone 5 after removing of the article carriers 3, if not all article carriers 3 have been removed from the mentioned transport loading aid 7, or
  transporting a transport loading aid 7 from a first unloading device 32; 65; 75 to a second unloading device 32; 65; 75 after removing of the article carriers 3, if not all article carriers 3 have been removed from the mentioned transport loading aid 7 and if said article carriers 3 are needed at the second unloading device 32; 65; 75 for a picking order, or
  transporting a transport loading aid 7 from the unloading device 32; 65; 75 to a waiting zone 37 in the unloading station 32; 65; 75 after removing of the article carriers 3, if not all article carriers 3 have been removed from the mentioned transport loading aid 7 and if said article carriers 3 are needed at the mentioned unloading device 32; 65; 75 or one of the unloading devices 32; 65; 75 for an already advised picking order, or transporting an (empty) transport loading aid 7 back to the loading station after removing of the article carrier stack 8, 8' and providing the transport loading aid 7 either at the automatically operated loading device 13 or on the buffer surface 30, if all article carriers 3 have been removed from the mentioned transport loading aid 7.

The method for storing and picking articles 2 in the order fulfillment facility 1a, 1b, 1c can additionally comprise the following steps:

providing a cleaning system with an automatically operated cleaning robot 90 (as schematically depicted in FIG. 1), and cleaning the transport loading aids 7 and/or the base in the loading station and/or unloading station (therefore the provisioning locations 16a, 16b, 40a, 40b, 71a, 71b, 77a, 77b, the buffer surface 36, 67, 76 and according to the first embodiment the waiting zone 37) and storage surface 31 in the storage zone 5 with the cleaning robot 90.

As depicted only in FIG. 1 and explained with the example of the first picking system 1a, the method for storing and picking articles 2 may additionally comprise the following steps:

providing a first temperature zone 91a in the storage zone 5, in which the transport loading aids 7 with the at least one article carrier stack 8 of article carriers 3 stacked on top of one another and containing articles 2 of a first article group, providing a second temperature zone 91b in the storage zone 5, in which the transport loading aids 7 with the at least one article carrier stack 8 of article carriers 6 stacked on top of one another and containing articles 2 of a second article group, definition of a first article group and of a second article group, to which first article group articles 2 of a first storage temperature are assigned and to which second article group articles 2 of a second storage temperature are assigned, and detecting data containing data on the first article group, in particular a first storage temperature for the articles 2, and the second article group, in particular a second storage temperature for the articles 2, on a computer (which is connected to the control system 47), identifying the article carriers 3 and/or article carrier stacks 8 and/or transport loading aids 7 using a detection device (not depicted) provided in the delivery zone 4 by reading a data carrier 92a, 92b, 92c (RFID, barcode) (only depicted in FIG. 4b), which data carrier 92a, 92b, 92c is affixed in each case on the article carriers 3 and/or article carrier stacks 8 and/or transport loading aids 7, selectively transporting the (first) transport loading aids 7, each loaded at the loading station in step v) with at least one article carrier stack 8, using the autonomously moveable, driverless transport vehicles 9 either in the first temperature zone 91a or second temperature zone 91b, storing the (first) transport loading aids 7 with the at least one article carrier stack 8 of article carriers 3 stacked on top of one another and containing articles 2 of the first article group in the first temperature zone 91a, and storing the (first) transport loading aids 7 with the at least one article carrier stack 8 of article carriers 3 stacked on top of one another and containing articles 2 of the second article group in the second temperature zone 91b.

The method for storing and picking articles 2 can additionally comprise the following steps:

transporting one or multiple transport loading aid(s) 7 containing the article carriers 3 required for a first picking order from the first temperature zone 91a and transporting one or multiple transport loading aid(s) 7 containing the article carriers 3 required for a second picking order from the second temperature zone 91b to the unloading station using a shared, automatically operated unloading device 32; 65; 75, providing the mentioned transport loading aid(s) 7 for the first picking order either at the automatically operated unloading device 32; 65; 75 or on a buffer surface 36; 66; 76 near the unloading device 32; 65; 75 using the autonomously moveable, driverless transport vehicle(s) 9, providing the mentioned transport loading aid(s) 7 for the second picking order either at the automatically operated unloading device 32; 65; 75 or on a buffer surface 36; 66; 76 near the unloading device 32; 65; 75 using the autonomously moveable, driverless transport vehicle(s) 9, and sequentially assembling article carrier stacks 8 on a first target loading aid 34 (outgoing article unit) with multiple article carrier stacks 8 of article carriers 3 stacked on top of one another and containing articles 2 of a first article group, and assembling article carrier stacks 8 on a second target loading aid 34 (outgoing article unit) with multiple article carrier stacks 8 of article carriers 3 stacked on top of one another and containing articles 2 of a second article group at the removal station with a shared, automatically operated removal device 65; 75 and/or reloading station with a shared, automatically operated reloading device 32.

FIGS. 9a and 9b show a fourth embodiment of an order fulfillment facility 1d for storing and picking article carriers 3 that contain articles 2 (as only shown in FIG. 11a for reasons of clarity) and are stackable. FIGS. 10a to 10d show individual cutouts from the order fulfillment facility 1d. The order fulfillment facility 1d also comprises a delivery zone 4, a storage zone 5, an order processing zone 6, a plurality of transport loading aids 107 each for accommodating and stabilizing the position of at least one article carrier stack 8 and a plurality of autonomously moveable, driverless transport vehicles 9 for transporting transport loading aids 107. The article carrier stack 8 is formed by multiple article carriers 3 arranged (stacked) on top of one another. Contrary to the first, second and third embodiment according to FIGS. 1 to 8, 8a, the order fulfillment facility 1d additionally comprises stack loading aids, as they are shown in more detail in FIGS. 12a to 12c, each for stabilizing the position of an order stack 101 made up of the article carriers 3 according to a picking order. It is noted that the first, second and third embodiment of the order fulfillment facility 1a, 1b, 1c may also comprise such stack loading aids.

Figure 12A:
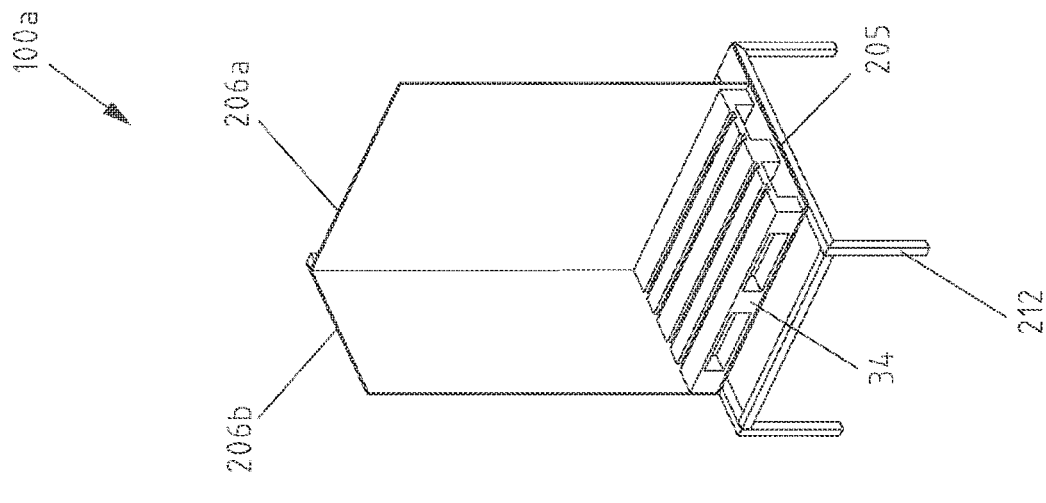
FIGS. 12a, 12b a (non-loaded) first stack loading aid and a first stack loading aid (loaded with an order stack) in a perspective view.
Figure 12B:
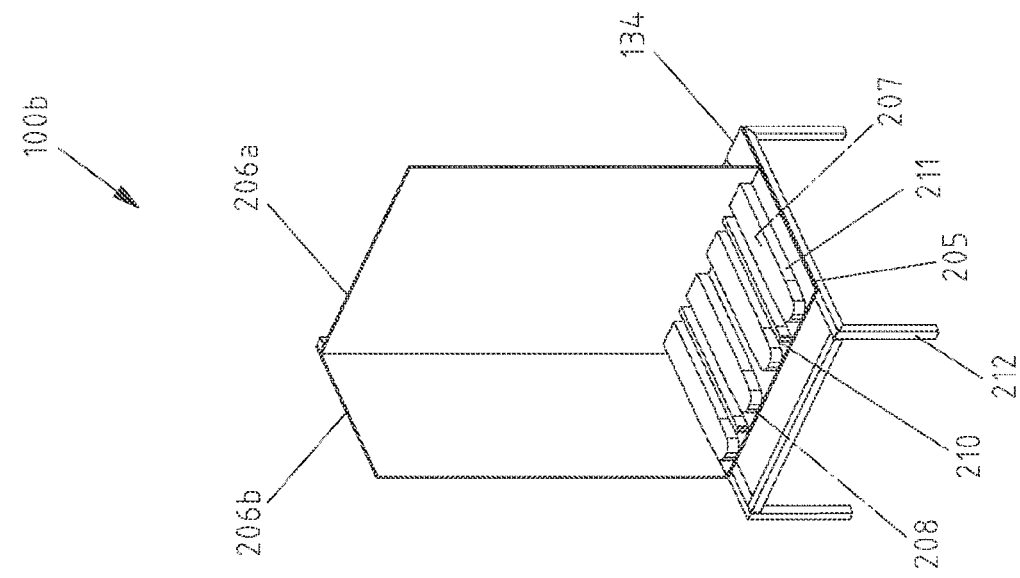
Figure 12C:
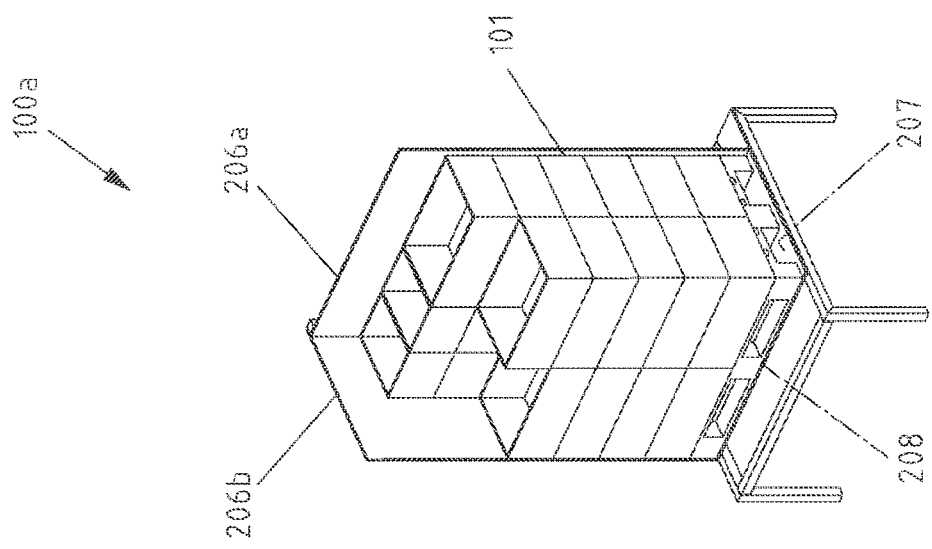
FIG. 12c a (non-loaded) second stack loading aid in a perspective view.

The stack loading aids comprise either first stack loading aids 100a (FIG. 12a—shows an unloaded stack loading aid and FIG. 12b—shows a loaded stack loading aid) or second stack loading aids 100b (FIG. 12c—shows an unloaded stack loading aid). It is also possible that the stack loading aids comprise both first stack loading aids 100a and second stack loading aids 100b.

In the order fulfillment facility 1d shown in FIGS. 9a, 9b, 10a to 10d, stack loading aids, which comprise the first stack loading aids 100a (see FIG. 12a), are used, which are loaded with the target loading aid 34, for example a pallet.

If instead of the first stack loading aids 100a the second stack loading aids 100b (see FIG. 12c) is used in the order fulfillment facility 1d, the second stack loading aid 100b forms the target loading aid 134. In this case, the lading station described in the following may be omitted.

Contrary to the above-mentioned embodiment, in which the first stack loading aid 100a is equipped with the target loading aid 34, this embodiment does not allow for an additional target loading aid 34.

Figure 11C:
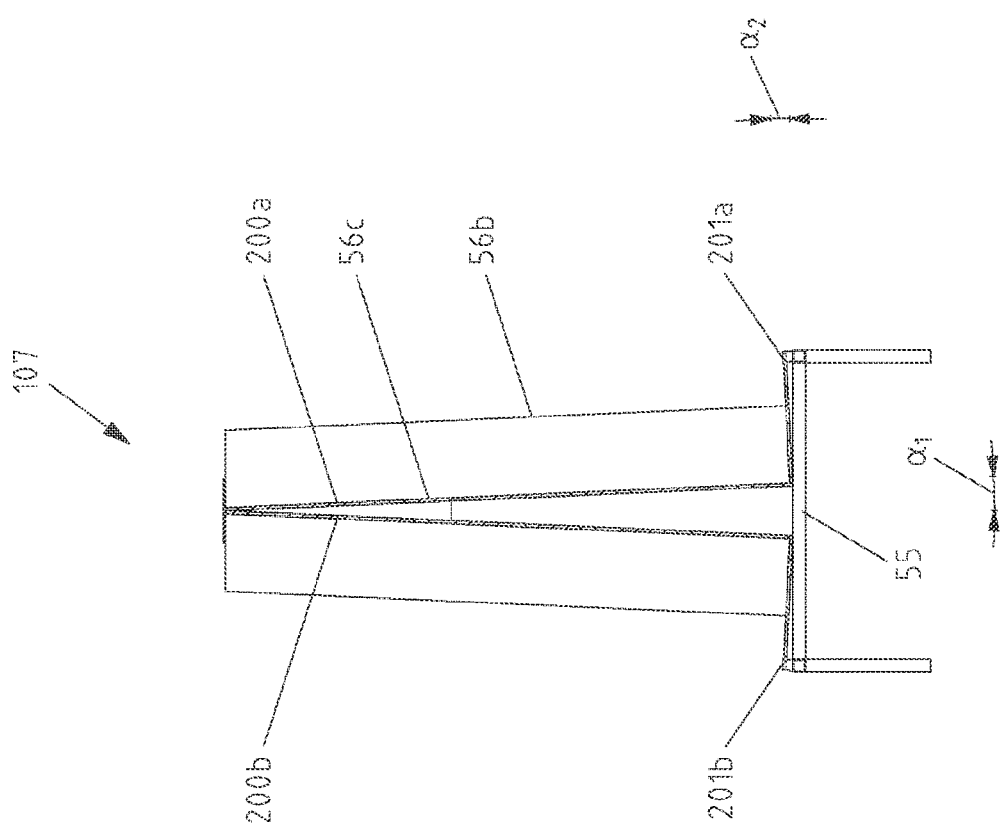
FIG. 11c the (non-loaded) transport loading aid according to FIG. 11a in a sectional view.

The transport loading aid 107 as shown in further detail in FIGS. 11a to 11c also proves advantageous.

As schematically depicted in FIG. 9a, the order fulfillment facility 1d likewise comprises the order processing computer 46 for detecting picking orders and for determining articles 2 which are required for the picking order. In this regard, a picking order comprises one order line (for example six article carriers 3 with a first article 2) or multiple order lines (for example three article carriers 3 with a first article 2 and three article carriers 3 with a second article 2), as described above.

In the delivery zone 4, the provision of article carrier stacks 8 is envisaged, as comprehensively described above. According to the embodiment shown, the article carrier stacks 8 are delivered to the delivery zone 4 on pallets (delivery load carrier) as an article carrier stack group 10. In this case, an article carrier stack group 10 of a depalletizing station is supplied, in which article carrier stacks 8 of multiple article carriers 3, arranged on top of one another, from one article carrier stack group 10 are separated. Such article carrier stack groups 10 are most times made up of article carrier stacks 8 containing articles of just one type.

Figure 10A:
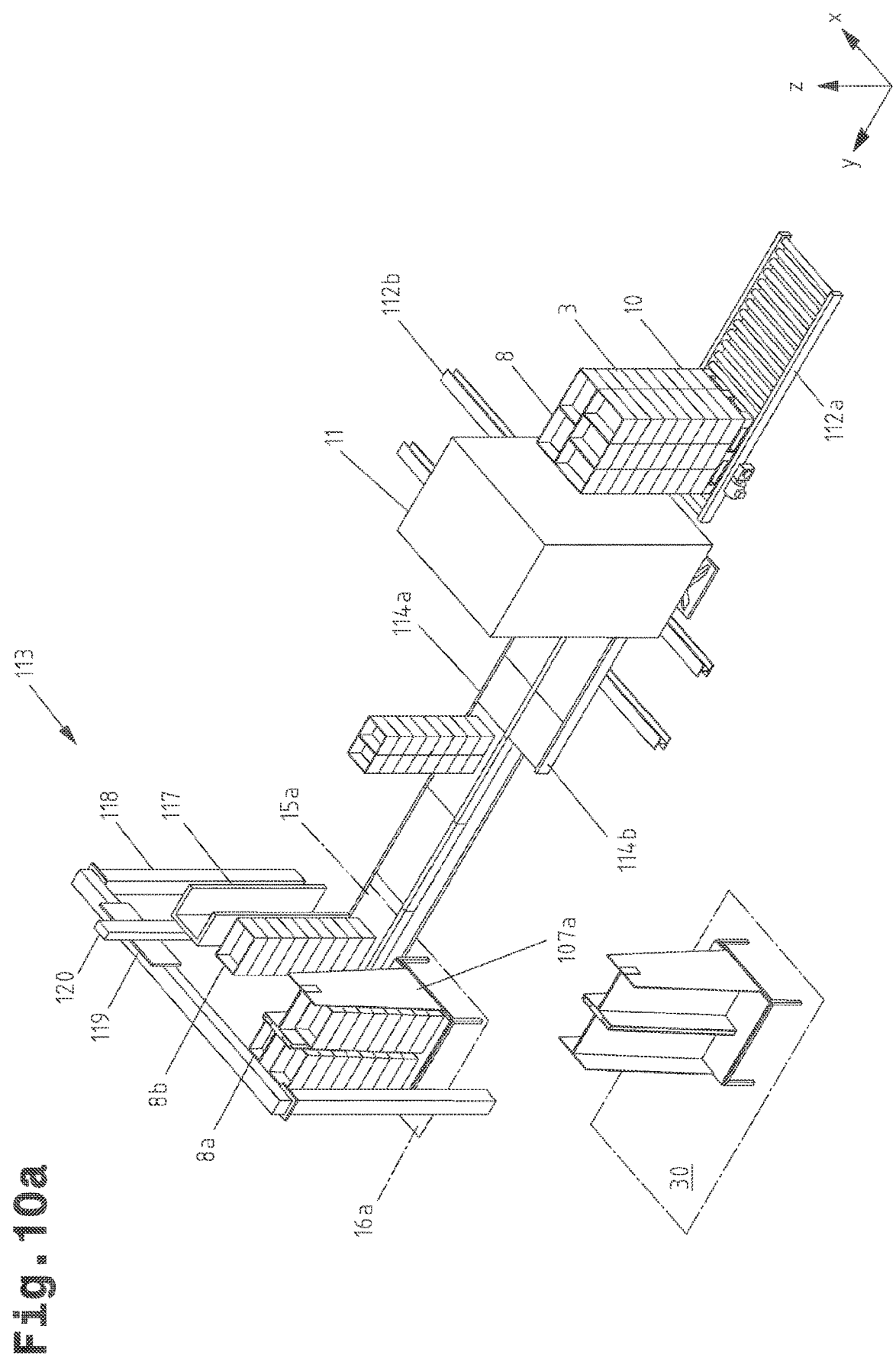
FIG. 10a a loading station of the order fulfillment facility of FIGS. 9a, 9b with an automatically operated first loading device in an enlarged view.

FIGS. 9a and 10a show a possible embodiment, in which a depalletizing station with at least one automatically operated depalletizing device 11 (schematically adumbrated), a first conveying device 112a following the depalletizing device 11 for supplying article carrier stack groups 10 (incoming article units), a second conveying device 112b following the depalletizing device 11 for transporting delivery load carriers away, a loading station with at least one automatically operated first loading device 113 (schematically adumbrated), a third conveying device 114a connecting, in respect of a conveying stream, the depalletizing device 11 to the first loading station 113 for supplying article carrier stacks 8 and/or a fourth conveying device 114b connecting, in respect of a conveying stream, the depalletizing device 11 to the loading station 113 for supplying article carrier stacks 8 may be provided in the delivery zone 4. The fourth conveying device 114b for supplying article carrier stacks 8 is optional and may also be omitted.

As not shown in further detail, a rotating device may be provided between the depalletizing device 11 and the loading device 113, which rotating device rotates the article carrier stacks 8 by 90°, so that the article carrier stacks 8 are always provided in the same orientation at the loading device 113, regardless of how the article carrier stacks 8 and/or article carriers 3 are delivered.

The article carrier stacks 8 are provided "unamendedly" in a transfer position at the loading device 113. The transfer location 15a is preferably formed on the third conveying device 114a.

As described in the following, the loading station comprises one or multiple automatically operated first loading device(s) 113 (schematically adumbrated).

The schematically shown first loading device 113 comprises at least one first provisioning location 16a for the first transport loading aid 107a and a transfer device 117 for transferring a second article carrier stack 8b from the first transfer location 15a onto the first transport loading aid 107a. The first provisioning location 16a and the first transfer location 15a are arranged so as to be located opposite one another.

It also proves advantageous if the loading station has at least one separate buffer surface 30 near the first loading device 113 or near each first loading device 113. Preferably, the first loading device 113 is assigned one buffer surface 30 per provisioning location 16a. However, in principle, the loading station may also comprise only one buffer surface 30. The buffer surface 30 is preferably formed on a base of the order fulfillment facility 1d.

In concrete terms, the automatically operated loading device 113 comprises a transfer device 117 that is movable relative to the transfer location 15a, in order to move an article carrier stack 8b (or possibly individual article carriers 3) provided in a transfer position at the transfer location 15a to the transport loading aid 107a. The transfer device 117 can be formed for example by a pusher actuatable by an actuating drive. The transfer device 117 is arranged above the conveying device 114a.

According to a first embodiment, the loading device 113 may specifically comprise a gantry robot. Gantry robots are understood to be industrial robots, which in their base axes are constructed from linear axles. Using a line gantry is sufficient for loading.

The gantry robot comprises vertical uprights and a longitudinal beam, which are connected to one another, forming a support construction 118. Additionally, the gantry robot comprises a gantry slide 119, that is movable in a first direction (x-direction-horizontal movement) along a guide assembly via a first drive device (not depicted), and a gantry arm 120 arranged on the gantry slide 119. A transfer device 117 is arranged on the gantry arm 120.

It may prove useful if the gantry arm 120 is also movable in a second direction (z-direction-vertical movement) along a guide assembly via a second drive device.

In FIGS. 9a, 10a, the first article carrier stack 8a has already been discharged onto the first transport loading aid 107a, while the second article carrier stack 8b is still at the transfer location 15a. In the course of the pushing movement, the article carrier stack 8b is moved from the transfer location 15a to the first transport loading aid 107a which is provided at the first provisioning location 16a.

As described above, the first transfer location 15a, second transfer location 15b, first provisioning location 16a and the second provisioning location 16b may be provided on this loading device 113 as well.

Even though, in the depicted embodiment, the loading station is shown having a single first loading device 113 for reasons of clarity, the number of first loading devices 113 may vary depending on the required picking performance, as already described above regarding the embodiments.

According to an embodiment that is not shown, the loading device 113 may comprise a jointed-arm robot, as described above regarding the loading device 13.

As depicted in FIG. 9a, an empty (first) transport loading aid 107b may be transported to the provisioning location 16a (16b) using an autonomously moveable, driverless transport vehicle 9 and be placed there. While loading the (first) transport loading aid 107a, said transport vehicle 9 may be used for other transport purposes. However, in principle, it is also possible that the autonomously moveable, driverless transport vehicle 9 is transported to the provisioning location 16a (16b) and placed there but remains at the provisioning location 16a (16b) while the (first) transport loading aid 107a is loaded. If a (first) transport loading aid 107a is already placed at the provisioning location 16a or if the (first) transport loading aid 107a is currently being loaded, the empty (first) transport loading aid 107b can be buffered on the buffer surface 30 provided near the loading device 113.

After being loaded (with at least one article carrier stack 8), a (first) transport loading aid 107c is transported from the loading station, in particular from the first loading station 113, or from the first loading devices 113 to the storage zone 5 using an autonomously moveable, driverless transport vehicle 9 and is placed on the storage area 31 in the storage zone 5.

As evident in FIGS. 9b and 10b, an unloading station with at least one automatically operated unloading device 132 (schematically adumbrated) is arranged in the order processing zone 6. According to this embodiment, the unloading station with the automatically operated unloading device 132 or the multiple automatically operated unloading devices 132 simultaneously forms a reloading station with the one automatically operated reloading device (palletizing device) or the multiple automatically operated reloading devices (palletizing devices), by means of which the article carriers 3 or article carrier stacks 8 are transferred from the transport loading aid 107 onto the target loading aid 34. Therefore, the term "unloading device" may be used synonymously with "reloading device".

As described in the following, the unloading station comprises the at least one automatically operated unloading device 132 (schematically adumbrated). Even though, in the depicted embodiment, the unloading station is shown having a single unloading device 132 for reasons of clarity, the number of unloading devices 132 may vary depending on the required picking performance. For example, the unloading station and/or the order fulfillment facility 1d may have a second unloading device 132, third unloading device 132 etc. These unloading devices 132 are preferably constructed identically.

The schematically shown embodiment of the automatically operated unloading device 132 comprises a first provisioning location 40a for the loaded first transport loading aid 107e, an (optional) second provisioning location 40b for the loaded second transport loading aid 107e and a transfer device 147 movable relative to the provisioning location 40a . . . 40b for unloading the transport loading aid 107e provided at the provisioning location 40a . . . 40b. If the unloading station has more than one automatically operated unloading device 132, each unloading device 132 comprises a first provisioning location 40a for the loaded first transport loading aid 107e, an (optional) second provisioning location 40b for the loaded second transport loading aid 107e and a transfer device 147 movable relative to the provisioning location 40a . . . 40b for unloading the transport loading aid 107e provided at the provisioning location 40a, 40b.

The transfer device 147 may for example be formed by a gripping system as it is described in detail in FIGS. 13a to 13d, 14a, 14b, 15a to 15n and 16a to 16n.

It also proves advantageous if the unloading station has at least one separate buffer surface 36 near the unloading device 132 or near each unloading device 132. In the depicted embodiment, the unloading device 132 is assigned one buffer surface 36 per provisioning location 40a . . . 40b. However, in principle, the unloading station may also comprise only one buffer surface 36. The buffer surface 36 is preferably formed on a base of the order fulfillment facility 1d. This way, it is possible that the loaded (first) transport loading aid(s) 107d are buffered on the buffer surface 36, near the unloading device(s) 132, and are transported as needed to the respective provisioning location 40a . . . 40b of the unloading device(s) 132 over a short distance using the transport vehicles 9.

The unloading station may also have one or multiple waiting zone(s) 37 (not depicted), as described above in detail.

According to a first embodiment, the unloading device 132 may specifically comprise a gantry robot. Gantry robots are understood to be industrial robots, which in their base axes are constructed from linear axles. An area gantry is used for loading.

The gantry robot comprises
i) vertical uprights, longitudinal beams and transverse beams, which are connected to one another, forming a support construction 142,
ii) a first gantry slide 143 mounted on the support structure 142 and horizontally movable in a first direction (x-direction) along a guide assembly (which is arranged on one of the longitudinal beams) via a first drive device,
iii) a gantry arm 144 affixed to the first gantry slide 143 and movable therewith in the first direction (x-direction),
iv) a second gantry slide 145 mounted on the gantry arm 144 and vertically movable in a second direction (z-direction) along a guide assembly via a second drive device,
v) a third gantry slide 146 arranged on the second gantry slide 145 and horizontally movable in a third direction (y-direction) along a guide assembly via a third drive device, and
vi) the transfer device 147, which is arranged on the third gantry slide 146 and is mounted on the third gantry slide 146 so as to be rotatable about a vertical axis.

During the unloading movement, the article carrier 3, partial article carrier stack or article carrier stack 8 is picked up by the transfer device 147 and/or the gripping system from the transport loading aid 107e, which is provided at the provisioning location 40a . . . 40b, and subsequently transferred onto a target loading aid 34 according to the shown embodiment with the first stack loading aid 100a. If the order fulfillment facility 1d comprises the second stack loading aids 100a, the article carrier 3, partial article carrier stack or article carrier stack 8 is picked up by the gripping system from the transport loading aid 107e, which is provided at the provisioning location 40a . . . 40b, and subsequently transferred onto the target loading aid 134.

The shown gantry robot proves advantageous if the available ceiling height is low.

According to an embodiment, which is not depicted, the unloading device 132 (reloading device) may comprise a jointed-arm robot, as described above.

The schematically shown embodiment of the automatically operated unloading device 132 comprises a provisioning location 139a for a first stack loading aid 100a (or second stack loading aid 100b) or multiple provisioning locations 139a . . . 139b for first stack loading aids 100a (or second stack loading aids 100b) and the transfer device 147 that is movable relative to the provisioning location 139a . . . 139b for loading the transport loading aid 34, 134 provided at the provisioning location 139a . . . 139b.

If the unloading station has more than one automatically operated unloading device 132, each unloading device 132 comprises a provisioning location 139a for a target loading aid 34, 134 or multiple provisioning locations 139a . . . 139b for target loading aids 34, 134 and the transfer device 147 that is movable relative to the provisioning location 139a . . . 139b for loading the transport loading aid 34, 134 provided at the provisioning location 139a . . . 139b.

As described above, the (additional) target loading aid 34 with the first stack loading aid 100a may be provided at the provisioning location 139a . . . 139b or the target loading aid 134 (which is formed by the second stack loading aid 100b) may be provided at the provisioning location 139a . . . 139b.

It also proves advantageous if the unloading station has at least one separate buffer surface 136 near the unloading device 132 or near each unloading device 132. In the depicted embodiment, the unloading device 132 is assigned one buffer surface 136 per provisioning location 139a . . . 139b. However, in principle, the unloading station may also comprise only one buffer surface 136. The buffer surface 136 is preferably formed on a base of the order fulfillment facility 1d. This way, it is possible that the empty target loading aids 34 with the first stack loading aid 100a and the target loading aid 134 with the second stack loading aid 100b are buffered on the buffer surface 136, near the unloading device(s) 132, and are transported as needed to the respective provisioning location 139a . . . 139b of the unloading device(s) 132 over a short distance using the transport vehicles 9.

According to the shown embodiment, the target loading aids 34 with the first stack loading aid 100a and the target loading aid 134 with the second stack loading aid 100b are transported to the respective provisioning location 139a . . . 139b of the unloading device(s) 132 and are transported away from the respective provisioning location 139a . . . 139b of the unloading device(s) 132 using the transport vehicles 9. The above-described fixed-installation first conveying system 33 for transporting completely loaded target loading aids away and the fixed-installation second conveying system 35 for supplying empty target loading aids are not provided according to this embodiment.

Autonomously moveable, driverless transport vehicles 9 (of a driverless transport system), which are automatically controlled by the superordinate main computer, are used for transporting the empty transport loading aids 107 and the transport loading aids 107 loaded with article carrier stacks as well as the empty target loading aids 34 with the first stack loading aid 100a and the empty target loading aids 134 with the second stack loading aid 100b and target loading aids with the first stack loading aid 100a loaded with the order stacks 101 and the loaded target loading aids 134 with the second stack loading aid 100b. The control system 47 may comprise said main computer.

Figure 10C:
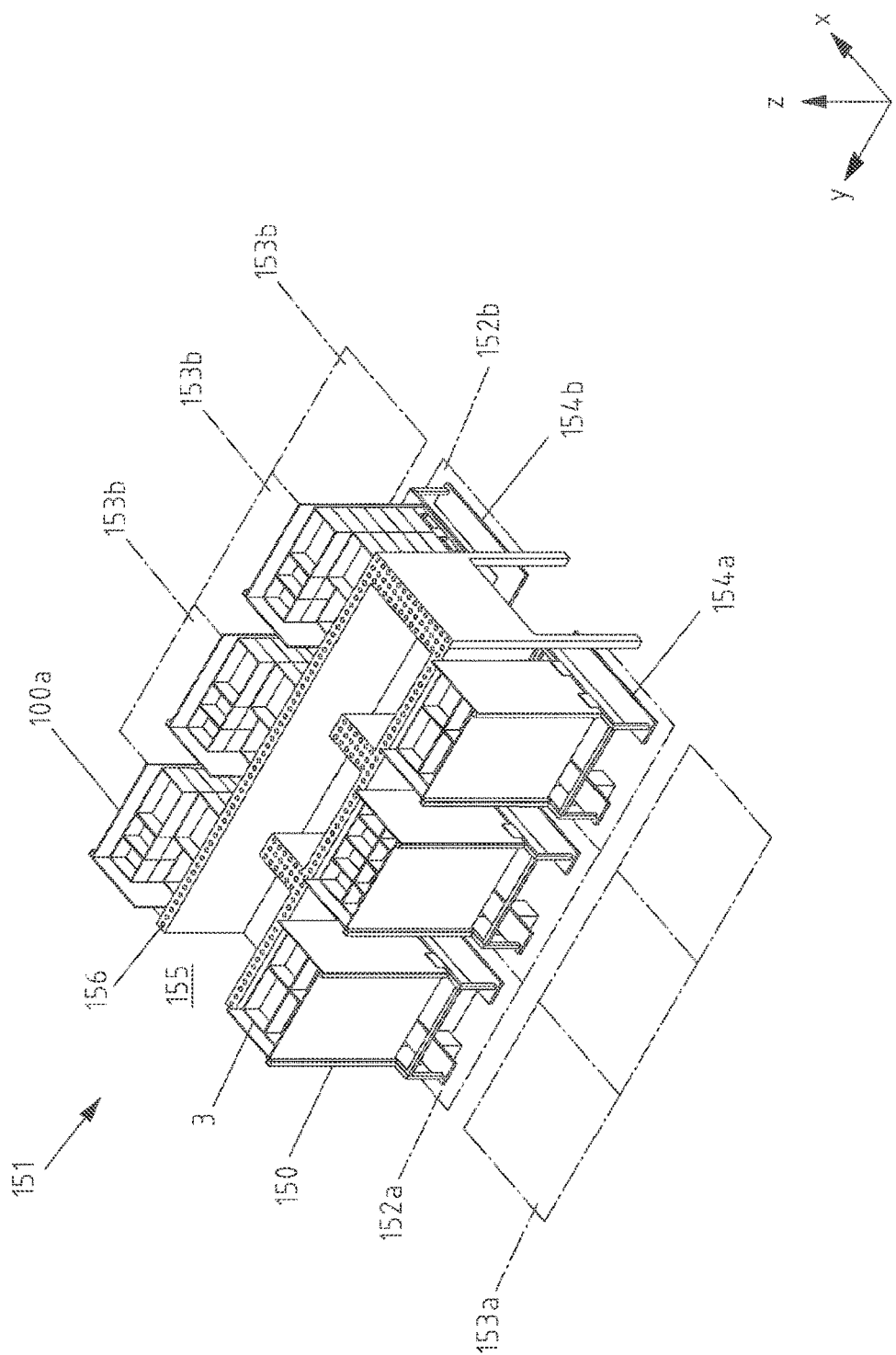
FIG. 10c an unloading station (reloading station) of the order fulfillment facility of FIGS. 9a, 9b with a semi-automated unloading device in an enlarged view.

As evident in FIGS. 9b and 10c, the unloading station may additionally comprise one or multiple unloading device(s) 151 (schematically adumbrated) operated in a semi-automated manner, on which the article carriers 3 or article carrier stacks 8 are transferred from a third transport loading aid 150 onto one or multiple target loading aids 34, 134. It is possible for only one single unloading device 151 to be provided at which the article carriers 3 or article carrier stacks 8 are transferred from a third transport loading aid 150 onto one or multiple target loading aids 34, 134. The number of unloading devices 151 may vary depending on the required picking performance. These unloading devices 151 are preferably constructed identically.

At the unloading device(s) 151, article carriers 3 are picked, which cannot be automatically picked at the unloading device(s) 132 because the base surfaces of the article carriers are smaller than 300 mm×400 mm or the article carriers 3 have a dimensional stability that is too low to be manipulated automatically.

The unloading device(s) 151 operated in a semi-automated manner each comprise a first provisioning location 152a for a third transport loading aid 150, a second provisioning location 152b for a first stack loading aid 100a (or second stack loading aid 100b) and a working area 155 for a picker (not depicted for reasons of clarity). The working area 155 may also comprise a working surface 156 with wheels and the like in order to make an ergonomic manipulation of the article carriers 3 possible. The first provisioning location 152a and the second provisioning location 152b are arranged so as to be located opposite one another. Additionally, the unloading device 151 may comprise an input and/or output device (not depicted), by means of which picking instructions for the picker are output and at which picking commands are entered by the picker.

As described above, the (additional) target loading aid 34 with the first stack loading aid 100a may be provided at the provisioning location 152 or the target loading aid 134 (which is formed by the second stack loading aid 100b) may be provided at the provisioning location 152b.

It should be noted here that the unloading device(s) 151 operated in a semi-automated manner may also be used in the order fulfillment facilities 1a . . . 1c (without additional stack loading aids) described above. In this case, the third transport loading aids 150 are provided at the first provisioning location 152a and the target loading aids 34 (without stack loading aids) are provided at the second provisioning location 152b.

While according to the above-described embodiments, an automated picking operation takes place at the unloading devices 32; 65; 75; 132, a manual picking operation is performed at the unloading device(s) 151.

In the mentioned context, "semi-automated" means that transporting third transport loading aids 150 (or the first/second transport loading aids 7) to the unloading device 151, transporting third transport loading aids 150 away from the unloading device 151, transporting first stack loading aids 100a (or second stack loading aid 100b or the target loading aids 34) to the unloading device 151, transporting first stack loading aids 100a (or second stack loading aid 100b or the target loading aids 34) away from the unloading device 151 is performed automatically and picking is performed manually by a picker.

The third transport loading aid 150 is transported to the first provisioning location 152a using the transport vehicle 9 and transferred to said provisioning location 152a so as to provide the third transport loading aid 150 at the provisioning location 152a, or transferred from the first provisioning location 152a onto the transport vehicle 9 so as to transport the third transport loading aid 150 away from the provisioning location 152a.

Likewise, the first stack loading aid 100a (or second stack loading aid 100b or the target loading aid 34) is transported by the transport vehicle 9 to the second provisioning location 152b and transferred onto it so as to provide the first stack loading aid 100a (or second stack loading aid 100b or the target loading aid 34) at the provisioning location 152b, it is transferred from the second provisioning location 152b onto the transport vehicle 9 so as to transport the first stack loading aid 100a (or second stack loading aid 100b or the target loading aid 34) away from the provisioning location 152b.

It also proves advantageous if the unloading station has at least one separate buffer surface 153a for the third transport loading aid 150 and at least one separate buffer surface 153b for the first stack loading aid 100a (or second stack loading aid 100b or the target loading aid 34) near the unloading device 151 or neat each unloading device 151. In the depicted embodiment, the unloading device 132 is assigned one buffer surface 153a per provisioning location 152a or one buffer surface 153b per provisioning location 152b. However, in principle, the unloading station may also comprise only one buffer surface 153a or buffer surface 153b. The buffer surface 153a, 153b is preferably formed on a base of the order fulfillment facility 1d. This way, it is possible that the loaded (third) transport loading aid(s) 150 and the first stack loading aid 100a (the second stack loading aid 100b or the target loading aid 34) are buffered on the buffer surface 153a, 153b, near the unloading device(s) 151, and are transported as needed to the respective provisioning location 153a, 153b of the unloading device(s) 151 over a short distance using the transport vehicles 9.

According to the depicted embodiment, the first provisioning location 152a is formed on a lifting platform 154a, on which the third transport loading aid 150 is placed and the article carrier stack 8 can be lifted to a provisioning level in order to make ergonomic working possible, and the second provisioning location 152b is formed on a lifting platform 154b, on which the first stack loading aid 100a (or second stack loading aid 100b or the target loading aid 34) can be placed and the target loading aid 34, 134 (of the target loading aid 34, 134 is not loaded yet) or an order stack 101 (if the target loading aid 34, 134 has already been loaded using one or multiple automatically operated loading device(s) 132) can be lifted to a provisioning level in order to make ergonomic working possible.

Figure 10D:
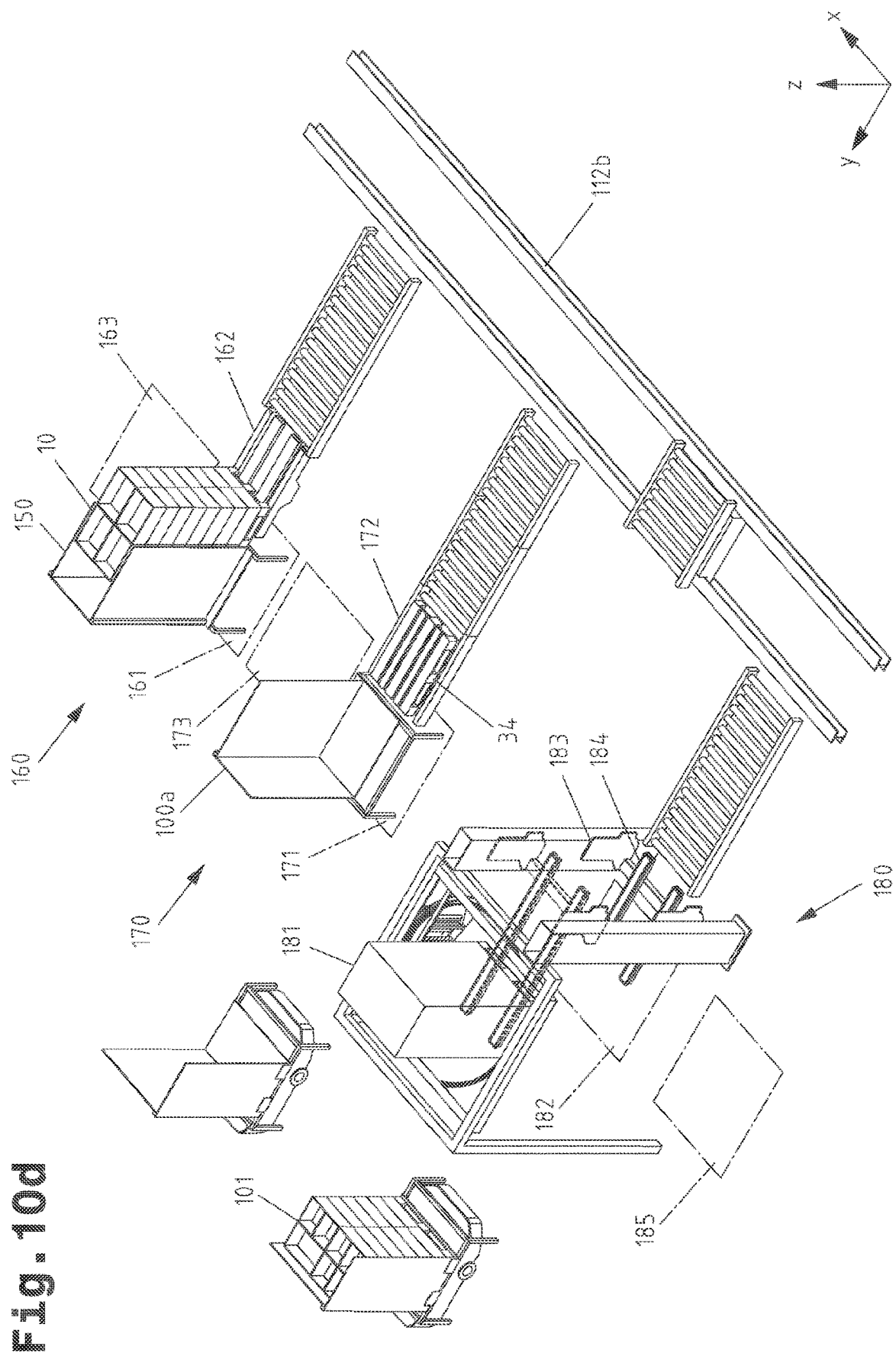
FIG. 10d a loading station of the order fulfillment facility of FIGS. 9a, 9b with an automatically operated second loading device, a lading station and a load securing station in an enlarged view.

FIGS. 9a and 10d show a loading station for loading third transport loading aids 150, which loading station comprises one or multiple automatically operated second loading device(s) 160 (schematically adumbrated). The order fulfillment facility 1d comprises this loading station. The second loading device 160 comprises a provisioning location 161 for an empty (third) transport loading aid 150 and a transfer device 162 for loading the transport loading aid 150 provided on the provisioning location 161, which transfer device 162 is movable relative to the provisioning location 161.

It also proves advantageous if the loading station has at least one separate buffer surface 163 near the second loading device 160 or near each second loading device 160. In the depicted embodiment, the second loading device 160 is assigned one buffer surface 163 per provisioning location 161. However, in principle, the loading station may also comprise only one buffer surface 160. The buffer surface 160 is preferably formed on a base of the order fulfillment facility 1d.

As evident from the figures, the third transport loading aid 150 may be different from the aforementioned transport loading aids 7, 107. However, this is not imperatively necessary.

The third transport loading aids 150 are loaded in the delivery zone 4 at the loading station using an automatically operated second loading device 160 (schematically adumbrated). Preferably, the article carrier stack group 10 with the pallet (delivery load carrier) is transferred onto the third transport loading aid 150 unamendedly at the second loading device 160, as evident in FIGS. 9a, 10d. Thus, no depalletizing operation takes place before. Such article carrier stack groups 10 are most times made up of article carrier stacks 8 containing articles of just one type. According to the embodiment shown, the article carrier stacks 8 are delivered to the delivery zone 4 on pallets (delivery load carrier) as an article carrier stack group 10 and the conveying device 112b conveys them to the loading device 160.

An empty (third) transport loading aid 150 is transported to the loading station using an autonomously moveable, driverless transport vehicle 9 and provided at the second loading device 160 or on a buffer surface 163. After being loaded (with the article carrier stack group 10), the (third) transport loading aid 150 is transported from the loading station, in particular from the first second loading device 160, to the storage zone 5 using the autonomously moveable, driverless transport vehicles 9 and is placed on a storage area 31 in the storage zone 5.

FIGS. 9a and 10d also show a lading station with one or multiple automatically operated lading device(s) 170, which the order fulfillment facility 1d may comprise and which make lading the first stack loading aid 100a with a target loading aid 34 possible as long as a first stack loading aid 100a is used in the order fulfillment facility 1d. The target loading aid 34 is placed on the base (FIG. 12a) of the first stack loading aid 100a.

The lading device(s) 170 each comprise a provisioning location 171 for an empty first stack loading aid 100a and a transfer device 172 for loading the stack loading aid 100a provided on the provisioning location 171, which transfer device 172 is movable relative to the provisioning location 171.

It also proves advantageous if the lading station has at least one separate buffer surface 173 near the lading device 170 or near each lading device 170. In the depicted embodiment, the lading device 170 is assigned one buffer surface 173 per provisioning location 171. However, in principle, the lading station may also comprise only one buffer surface 173. The buffer surface 173 is preferably formed on a base of the order fulfillment facility 1d.

An empty first stack loading aid 100a is transported to the lading station using an autonomously moveable, driverless transport vehicle 9 and provided at the lading device 170 or on a buffer surface 173. After being laded with a target loading aid 34, the stack loading aid 100a is transported from the lading station, in particular from the lading device 170, to the unloading station (reloading station) using an autonomously moveable, driverless transport vehicle 9.

FIGS. 9a and 10d also show an order stack load securing station with one or multiple automatically operated load securing device(s) 180, which the order fulfillment facility 1d may comprise and which makes securing the load of an order stack 101 with a securing means 181 possible.

The load securing device(s) 180 each comprise a provisioning location 182 for a loaded first stack loading aid 100a (or a loaded second stack loading aid 100b), a target loading aid lifting device and a securing means wrapping tool or a securing means strapping tool. The target loading aid lifting device comprises a vertically adjustable lifting frame 183 and telescopic forks 184 mounted thereon, the latter being movable between a retracted initial position and a protruding receiving position.

It should be noted that in the receiving position, the telescopic forks 184, on the one hand, receive the target loading aid 34 together with the order stack 101 if no stack loading aids are used, as shown in FIG. 1, or, if the first stack loading aid 100a is used, as shown in FIG. 12a, and on the other hand, only the order stack 101 if the second stack loading aid 100b is used, as shown in FIG. 12c, wherein the target loading aid 34 together with the order stack 101 or the order stack 101 may be lifted/lowered with a lifting movement of the lifting frame 183.

It also proves advantageous if the order stack load securing station has at least one separate buffer surface 185 near the load securing device 180 or near each load securing device 180. In the depicted embodiment, the load securing device 180 is assigned one buffer surface 185 per provisioning location 182. However, in principle, the order stack load securing station may also comprise only one buffer surface 185. The buffer surface 185 is preferably formed on a base of the order fulfillment facility 1d.

According to the embodiment shown, the load securing device 180 comprises a wrapping tool, which wraps a thermoplastic film in a force-fit manner in the circumferential direction around the order stack 101 while the order stack 101 is lifted from the first stack loading aid 100a or the second stack loading aid 100b using the target loading aid lifting device. The thermoplastic film constitutes the securing means 181.

In the alternative, a strapping tool may also be used in the load securing device 180, which is configured to fasten at least one sealing strap in a substantially horizontal direction circumferentially at the order stack 101 while the order stack 101 is in the load securing device 180. The sealing strap constitutes the securing means 181.

A loaded first stack loading aid 100a (or second stack loading aid 100b) is transported to the order stack load securing station using an autonomously moveable, driverless transport vehicle 9 and provided at the load securing device 180 or on a buffer surface 185.

After the order stack 101 has been removed from the first stack loading aid 100a, the empty first stack loading aid 100a may be transported using an autonomously moveable, driverless transport vehicle 9 from the order stack load securing station, in particular from the load securing device 180 to the lading station.

If the stack loading aids comprise the second stack loading aid 100b, after the order stack 101 has been removed from the second stack loading aid 100b, the empty second stack loading aid 100b may be transported using an autonomously moveable, driverless transport vehicle 9 from the order stack load securing station, in particular from the load securing device 180 to the unloading station.

It should be noted that also the first, second and third embodiment of the order fulfillment facility 1a, 1b, 1c may comprise the automatically operated second loading device(s), the optional lading station, and the order stack load securing station.

In FIGS. 11a to 11c, a fourth embodiment of a transport loading aid 107. FIG. 11a shows the unloaded, empty transport loading aid 107 and FIG. 11b shows the loaded transport loading aid 107. Such a transport loading aid 107 may also, by a short "offset motion", provide multiple article carrier stacks 8 consecutively at the provisioning locations described above. The "offset motion" is preferably performed by a transport vehicle 9. Such a transport loading aid 107 can also provide multiple article carrier stacks 8 consecutively at the provisioning locations by a "rotating motion" about the vertical axis. The "rotating motion" is preferably performed by a transport vehicle 9.

The transport loading aid 107 again comprises the base 55 and side walls 56a, 56b, 56c, 56d connected thereto, each for the stabilization of the position of article carrier stacks 8 and a first loading and unloading opening 57a and second loading and unloading opening 57d located opposite the side wall 56c on a first side, and a third loading and unloading opening 57c and fourth loading and unloading opening 57d located opposite the side wall 56c on a second side.

The side walls 56a, 56b, 56c, 56d are preferably designed essentially at the height of the article carrier stack 8, however at least at a sufficient height for the topmost article carrier 3 in the article carrier stack 8 to be surrounded by the side walls 56a, 56b, 56c, 56d at least in some regions. Preferably, the first/second/third/fourth loading and unloading opening 57a, 57b, 57c, 57d each extend over the entire height of the side walls 56a, 56b, 56c, 56d.

It is advantageous if the depth of the one accommodating shaft or the multiple accommodating shafts, which is/are limited between the first side walls 56a, 56b, 56d, is smaller than a minimum width of the article carriers 3, so that the article carriers 3 always protrude at the front edge of the first side walls 56a, 56b, 56d if the article carriers 3 are mounted in the corresponding accommodating shaft, as can be seen in FIG. 11b and, for example, in FIG. 15a to FIG. 15f or FIG. 16a to FIG. 16k. This way, a reliable clamping and gripping function is enabled.

The transport loading aid 107 may comprise outer first side walls 56a, 56b running in parallel to one another and a parallel inner side wall 56d. The second side wall 56c extends between the first side walls 56a, 56b, 56d. The inner first side wall 56d is arranged in the center region of the base 55 such that the side walls 56a, 56b, 56c, 56d delimit two accommodating shafts on a first side relative to the side wall 56c, and two accommodating shafts on a second side relative to the side wall 56c.

In each accommodating shaft, at least one article carrier stack 8 can be accommodated for transport/for storage. In the depicted embodiment, one article carrier stack 8 with a base area of the article carriers of 600 mm×400 mm is accommodated in the first accommodation shaft, and two article carrier stacks 8 each with a base area of the article carriers of 300 mm×400 mm are accommodated in the third and fourth accommodation shafts. This transport loading aid 107 can transport multiple article carrier stacks 8 simultaneously.

It proves to be advantageous if the outer first side walls 56a, 56b and possibly also the inner first side wall 56d are configured having lead-in chamfers (not depicted) for enabling easy loading and/or unloading of the transport loading aid 107.

As can be particularly seen in FIG. 11c, the second side wall 56c may comprise a first side wall part 200a and a second side wall part 200b. The first side wall part 200a is inclined at an inclination angle towards a vertical plane spanned between the first side walls 56a, 56b, 56d such that the first side wall part 200a is inclined backwards with increasing vertical distance from the base 55. The second side wall part 200b is inclined at an inclination angle towards a vertical plane spanned between the first side walls 56a, 56b, 56d such that the second side wall part 200b is inclined backwards with increasing vertical distance from the base 55.

The inclination angle $\alpha_1$ is between 2° and 5°.

As can also be seen in FIG. 11c, the base 55 also comprises a first base part 201a and a second base part 201b. The first base part 201a is inclined downwards in the direction of the second side wall 56c at an inclination angle towards a horizontal plane spanned between the first side walls 56a, 56b, 56d. The second base part 201b is inclined downwards in the direction of the second side wall 56c at an inclination angle towards a horizontal plane spanned between the first side walls 56a, 56b, 56d.

The inclination angle $\alpha_2$ is preferably larger than the inclination angle $\alpha_1$ and amounts to between 3° and 6°.

The base 55 on its upper side again forms a placing surface 58, on which the article carrier stacks 8 can be placed, and on its bottom side a transport surface 59, against which the loading platform 51 of the transport vehicle 9 can be placed. In concrete terms, the placing surface 58 is formed on the base wall parts 201*a*, 201*b*.

Additionally, the transport loading aid 107 may comprise adjustable feet 60 which are affixed to the base 55. The transport loading aid 107 is placed via the adjustable feet 60 on the base. In an embodiment that is not shown, wheels instead of adjustable feet 60 may also be provided on the base 55.

At this point, it should also be noted that the transport loading aid 107 may also be configured according to the embodiments described above and that the side walls 56*a*, 56*b*, 56*d* are arranged accordingly and one single accommodation shaft may be arranged between them (FIG. 4*a*, 4*b*) or accommodation shafts separated by the side wall 56*c* (FIG. 5*a*, 5*b*) or accommodation shafts separated by the side wall 56*d* (FIG. 6*a*,6*b*).

It should further be noted at this point that the transport loading aid 7, 7', 7" may also be configured according to the embodiment described in FIGS. 11*a* to 11*c* and that the side wall 56*c* comprises a first side wall part 200*a*, which is inclined at an inclination angle towards a vertical plane spanned between the first side walls 56*a*, 56*b* or 56*a*, 56*b*, 56*d* such that the first side wall part 200*a* is inclined backwards with increasing vertical distance from the base 55.

Likewise, the base 55 may comprise a first base part 201*a*, which is inclined downwards in the direction towards the second side wall 56*c* at an inclination angle towards a horizontal plane spanned between the first side walls 56*a*, 56*b* or 56*a*, 56*b*, 56*d*.

As described above, the order fulfillment facility 1*a*, 1*b*, 1*c*, 1*d* may comprise one or multiple stack loading aids, each for stabilizing the position of an order stack 101 assembled of the article carriers 3 according to a picking order.

In FIGS. 12*a* and 12*b*, the first stack loading aid 100*a* is shown, and in FIG. 12*c*, the second stack loading aid 100*b* is shown.

The first stack loading aid 100*a* comprises a base 205 and stack walls 206*a*, 206*b* connected thereto. Preferably, a first stack wall 206*a* and a second stack wall 206*b* are provided, which protrude perpendicularly at the base 205 and include a right angle.

The base 205 can comprise a placing surface 207 on its upper side, on which a target loading aid 34 can be placed with the order stack 101, and a transport surface 208 on its lower side, against which a loading platform of the transport vehicle 9 can be placed.

The second stack loading aid 100*b* likewise comprises a base 205 and stack walls 206*a*, 206*b* connected thereto. Preferably, a first stack wall 206*a* and a second stack wall 206*b* are provided, which protrude perpendicularly at the base 205 and include a right angle.

As opposed to the first stack loading aid 100*a*, the base comprises on its upper side protruding placing blocks 211, which are separated from another by receiving channels 210, on which placing blocks the article carriers 3 of the order stack 101 (not shown) may be placed, such that the at least one second stack loading aid 100*b* forms the target loading aid 134.

In addition, the base 205 comprises on its lower side a transport surface 208, against which a loading platform of the transport vehicle 9 may be placed.

Even if only the first stack wall 206*a* and the second stack wall 206*b* are provided, sufficient stabilization of the position and safe transport of the order stack 101 is enabled using the first stack loading aid 100*a* and the second loading aid 100*b*. Moreover, the load securing device 180 may be operated with high performance as the first/second stack loading aid 100*a*, 100*b* may already be transported away from the load securing device 180 as soon as the target loading aid 34 with the order stack 101 has been slightly lifted from the base 205 of the first stack loading aid 100*a*, or the order stack 101 has been slightly lifted from the base 205 of the second stack loading aid 100*b*. Therefore, it is not necessary to lift the order stack 101 completely and over the entire height of the first/second stack loading aid 100*a*, 100*b* before the first/second stack loading aid 100*a*, 100*b* may be transported away.

Additionally, the first stack loading aid 100*a*/the second stack loading aid 100*b* may comprise adjustable feet 212, which are affixed to the base 205. The first stack loading aid 100*a*/second stack loading aid 100*b* is placed on the base via the adjustable feet 212. In an embodiment that is not shown, wheels instead of adjustable feet 212 may also be provided on the base 55.

As not explained in detail, the transport loading aid 107 may also be provided with a data carrier 92*a*, as described above. Likewise, the first stack loading aid 100*a*/the second loading aid 100*b* may be provided with a data carrier for identifying the first stack loading aid 100*a*/the second stack loading aid 100*b* using a detection device by reading a data carrier.

The method described above for storing and picking articles 2 in the order fulfillment facility 1*a*, 1*b*, 1*c*, 1*d* may additionally comprise the following step:
  providing stack loading aids 100*a*, 100*b*, each for stabilizing the position of an order stack 101 assembled of the article carriers 3 according to a picking order.

Providing the stack loading aids in the order fulfillment facility 1*a*, 1*b*, 1*c*, 1*d* may comprise providing one or multiple first stack loading aid(s) 100*a* and/or one or multiple second stack loading aid(s) 100*b*.

If the first stack loading aids 100*a* are used in the order fulfillment facility 1*a*, 1*b*, 1*c*, 1*d*, the method may additionally comprise the following step:
  lading the first stack loading aid 100*a* with a target loading aid 34 at the lading station using one or multiple automatically operated lading device(s) 170 by placing the target loading aid 34 on the base 205.

If the second stack loading aids 100*b* are used in the order fulfillment facility 1*a*, 1*b*, 1*c*, 1*d*, the method may additionally comprise the following step:
  defining the second stack loading aid 100*b* as the target loading aid 134 by the second stack loading aids 100*b* forming the target loading aids 134.

If the first stack loading aids 100*a* and the second stack loading aids 100*b* are used in the order fulfillment facility 1*a*, 1*b*, 1*c*, 1*d*, the method may additionally comprise the following steps:
  lading the first stack loading aid 100*a* with a target loading aid 34 at the lading station using one or multiple automatically operated lading device(s) 170 by placing the target loading aid 34 on the base 205, and
  defining the second loading aid 100*b* as the target loading aid 134.

The method described above for storing and picking articles 2 in the order fulfillment facility 1*a*, 1*b*, 1*c*, 1*d* may additionally comprise the following steps:
  providing one or multiple automatically operated second loading device(s) 160,
  providing an article carrier stack group 10 of multiple article carrier stacks 8 arranged next to one another with article carriers 3 arranged on top of one another in the delivery zone 4 of the order fulfillment facility 1*a*, 1*b*, 1*c*, 1*d*, providing empty (third) transport loading aids 150 each for receiving and stabilizing the position of an article carrier stack group 10, transporting empty (third) transport loading aids 150 using the autonomously moveable, driverless transport vehicles 9 to the loading station and providing one or multiple empty (third) transport loading aid(s) 150 either on one or on multiple automatically operated second loading device(s) 160 or on a buffer surface 163 close to the second loading device(s) 160, loading one of the empty (third) transport loading aids 160, which is provided at the automatically operated second loading device 160, with at least one article carrier stack group 10 from the delivery zone 4 using the automatically operated second loading device 160, transporting of the (third) transport loading aid 150 loaded with the article carrier stack group 10 from the loading station to the storage zone 5 using the autonomously moveable, driverless transport vehicle 9, placing the (third) transport loading aid 150 loaded with at least one article carrier stack 8 on the storage surface 31 in the storage zone 5, and storing the (third) transport loading aid 150 loaded with the article carrier stack group 10 in the storage zone 5.

The method may further comprise the following step(s):

transporting empty target loading aids 34; 134 using the autonomously moveable, driverless transport vehicles 9 to the unloading station and providing said empty target loading aids 34; 134 either at one or at multiple semi-automated unloading device(s) 151 or on a buffer surface 152*b* close the unloading device(s) 151 using one or multiple autonomously moveable, driverless transport vehicle(s) 9, and/or transporting partially loaded target loading aids 34; 134 using the autonomously moveable, driverless transport vehicles 9 from the automatically operated unloading device 32; 65; 75; 132 to the semi-automated unloading device 151 or to a buffer surface 152*b* close to the semi-automated unloading device(s) 151 after the article carriers 3 have been assembled on the partially loaded target loading aid 34; 134 at the automatically operated unloading device 32; 65; 75; 132 and if article carriers 3 are still required for the mentioned picking order which are provided via the (third) target loading aids 150 at the semi-automated unloading device(s) 151.

Processing a picking order that requires article carriers 3 from the (third) transport loading aid 150 may comprise the following steps:

transporting one or multiple (third) transport loading aid(s) 150 containing the article carriers 3 required for the picking order from the storage zone 5 to the unloading station and providing said (third) transport loading aid(s) 150 either at one or at multiple semi-automated unloading device(s) 151 or on a buffer surface 153*a* close the unloading device(s) 151 using one or multiple autonomously moveable, driverless transport vehicle(s) 9, manually unloading one or multiple ones of the (third) transport loading aid(s) 150, which is/(are) provided at the semi-automated unloading device(s) 151, by removing the article carriers 3 required for processing the mentioned picking order by a picker, and manually assembling the article carriers 3 on one or multiple (empty or partially loaded) target loading aids 34, 134 for the mentioned picking order by a picker if the target loading aid(s) 34, 134 is/(are) provided at the semi-automated unloading device(s) 151.

Assembling the article carriers 3 may comprise the following step:

assembling the article carriers 3 according to the mentioned picking order to the order stack 101 on the target loading aid 34 in the first stack loading aid 100*a* or on the base 205 of the second stack loading aid 100*b*, said first stack loading aid 100*a* or second stack loading aid 100*b* being provided at the semi-automated unloading device(s) 151.

The method described above for storing and picking articles 2 in the order fulfillment facility 1*a*, 1*b*, 1*c*, 1*d* may additionally comprise the following steps:

providing an order stack load securing station either with one or multiple automatically operated load securing device(s) 180 or with one or multiple automatically operated load securing device(s) 180 and a buffer surface 185 close to the load securing device(s) 180, said load securing devices 180 being formed for secure transport of an order stack 101 with a securing means 181, transporting stack loading aids 100*a*, 100*b* each loaded with one order stack 101 using the autonomously moveable, driverless transport vehicles 9 to the mentioned order stack load securing station and providing one or multiple stack loading aid(s) 100*a*, 100*b* either on one or on multiple automatically operated load securing device(s) 180 or on a buffer surface 185 close to the load securing device(s) 180, removing the order stack 101 from the stack loading aid 100*a*, 100*b* using a lifting device (lifting frame 183 and telescopic forks 184), by means of which the target loading aid 34 with the order stack 101 is lifted from the first stack loading aid 100*a*, if the order fulfillment facility 1*a*; 1*b*; 1*c*; 1*d* comprises the first stack loading aid 100*a*, or by means of which the order stack 101 is lifted from the second stack loading aid 100*b* if the order fulfillment facility 1*a*; 1*b*; 1*c*; 1*d* comprises the second stack loading aid 100*b*, securing the order stack 101 with the securing means 181 using the automatically operated load securing device 180, in that the securing means 181 is placed circumferentially around the order stack 101, and transporting the secured order stack 101, in particular using the autonomously moveable, driverless transport vehicles 9, from the load securing station to a dispatch zone.

According to the first embodiment, the target loading aid 34 with the order stack 101 is lifted relative to the first stack loading aid 100*a*, and the order stack 101 lifted from the first stack loading aid 100*a* is simultaneously wrapped with the securing means 181 for stabilization. Subsequently, the secured order stack 101 is lowered again by the lifting device and transferred to a stationary conveying system (not shown) or to an autonomously moveable, driverless transport vehicle 9. The order stack 101 now secured may be transported from the load securing station to a dispatch zone (consolidation area or article issue area). In this case, the target loading aid 34 forms the distribution load carrier.

According to the second embodiment, the order stack 101 is lifted relative to the second stack loading aid 100*a*, and the order stack 101 lifted from the second stack loading aid 100*a* is simultaneously wrapped with the securing means 181 for stabilization. Subsequently, the secured order stack 101 is lowered again by the lifting device and transferred to a distribution load carrier, preferably a roll container, a pallet and the like. The distribution load carrier is transported using a stationary conveying system (not shown) or an autonomously moveable, driverless transport vehicle 9 from the load securing station to a dispatch zone (consolidation area or article issue area).

Transporting the unloaded stack loading aids 100*a*, 100*b* using the autonomously moveable, driverless transport vehicles 9 comprises the following step(s):

- transporting the first stack loading aid 100*a* from the load securing station to the lading station with one or multiple automatically operated lading device(s) 170, if a first stack loading aid is 100*a* used in the order fulfillment facility 1*a*; 1*b*; 1*c*; 1*d*, and/or
- transporting the second stack loading aid 100*b* from the load securing station to the unloading station and providing the second stack loading aid(s) 100*b* either at an automatically operated unloading device 32; 65; 75; 132 or on a buffer surface 136 close to the reloading device 32; 65; 75; 132, if a second stack loading aid 100*b* is used in the order fulfillment facility 1*a*; 1*b*; 1*c*; 1*d*, and/or
- transporting the second stack loading aid 100*b* from the load securing station to the unloading station and providing the second stack loading aid(s) 100*b* either at a semi-automated unloading device 151 or on a buffer surface 153*b* close to the unloading device 151, if a second stack loading aid 100*b* is used in the order fulfillment facility 1*a*; 1*b*; 1*c*; 1*d*.

In FIGS. 13*a* to 13*d* and 14*a* and 14*b*, the transfer device 147 is provided for automatically unloading a transport loading aid 7, 107 with article carriers 3 stacked on top of one another and for loading a target loading aid 34, 134 with article carriers 3 by clamping gripping. This means that no suction gripping is provided, which would strongly limit the range of different article carriers 3. The transfer device 147 comprises a clamping gripper unit, in particular the clamping jaws 254*a*, 254*b*.

Such a transfer device 147 may be used at an automatically operated unloading device 32, 65, 75, 132 of the unloading station (reloading station) described above for an order fulfillment facility 1*a*, 1*b*, 1*c*, 1*d*. The unloading device 32, 65, 75, 132 (reloading device) comprises the transfer device 147, which is spatially movable relative to a support construction 42, 142. The transfer device 147 is movable in an x-y-z direction and rotatable around a vertical axis (z-axis).

Figure 14B:
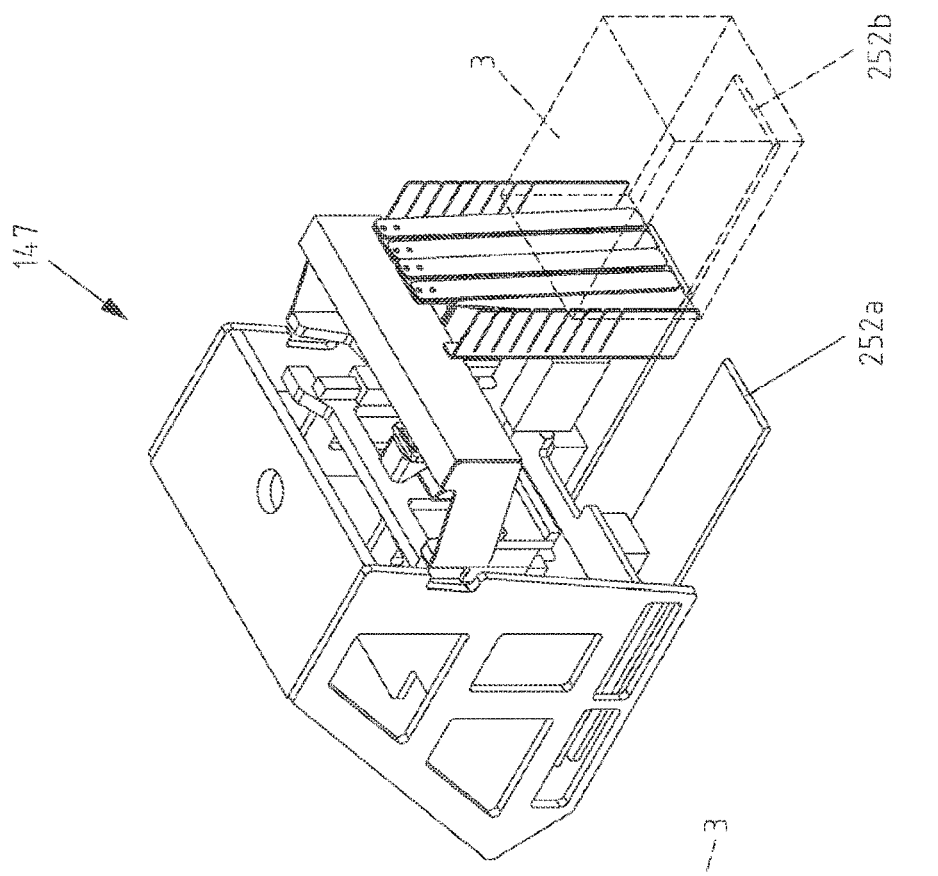
FIGS. 14a, 14b the transfer device according to FIGS. 13a, 13b, with an article carrier of a (long) first longitudinal dimension according to FIG. 14a and with an article carrier of a (short) second longitudinal dimension according to FIG. 14b in perspective views.
Figure 14A:
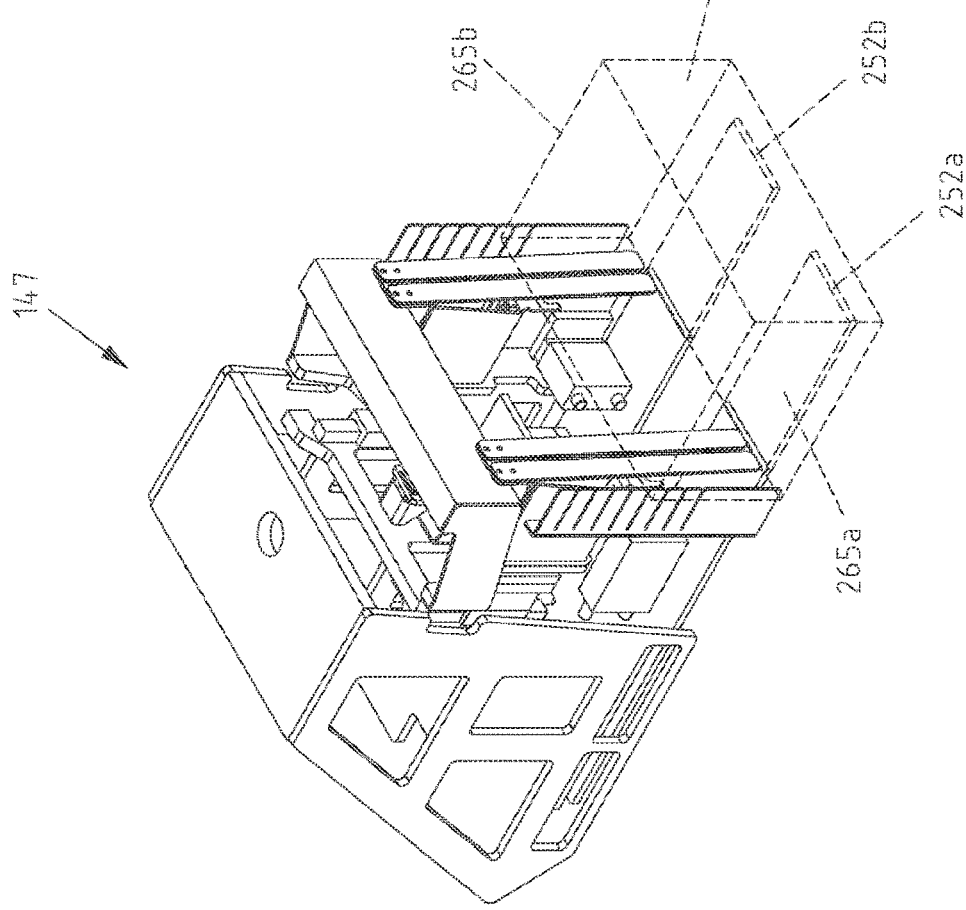
Figure 15E:
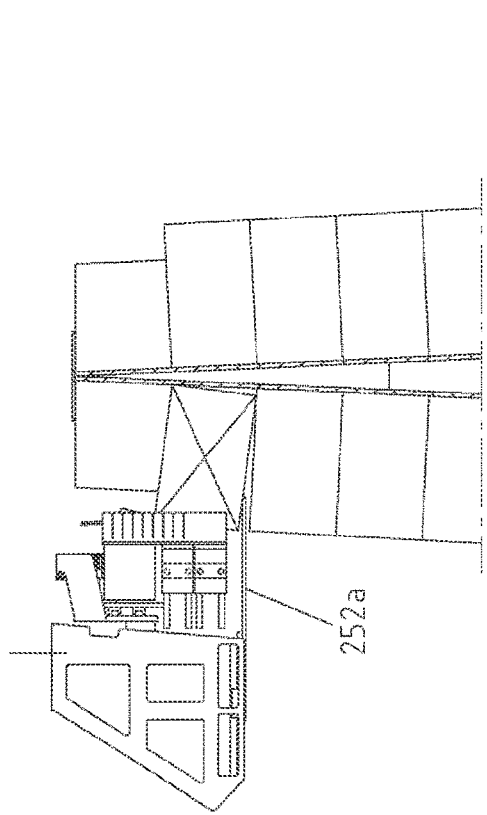
Figure 15G:
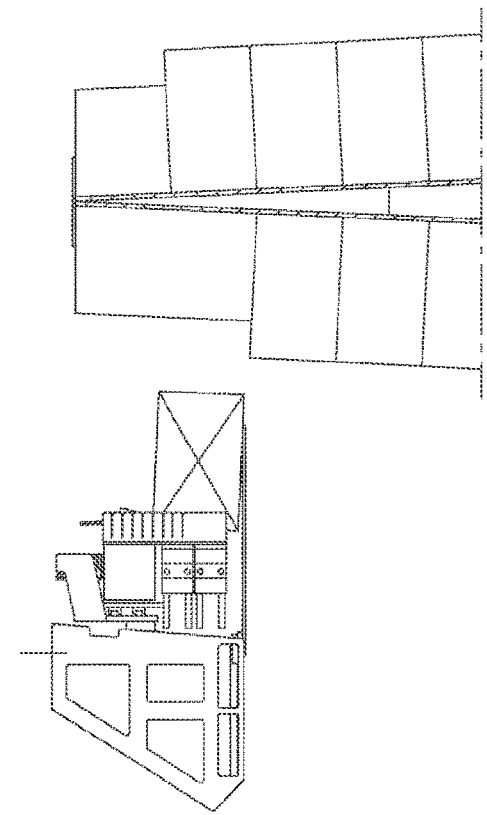
Figure 15D:
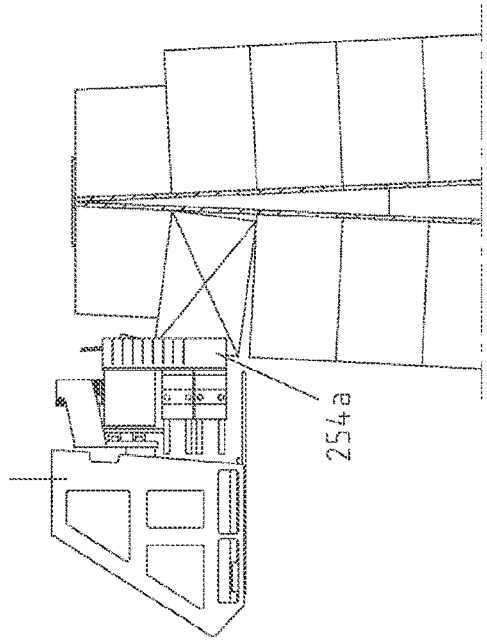
Figure 15F:
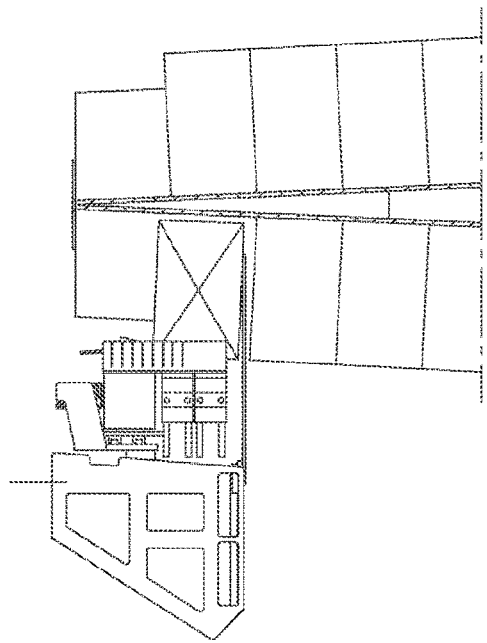

The transfer device 147 comprises:
- a base frame 250,
- loading tongues 252*a*, 252*b* movable by first drive devices 251*a*, 251*b* relative to the base frame 250 and in a first direction (y) independently of one another between a retracted initial position (as shown in FIGS. 13*a*, 13*b* with full lines) and an extended receiving position (as shown in FIGS. 14*a*, 14*b* with dashed lines), said loading tongues receiving at least one article carrier 3 in an extended receiving position,
- clamping jaws 254*a*, 254*b* movable relative to one another in a second direction (x) by at least one second drive device 253*a*, 253*b* between a retracted opened position (as shown in FIGS. 13*c*, 13*d* with dashed lines) and an abutting clamping position (as shown in FIGS. 13*c*, 13*d* and FIGS. 14*a*, 14*b* with full lines), and
- a lifting frame 256 movable in a third direction (z) relative to the base frame 250 using at least one third drive device 255, on which lifting frame the clamping jaws 254*a*, 254*b* are mounted and by means of which the clamping jaws 254*a*, 254*b* are movable between a lower height position (as shown in FIG. 15*c*) and an upper height position (as shown in FIG. 15*d*), such that, for unloading the transport loading aid 7, 107,
- the at least one article carrier 3 may be lifted by the clamping jaws 254*a*, 254*b* set against the at least one article carrier 3 (FIG. 15*d*), and
- at least one of the loading tongues 252*a*, 252*b* may be pushed at least partially under the at least one article carrier 3 lifted by the clamping jaws 254*a*, 254*b* in order to receive the at least one article carrier 3 in the extended receiving position (FIGS. 15*e* and 15*f*).

In the embodiment shown, the clamping jaws 254*a*, 254*b* are movable using second drive devices 253*a*, 253*b* between the retracted opened position and the abutting clamping position. However, only one of the clamping jaws 254*a*, 254*b*, for example the first clamping jaw 254*a*, may be movable relative to the second clamping jaw 254*b* using one single second drive device 253*a*.

As indicated in FIG. 13*c*, the first clamping jaw 254*a* and the second clamping jaw 254*b* form clamping jaw webs running parallel to one another, which, in the abutting clamping position of the clamping jaws 254*a*, 254*b*, are brought into contact with the article carrier walls 265*a*, 265*b* of an article carrier 3 facing away from one another or the article carrier walls 265*a* (FIG. 14*a*) of article carriers 3 (FIG. 16*f*) arranged next to one another. The clamping jaw webs may also form spring tongues separated by slots, which may also be placed against uneven article carrier walls 265*a*, 265*b* particularly well.

The transfer device 147 may also comprise a stop device with one or multiple stop elements 257*a*, 257*b* against which the at least one article carrier 3 may be placed, especially if the latter is on the loading tongues 252*a*, 252*b* (FIG. 14*a*) which have been moved into the extended receiving position or on the loading tongue 252*b* (FIG. 14*b*) which has been moved into the extended receiving position.

According to a possible embodiment, the first clamping jaw 254*a* is arranged on a first clamping jaw frame 258*a*, and the second clamping jaw 254*b* is arranged on a second clamping jaw frame 258*b*, wherein one of the first and second clamping jaw frames 258*a*, 258*b* is adjustable in a second direction (x) at least between a first configuration width and a second configuration width using at least one fourth drive device 259, so as to receive an article carrier 3 with a first longitudinal dimension (as shown in FIG. 14*a*—for example 600 mm) in the first configuration width between the first clamping jaw 254*a* and the second clamping jaw 254*b* and to receive an article carrier 3 with a second longitudinal dimension (as shown in FIG. 14*b*—for example 300 mm) in the second configuration width between the first clamping jaw 254*a* and the second clamping jaw 254*b*.

By the change in width, the transfer device 147 may also manipulate article carriers 3 with different longitudinal dimensions. Although only a first configuration width and a second configuration width are shown, additional configuration widths may also be additionally set as well.

It can also prove advantageous if at least one of the clamping jaws 254*a*, 254*b*, for example the clamping jaw 254*a*, as indicated in FIG. 13*a*, for loading the target loading aid is 34, 134 additionally movable in the first direction (y) relative to the frame 250 into a retracted release position using a fifth drive device 260*a*, 260*b*. In the retracted release position, the stop element(s) 257*a*, 257*b* project(s) beyond the mentioned at least one clamping jaw 254*a*, 254*b*, such that, for loading the target loading aid 34, 134, the at least one article carrier 3 may be stacked onto the target loading aid 34, 134 unhindered by the at least one loading tongue 252a, 252b. This is shown in FIGS. 15j to 15k. This embodiment is advantageous as the clamping of the article carrier 3 may be maintained until just before the article carrier 3 is discharged.

Basically, it is also conceivable that the first clamping jaw 254a and the second clamping jaw 254b are each additionally movable in the first direction (y) relative to the frame 250 into a retracted release position using a fifth drive device 260a, 260b.

As can be seen in the figures, the second drive device 253a, 253b and one of multiple stop elements 257a, 257b of the stop device are also mounted at the first or second clamping jaw frame 258a, 258b. If the fifth drive device 260a, 260b is present as well, it is also mounted at the first or second clamping jaw frame 258a, 258b.

The unloading device 32; 65; 75; 132 comprises a control device 261, as schematically shown in FIG. 13a, which is connected to the first drive device 251a, 251b, the second drive device 253a, 253b, the third drive device 255 and, if applicable, the fourth drive device 259, and, if applicable, the fifth drive device 260a, 260b. The first, second, third, and, if applicable, fourth, fifth drive devices 251a, 251b, 253a, 253b, 255, (259), (260a, 260b) comprise electric and/or fluidic linear drives, for example.

The transfer device 147 may also be equipped with a first sensor mechanism, by means of which the removing operation may be monitored during removal of the at least one article carrier 3 from the transport loading aid 7, 107. For example, a stack height of the article carrier stack 8 is detected. Based on the stack height and by detection of the article carriers 3 which are to be unloaded at the unloading device 32; 65; 75; 132, the exact receiving level at which the loading tongue(s) 252a, 252b are to be extended into the receiving position may be determined. According to the embodiment shown, the first sensor mechanism comprises, at the first or second clamping jaw frame 258a, 258b, pivotably mounted sensing fingers 262a, 262b, which are pivoted outward in their starting position (FIG. 13a, 13b) and pivoted inward in their actuating position (FIG. 14a, 14b). The starting position and the actuating position may be detected using an inductive proximity switch (initiator), which is not shown. Preferably, the sensing fingers 262a, 262b are autonomously pivoted outward into the starting position. In the alternative, however, the first sensor mechanism may also comprise one or multiple contactless sensors, for example optical sensors, which may be used for the same purpose.

On the other hand, the unloading device 32; 65; 75; 132 may be equipped with the first sensor mechanism, by means of which a stack height of the article carrier stack 8 may be detected during removing of the at least one article carrier 3 from the transport loading aid 7, 107, as is not shown in detail. The first sensor mechanism comprises, for example, an image capturing system having at least one camera and one image evaluation unit.

The transfer device 147 may also be equipped with a second sensor mechanism, by means of which the loading operation may be monitored during loading of the target loading aid 34, 134. For example, a stack height of the order stack 101 and/or proper loading of an article carrier 3 on the order stack 101, as well as the positioning/orientation/inclination of the article carriers 3 in the order stack 101 are detected. Moreover, collision monitoring prior to loading of the target loading aid 34, 134 is possible.

The second sensor mechanism may comprise one or multiple contactless sensors, for example optical sensors. On the other hand, the transfer device 147 and/or the unloading device 32; 65; 75; 132 may be equipped with the second sensor mechanism, which may be used for the same purpose. The second sensor mechanism comprises, for example, an image capturing system having at least one camera and one image evaluation unit.

However, the control device 261 may also be connected to the first sensor mechanism and the second sensor mechanism.

In jointly described FIGS. 15a to 15g, a method or a sequence for unloading a transport loading aid, for example a transport loading aid 107 with article carriers 3 stacked on top of one another in an accommodating shaft, by clamping gripping. The article carriers 3 have a first longitudinal dimension, for example 600 mm. One width is 400 mm, for example. The unloading device 32; 65; 75; 132 is not shown in these figures for the sake of clarity.

FIG. 15a (step i) shows the movement of the transfer device 147 relative to the transport loading aid 107 by the control device 261 controlling the spatially movable transfer device 147. It can be seen that the sensing fingers 262a, 262b are still positioned above the uppermost article carrier 3.

FIG. 15b (step ii) shows the positioning of the transfer device 147 relative to the article carrier stack 8, in particular with the aid of the first sensor mechanism. If the first sensor mechanism comprises the sensing fingers 262a, 262b, the sensing fingers 262a, 262b are actuated by a lowering motion of the transfer device 147, such that they are moved into the actuating position. As already described above, the positioning of the transfer device 147 relative to the article carrier stack 8 may also be performed by an optical sensor or an image processing system (first sensor mechanism).

As shown in FIG. 15c (step iii), the transfer device 147 has reached the desired relative position (height position (z), width position (x) and depth position (y)) in which the clamping jaws 254a, 254b are positioned laterally beside article carrier walls 265a, 265b (see also FIG. 14a) of an article carrier 3. The clamping jaws 254a, 254b are in the retracted opened position. The transfer device 147 remains in the relative position until the steps according to FIGS. 15d to 15f (steps iv to vii) have been performed.

FIG. 15d (step iv) shows the clamping of the article carrier 3 by actuating the at least one second drive device 253a, 253b for moving the clamping jaws 254a, 254b in the second direction (x) relative to one another and from a retracted opened position into the abutting clamping position, and lifting of the article carrier 3 of at least one stack layer by the clamping jaws 254a, 254b placed against the article carrier 3 by actuating the at least one third drive device 255 for moving the lifting frame 256 in the third direction (z) relative to the base frame 250 and moving the clamping jaws 254a, 254b out of the lower height position into the upper height position.

FIG. 15e (step v) shows the sliding of both loading tongues 252a, 252b under the lifted article carrier 3 by actuating the first drive devices 251a, 251b relative to the base frame 250 to receive the article carrier 3 in the extended receiving position.

FIG. 15f (step vi) and FIG. 14a show the receiving position of the loading tongues 252a, 252b, in which the loading tongues 252a, 252b are completely extracted and the article carrier 3 loads the loading tongues 252a, 252b. It may be advantageous in an optional step vii) if the clamping of the article carrier 3 is released for a short period of time by actuating the at least one drive device 253a, 253b by moving at least one of the clamping jaws 254a, 254b in the second direction (x) from the abutting clamping position into the retracted opened position, such that the article carrier 3 tilts onto the loading tongues 252a, 252b.

If optional step vii) is performed, the article carrier 3 is subsequently clamped again by actuating the at least one drive device 253a, 253b by moving the clamping jaws 254a, 254b in the second direction (x) relative to one another and from a retracted opened position into the abutted clamping position.

FIG. 15a shows the movement of the transfer device 147 relative to the transport loading aid 107 by the control device 261 controlling the spatially movable transfer device 147.

The control device 261 is configured for controlling the transfer device 147 and the first/second/third drive device(s) 251a, 251b, 253a, 253b, 255 for unloading an article carrier 3 so as to carry out the method steps i) to vii).

In jointly described FIGS. 15h to 15n, a method or a sequence for loading a target loading aid, for example a target loading aid 34 in a stack loading aid 100a, is shown. For the sake of clarity, only sections of the stack loading aid 100a are shown.

After step vi) or, if applicable, step vii), the transfer device 147 with the article carrier 3 held between the clamping jaws 254a, 254b is moved relative to the target loading aid 34 by the control device 261 controlling the spatially movable transfer device 147, as shown in FIG. 15h (step i).

FIG. 15h shows that the target loading aid 34 has already been loaded with some article carriers 3. The additional article carrier 3 is to be placed on the article carrier 3', which is shown hatched and is already at the target loading aid 34. The article carrier 3' is in the edge region of the stack wall 206b.

FIG. 15i (step ii) shows the positioning of the transfer device 147 (with the additional article carrier 3) relative to the order stack 101, in particular with the aid of the second sensor mechanism. In FIG. 15i, the transfer device 147 and/or the article carrier 3 in are in an intermediate position (height position (z), width position (x) and/or depth position (y)).

FIG. 15j (step iii) shows how for loading the target loading aid 34, the clamping jaw 254b, which faces the stack wall 206b, is moved in the first direction (y) relative to the frame 250 and into the retracted release position using the fifth drive device 260b. As can be seen, the stop element(s) 257a, 257b project(s) beyond the mentioned clamping jaw 254b after the latter has been moved into the release position.

FIG. 15k (step iv) shows the positioning of the transfer device 147 and/or of the article carrier 3 from the intermediate position (height position (z), width position (x) and/or depth position (y)) into the end position (height position (z), width position (x) and depth position (y)), in which the additional article carrier 3 may be loaded onto the article carrier 3' already located at the target loading aid 34. The article carrier 3 may be positioned into the end position by moving the transfer device 147.

FIG. 15l (step v) shows the movement of the clamping jaw 254a from the abutting clamping position into the retracted opened position. The article carrier 3 still stands on the loading tongues 252a, 252b if both loading tongues 252a, 252b have been moved into the receiving position, or on one of the loading tongues 252a, 252b if only one of the loading tongues 252a, 252b has been moved into the receiving position.

FIG. 15m (step vi) shows loading/discharge of the article carrier 3 onto the article carrier 3'. For this purpose, the loading tongues 252a, 252b are moved into the retracted initial position if both loading tongues 252a, 252b have been moved into the receiving position, or the one loading tongue 252a, 252b is moved into the retracted initial position if only one of the loading tongues 252a, 252b has been moved into the receiving position.

FIG. 15n shows the movement of the transfer device 147 relative to the transport loading aid 107 by the control device 261 controlling the spatially movable transfer device 147.

It should be noted at this point that, from the transfer device 147, either an individual article carrier 3 or a partial article carrier stack may be removed from the transport loading aid 7, 107 and loaded onto the target loading aid 34, 134. Instead of an article carrier 3 having the first longitudinal dimension (for example 600 mm), two article carriers 3 having the second longitudinal dimension (for example 300 mm) may simultaneously be removed from the transport loading aid 7, 107 and loaded onto the target loading aid 34, 134. The width dimensions are preferably identical, for example 400 mm.

It is also possible that for stabilizing the order stack 101, one or multiple empty article carriers 3 are stacked between stack layers in a stack plane. If the article carriers are collapsible containers, a collapsed container or multiple collapsed containers are stacked in a stack plane between stack layers. This is also performed automatically by the transfer device 147.

Figure 16B:
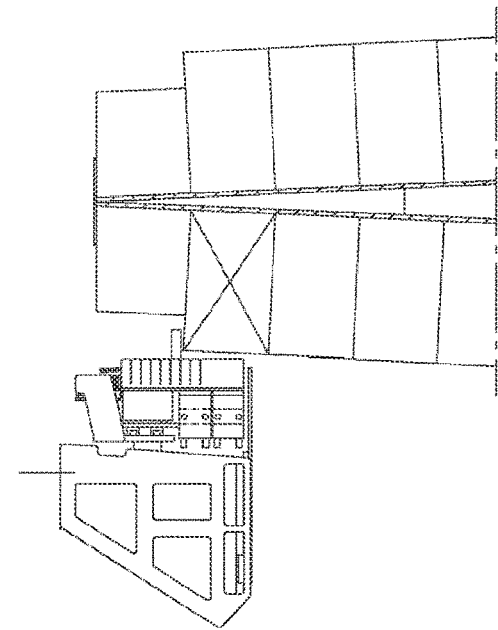
FIGS. 16a to 16o a sequence for an unloading operation of an article carrier of a stack layer from a transport loading aid, using the example of article carriers with a second longitudinal dimension each.
Figure 16C:
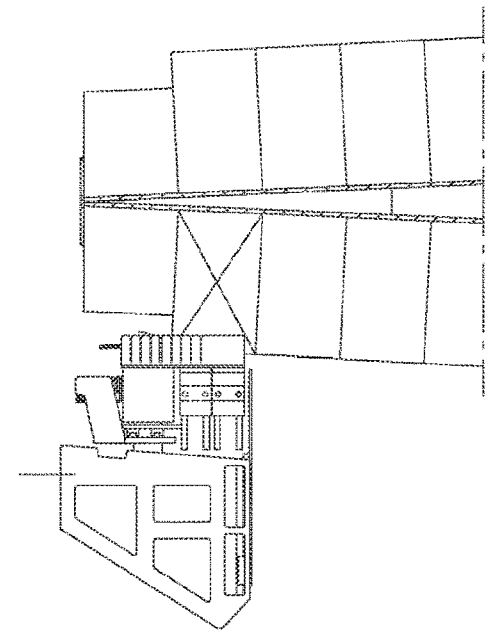
Figure 16A:
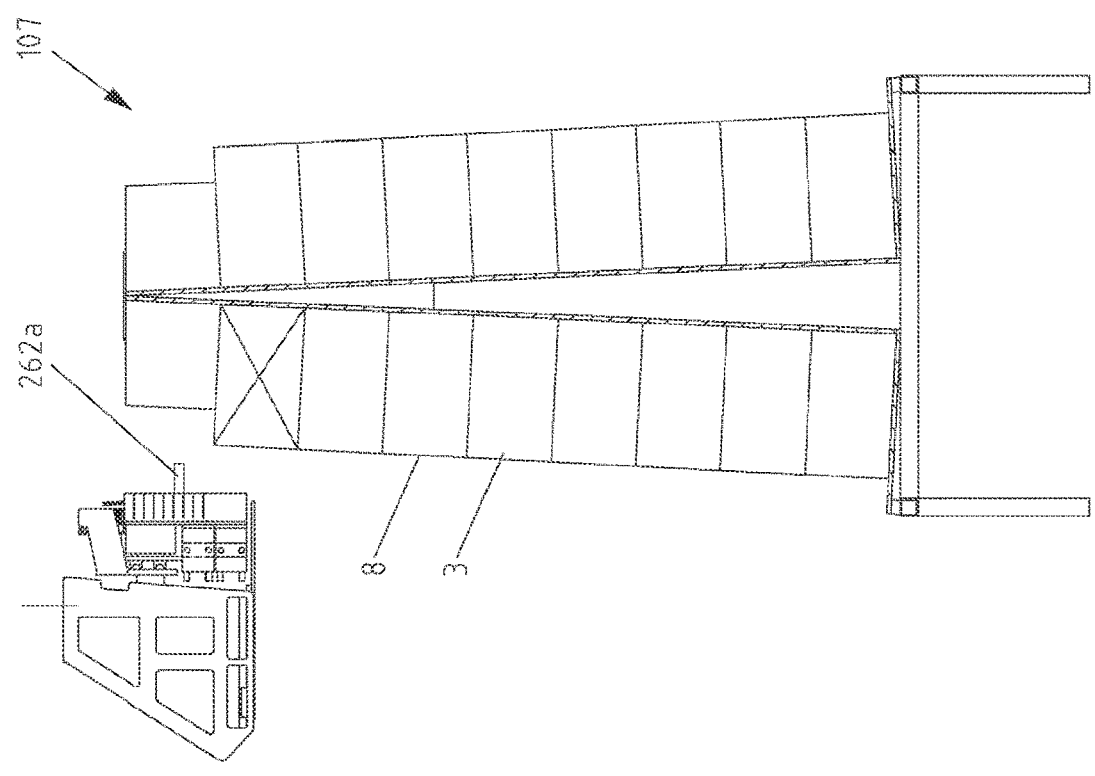
Figure 16D:
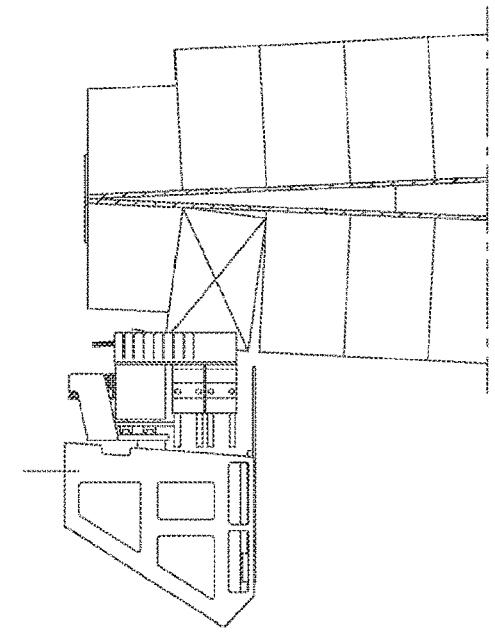
Figure 16E:
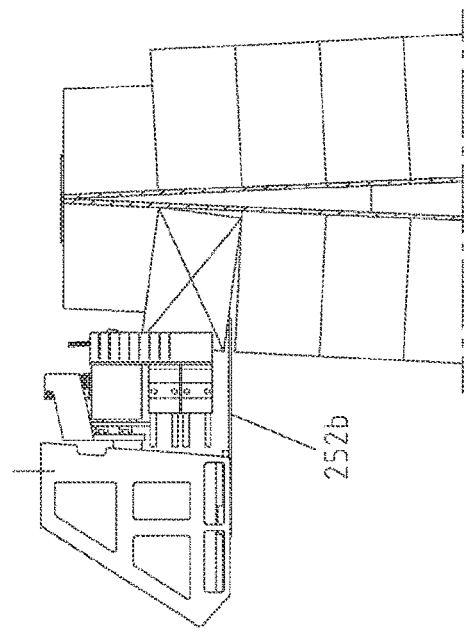
Figure 16F:
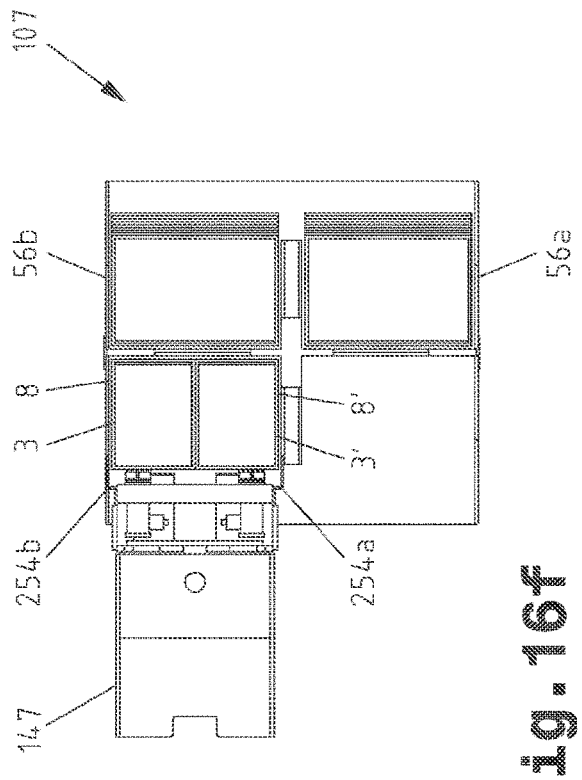
Figure 16G:
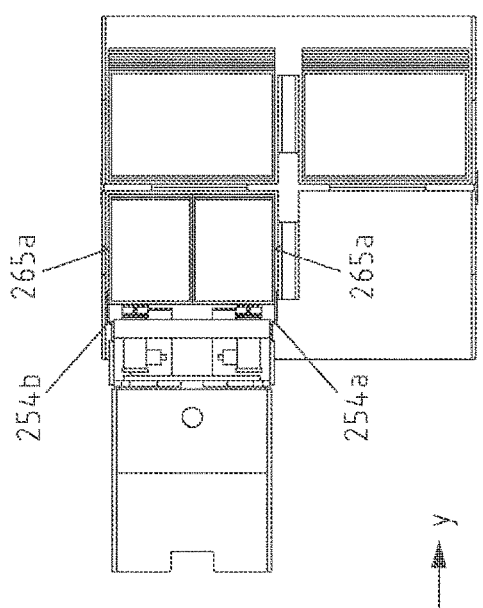
Figure 16M:
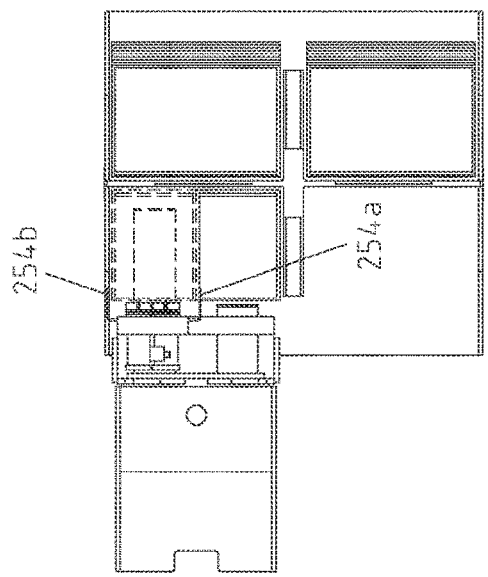
Figure 16O:
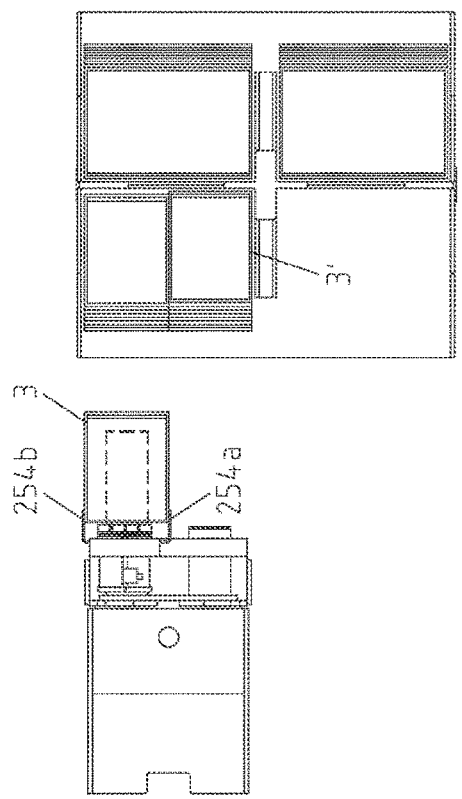
Figure 16L:
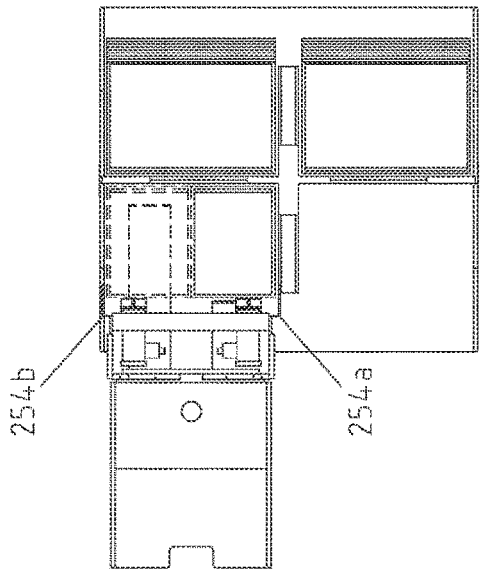
Figure 16N:
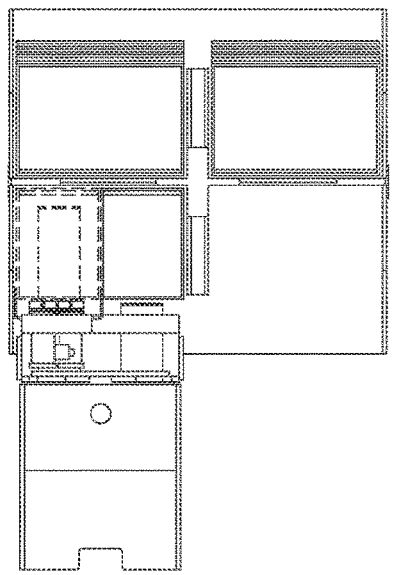

In jointly described FIGS. 16a to 16n, a method or a sequence for unloading a transport loading aid, for example a transport loading aid 107 with article carriers 3, 3' stacked on top of one another in an accommodating shaft and arranged next to one another in a stack layer, by clamping gripping. The article carriers 3, 3' have a second longitudinal dimension, for example 300 mm. One width is 400 mm, for example. The unloading device 32; 65; 75; 132 is not shown in these figures for the sake of clarity.

FIG. 16a (step i) shows the movement of the transfer device 147 relative to the transport loading aid 107 by the control device 261 controlling the spatially movable transfer device 147. It can be seen that the sensing fingers 262a, 262b are still positioned above the uppermost article carriers 3, 3'.

FIG. 16b (step ii) shows the positioning of the transfer device 147 relative to the article carrier stacks 8, 8', in particular with the aid of the second sensor mechanism. If the first sensor mechanism comprises the sensing fingers 262a, 262b, the sensing fingers 262a, 262b are actuated by a lowering motion of the transfer device 147, such that they are moved into the actuating position. As already described above, the positioning of the transfer device 147 relative to the article carrier stacks 8, 8' may also be performed by one or multiple optical sensor(s) or an image processing system (first sensor mechanism).

As shown in FIGS. 16c and 16d (step iii), the transfer device 147 has reached the desired relative position (height position (z), width position (x) and depth position (y)) in which the clamping jaws 254a, 254b are positioned laterally beside article carrier walls 265a facing away from one another of article carriers 3, 3' arranged next to one another. The clamping jaws 254a, 254b are in the retracted opened position. The transfer device 147 remains in the relative position until the steps according to FIGS. 16d to 16n (steps iv to ix) have been performed.

FIGS. 16e and 16f (step iv) show the clamping of the article carriers 3, 3' arranged next to one another by actuating the at least one second drive device 253a, 253b for moving the clamping jaws 254a, 254b in the second direction (x) relative to one another and from a retracted opened position into the abutting clamping position, and simultaneously lifting the article carriers 3, 3' arranged next to one another of at least one stack layer by the clamping jaws 254a, 254b placed against the article carriers 3, 3' by actuating the at least one third drive device 255 for moving the lifting frame 256 in the third direction (z) relative to the base frame 250 and moving the clamping jaws 254a, 254b out of the lower height position into the upper height position.

FIGS. 16g and 16h (step v) show sliding one of the loading tongues 252a, 252b, namely specifically of loading tongue 252b, under one of the article carriers 3 lifted and arranged next to one another by actuating one of the first drive devices 251a, 251b, namely specifically the first drive device 251b, relative to the base frame 250 to receive the one of the article carriers 3 in the extended receiving position.

FIGS. 16i and 16j (step vi) show the receiving position of the loading tongue 252b, in which the loading tongue 252b is completely extracted and the article carrier 3 loads the loading tongue 252b.

FIGS. 16k and 16l (step vii) show the short releasing of the clamping of the article carriers 3, 3' by actuating the at least one second drive device 253a, 253b in order to move at least one of the clamping jaws 254a, 254b in the second direction (x) from the abutting clamping position into the retracted opened position, such that the article carrier 3', which is not supported from below, tilts back onto the article stack 8' in the transport loading aid 107.

FIG. 16m (step viii) shows the change of the configuration width from the first configuration width (see FIGS. 16k, 16l) to the second configuration width (FIG. 16m) using the at least one fourth drive device 259 in a second direction (x).

FIG. 16n (step ix) shows the clamping of the article carrier 3, which is received on the loading tongue 252a moved into the extended receiving position, by actuating the at least one second drive device 253a, 253b for moving the clamping jaws 254a, 254b relative to one another in the second direction (x) and from a retracted opened position into the abutting clamping position.

FIG. 16o shows the movement of the transfer device 147 relative to the transport loading aid 107 by the control device 261 controlling the spatially movable transfer device 147.

The control device 261 is configured for controlling the transfer device 147 and the first/second/third drive device(s) 251a, 251b, 253a, 253b, 255, 259 for unloading an article carrier 3 so as to carry out the method steps i) to ix).

If after loading the target loading aid 34, 134 with the article carrier 3, the article carrier 3' is supposed to be loaded onto the target loading aid 34, 134 as well, for unloading according to method steps i) to vii), the approach according to FIGS. 15a to 15f is performed, with the mere difference that the second configuration width remains adjusted or is adjusted, in which the article carrier 3' with the second longitudinal dimension is received between the first clamping jaw 254a and the second clamping jaw 254b.

As regards the loading of a target loading aid, reference is made to the disclosure regarding FIGS. 15h to 15m, and it is performed in the same manner, with the mere difference that the article carrier 3 is unloaded using one of the loading tongues 252a, 252b.

It should be noted at this point that, using the transfer device 147, either an individual article carrier 3, 3' or a partial article carrier stack may be removed from the transport loading aid 7, 107 and loaded onto the target loading aid 34, 134.

The described order fulfillment facility and method for storing and picking is particularly suitable for the fresh food sector where perishable goods, such as fresh fruit and vegetables, require a fast turnover of articles and usually only a limited number of different types have to be picked at the same time. The articles 2/article carrier 3 may be handled particularly efficiently with a high picking performance in short periods of time.

Finally, it should also be noted that the scope of protection is determined by the claims. However, the description and the drawings are to be adduced for construing the claims. Individual features or feature combinations from the different exemplary embodiments shown and described may represent independent inventive solutions.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

1a . . . 1d order fulfillment facility
2 article(s)
3 article carrier
4 delivery zone
5 storage area
6 order processing zone
7, 7a . . . 7f transport loading aid
8 article carrier stack
8' (pre-) picked article carrier stack
8" (pre-) picked article carrier partial stack
9 transport vehicle (floor conveyor)
10 article carrier stack group
11 depalletizing device
12a, 12b conveying device
13 loading device
14a, 14b conveying device
15a, 15b transfer location
16a, 16b provisioning location
17 transfer device loading device
18 support construction
19 gantry slide
20 gantry arm
30 buffer surface loading station
31 storage surface
32 unloading device
33 conveying device
34a . . . 34c target loading aid
35 conveying device
36 buffer surface unloading station/reloading station
37 waiting zone
40a . . . 40b provisioning location
41 transfer device unloading device/reloading device
42 support construction
43 gantry slide
44 gantry slide
45 gantry arm
46 order-processing computer
47 control system
50 chassis
51 loading platform
52 wheel
53 steerable wheel
54 drive control
55 base
56a first side wall
56b, 56d first side wall
56c second side wall 57 loading and unloading opening
57a, 57b loading and unloading opening
58 placing surface
59 transport surface
60 adjustable foot
61 lead-in chamfer
65 unloading device
66 buffer surface
66a, 66b buffer surface
67a, 67b provisioning location
68a, 68b conveying device
69 transfer device
70a, 70b take-over location
71a, 71b provisioning location
75 unloading device
76 buffer surface
76a, 76b buffer surface
77a, 77b provisioning location
81 support construction
82 gantry slide
83 overhead arm
84 transfer device
90 cleaning robot
91a, 91b temperature zone
92a, 92b data carrier
92c data carrier
100a, 100b stack loading aid
101 order stack
107 transport loading aid
112a, 112b conveying device
113 loading device
114a, 114b conveying device
117 transfer device
118 support construction
119 gantry slide
120 gantry arm
132 unloading device
134 target loading aid
136 buffer surface stack loading aid
139a . . . 139b provisioning location stack loading aid automatic unloading device
142 support construction
143 gantry slide
144 gantry arm
145 gantry slide
146 gantry slide
147 transfer device unloading device/reloading device
150 transport loading aid
151 unloading device
152a provisioning location transport loading aid automatic unloading device
152b provisioning location stack loading aid automatic unloading device
153a buffer surface transport loading aid
153b buffer surface stack loading aid
154a, 154b lifting platform
155 working area
156 working surface
160 loading device
161 provisioning location second loading device
162 transfer device
163 buffer surface
170 lading device
171 provisioning location lading device
172 transfer device
173 buffer surface
180 load securing device
181 securing means
182 provisioning location
183 lifting frame
184 telescopic fork
185 buffer surface
200a, 200b side wall part
201a, 201b base wall part
205 base
206a, 206b stack wall
207 placing surface
208 transport surface
210 receiving channel
211 placing block
212 adjustable foot
250 base frame
251a, 251b first drive device loading tongue
252a, 252b loading tongue
253a, 253b second drive device clamping jaw
254a, 254b clamping jaw
255 third drive device lifting frame
256 lifting frame
257a, 257b stop element
258a, 258b clamping jaw frame
259 fourth drive device adjustment width configuration
260a, 260b fifth drive device clamping jaw release position
261 control device
262a, 262b sensing finger
265a, 265b article carrier wall

The invention claimed is:

1. A method for storing and picking article carriers that contain articles and are stackable in an order fulfillment facility, the method comprising the steps of:
providing a plurality of autonomously moveable, driverless transport vehicles, each of the autonomously moveable, driverless transport vehicles having a chassis with a drive unit and a loading platform arranged on the chassis for receiving a mobile transport loading aid,
providing article carrier stacks of multiple article carriers arranged on top of one another in a delivery zone of the order fulfillment facility,
providing mobile transport loading aids, each of the mobile transport loading aids being configured for receiving and stabilizing a position of at least one of the article carrier stacks, wherein the mobile transport loading aids comprise a plurality of empty transport loading aids,
transporting empty transport loading aids of the plurality of empty transport loading aids using autonomously moveable, driverless transport vehicles of the plurality of autonomously movable, driverless transport vehicles to a loading station and providing at least one of the empty transport loading aids at an automatically operated first loading device or on a buffer surface close to the automatically operated first loading device,
loading the at least one empty transport loading aid provided at the automatically operated first loading device with at least one of the article carrier stacks from the delivery zone using the automatically operated first loading device in order to provide at least one loaded transport aid,
transporting the at least one loaded transport loading aid containing the at least one article carrier stack from the loading station to a storage zone using an autonomously moveable, driverless transport vehicle of the autonomously moveable, driverless transport vehicles, placing the at least one loaded transport loading aid containing the at least one article carrier stack on a storage surface in the storage zone, storing the at least one loaded transport loading aid containing the at least one article carrier stack, and processing a picking order comprising the steps of:

transporting the at least one loaded transport loading aid containing the article carriers required for the picking order from the storage zone to an unloading station and providing the at least one loaded transport loading aid at an automatically operated unloading device or on a buffer surface close to the automatically operated unloading device using an autonomously moveable, driverless transport vehicle of the autonomously moveable, driverless transport vehicles, unloading the at least one loaded transport loading aid provided at the automatically operated unloading device by removing the article carriers required for processing the picking order, and assembling the article carriers on at least one target loading aid for the picking order in an order processing zone of the order fulfillment facility.

2. The method for storing and picking article carriers according to claim 1, further comprising the steps of:

acquiring picking orders on an order-processing computer, determining the articles required for one of the picking orders, analyzing a stock of the articles required for the picking order, the picking order comprising at least one first article carrier containing the articles and at least one second article carrier containing the articles, assembling the article carriers for the picking order in consecutive picking steps if a required quantity of an article exceeds the stock of the article, wherein i) in a first picking step, at least one empty transport loading aid is loaded with the at least one first article carrier at the automatically operated unloading device in order to provide at least one partially loaded transport loading aid, and subsequently the at least one partially loaded transport loading aid is transported from the automatically operated unloading device to a buffer surface using an autonomously moveable, driverless transport vehicle of the autonomously moveable, driverless transport vehicles and is buffered at the buffer surface, and ii) in a second picking step, the at least one partially loaded transport loading aid is transported from the buffer surface to the automatically operated unloading device using an autonomously moveable, driverless transport vehicle of the autonomously moveable, driverless transport vehicles and is provided at the automatically operated unloading device if a required quantity of an article falls below the stock of the article, and subsequently the at least one partially loaded transport loading aid is loaded with the at least one second article carrier in order to provide the at least one loaded transport loading aid, transporting the at least one loaded transport loading aid from the automatically operated unloading device to an automatically operated reloading device using an autonomously moveable, driverless transport vehicle of the autonomously moveable, driverless transport vehicles after steps i) and ii) have been concluded, and transferring the article carriers comprising the at least one first article carrier and the at least one second article carrier onto a target loading aid using the automatically operated reloading device.

3. The method for storing and picking article carriers according to claim 1, further comprising at least one of the steps of:

transporting a transport loading aid from the unloading station back into the storage zone after removing of the article carriers, if not all of the article carriers have been removed from the transport loading aid, transporting a transport loading aid from a first automatically operated unloading device to a second automatically operated unloading device after removing of the article carriers, if not all of the article carriers have been removed from the transport loading aid and if the article carriers are needed at the second unloading device for the picking order, transporting a transport loading aid from the automatically operated unloading device to a waiting zone in the unloading station after removing of the article carriers, if not all of the article carriers have been removed from the transport loading aid and if the article carriers are needed at the automatically operated unloading device for an already advised picking order, and transporting a transport loading aid back to the loading station after removing of the at least one of the article carrier stacks and providing the transport loading aid at the automatically operated first loading device or on the buffer surface, if all article carriers have been removed from the transport loading aid.

4. The method for storing and picking article carriers according to claim 1, further comprising the steps of:

providing a depalletizing station in the delivery zone, separating article carrier stacks of an article carrier stack group assembled from article carrier stacks each of multiple article carriers arranged on top of one another using an automatically operated depalletizing device provided at the depalletizing station, and transporting the article carrier stacks from the automatically operated depalletizing device to at least one automatically operated first loading device.

5. The method for storing and picking article carriers according to claim 1, wherein the article carriers are selected from the group consisting of containers and cartons.

6. The method for storing and picking article carriers according to claim 1, wherein the article carriers have different dimensions.

7. The method for storing and picking article carriers according to claim 1, further comprising the steps of:

providing a cleaning system with an automatically operated cleaning robot, and cleaning at least one of the transport loading aids and a floor in the delivery zone, the storage zone and the order processing zone with the automatically operated cleaning robot.

8. The method for storing and picking article carriers according to claim 1, wherein each of the article carrier stacks loaded onto the transport loading aids at the automatically operated first loading device has article carriers arranged on top of one another and storing identical articles.

9. The method for storing and picking article carriers according to claim 1, further comprising the steps of:

providing a plurality of loaded transport loading aids comprising loaded transport aids respectively containing at least one article carrier stack of article carriers arranged on top of one another and storing articles of a first article group and loaded transport loading aids respectively containing at least one article carrier stack of article carriers arranged on top of one another and storing articles of a second article group, providing a first temperature zone in the storage zone, in which the loaded transport loading aids respectively containing the at least one article carrier stack of article carriers arranged on top of one another and storing articles of the first article group are disposed, providing a second temperature zone in the storage zone, in which the loaded transport loading aids respectively containing the at least one article carrier stack of article carriers arranged on top of one another and containing articles of the second article group are disposed, defining the first article group and the second article group, to which first article group, articles of a first storage temperature are assigned and to which second article group, articles of a second storage temperature are assigned, and detecting data comprising the first storage temperature for the articles of the first article group and the second storage temperature for the articles of the second article group, on a computer system, identifying at least one of the article carriers, the article carrier stacks and the loaded transport loading aids using a detection device provided in the delivery zone by reading a data carrier, the data carrier being affixed in each case on the at least one of the article carriers, the article carrier stacks and the loaded transport loading aids, selectively transporting the loaded transport loading aids respectively containing at least one article carrier stack, using autonomously moveable, driverless transport vehicles of the autonomously moveable, driverless transport vehicles, into one of the first temperature zone and the second temperature zone, storing the loaded transport loading aids respectively containing the at least one article carrier stack of article carriers arranged on top of one another and storing the articles of the first article group in the first temperature zone, and storing the loaded transport loading aids respectively containing the at least one article carrier stack of article carriers arranged on top of one another and storing the articles of the second article group in the second temperature zone.

10. The method for storing and picking article carriers according to claim 9, further comprising the steps of:
transporting at least one of the loaded transport loading aids containing the article carriers required for a first picking order from the first temperature zone and transporting at least one of the loaded transport loading aids containing the article carriers required for a second picking order from the second temperature zone to the unloading station using a shared, automatically operated unloading device, providing the loaded transport loading aid for the first picking order at the automatically operated unloading device or on a buffer surface close to the automatically operated unloading device using an autonomously moveable, driverless transport vehicle of the autonomously moveable, driverless transport vehicles, providing the loaded transport loading aid for the second picking order at the automatically operated unloading device or on a buffer surface close to the automatically operated unloading device using an autonomously moveable, driverless transport vehicle of the autonomously moveable, driverless transport vehicles, and sequentially assembling article carrier stacks on a first target loading aid with multiple article carrier stacks of article carriers arranged on top of one another and storing articles of the first article group, and assembling article carrier stacks on a second target loading aid with multiple article carrier stacks of article carriers arranged on top of one another and storing articles of the second article group using the shared, automatically operated unloading device of the unloading station.

11. The method for storing and picking article carriers according to claim 1, further comprising the step of:
providing stack loading aids in each case for stabilizing a position of an order stack assembled of the article carriers according to the picking order, wherein the stack loading aids comprise at least one first stack loading aid and at least one second stack loading aid, each of which comprise a base and stack walls connected to the base, and at least one of the steps of:
lading the first stack loading aid with a target loading aid at a lading station using at least one automatically operated lading device, by placing the target loading aid on the base if a first stack loading aid is used in the order fulfillment facility, and defining the second stack loading aid as the target loading aid if a second stack loading aid is used in the order fulfillment facility.

12. The method for storing and picking article carriers according to claim 11, further comprising the steps of:
transporting the stack loading aids using the autonomously moveable, driverless transport vehicles to the unloading station and providing at least one stack loading aid at at least one automatically operated unloading device or on a buffer surface close to the automatically operated unloading device, and assembling the article carriers according to the picking order to the order stack on the target loading aid in the first stack loading aid or on the base of the second stack loading aid, wherein the first stack loading aid or the second stack loading aid is provided at the automatically operated unloading device.

13. The method for storing and picking article carriers according to claim 11, further comprising the steps of:
providing an order stack load securing station with at least one automatically operated load securing device or with at least one automatically operated load securing device and a buffer surface close to the automatically operated load securing device, the automatically operated load securing device being formed for secure transport of an order stack with a securing means, transporting the stack loading aids each loaded with one order stack using autonomously moveable, driverless transport vehicles of the autonomously moveable, driverless transport vehicles to the order stack load securing station and providing at least one stack loading aid on the automatically operated load securing devices or on the buffer surface close to the automatically operated load securing device, removing the order stack from the stack loading aid using a lifting device which lifts the target loading aid with the order stack from the first stack loading aid, if the order fulfillment facility comprises the first stack loading aid or which lifts the order stack from the second stack loading aid if the order fulfillment facility comprises the second stack loading aid, securing the order stack by placing the securing means circumferentially around the order stack, transporting the secured order stack using an autonomously moveable, driverless transport vehicle of the autonomously moveable, driverless transport vehicles from the load securing station to a dispatch zone, and transporting the unloaded stack loading aids using an autonomously moveable, driverless transport vehicle of the autonomously moveable, driverless transport vehicles, the step of transporting the unloaded stack loading aids comprising at least one of the steps of:

transporting the first stack loading aid from the load securing station to the lading station with the at least one automatically operated lading device, if a first stack loading aid is used in the order fulfillment facility, and transporting the second stack loading aid from the load securing station to the unloading station and providing the second stack loading aid at an automatically operated unloading device or on a buffer surface close to the automatically operated reloading device, if a second stack loading aid is used in the order fulfillment facility.

14. The method for storing and picking article carriers according to claim 1, wherein removing the article carriers required for processing the picking order comprises at least one of the steps of:

removing a quantity of the article carriers that is lower than a quantity of the article carriers of the at least one article carrier stack, and removing a quantity of the article carriers that is equal to a quantity of the article carriers of the at least one article carrier stack.

15. The method for storing and picking article carriers according to claim 14, wherein the article carriers for the picking order are assembled by removing the article carriers from the at least one loaded transport loading aid onto a target loading aid using the automatically operated unloading device.

16. The method for storing and picking article carriers according to claim 14, wherein assembling the article carriers for the picking order comprises the step of:

discharging the article carriers removed at the automatically operated unloading device onto a stationary conveyor system arranged between the unloading station and a reloading station with at least one automatically operated reloading device, and transporting the article carriers by the stationary conveyor system from the automatically operated unloading device to the at least one automatically operated reloading device, and transferring the article carriers to the target loading aid by the automatically operated reloading device, or discharging the article carriers removed at the automatically operated unloading device onto at least one another empty transport loading aid of the mobile transport loading aids in order to provide at least one another loaded transport loading aid, and transporting the at least one another loaded transport loading aid containing the article carriers by an autonomously moveable, driverless transport vehicle of the autonomously moveable, driverless transport vehicles from the automatically operated unloading device to the at least one automatically operated reloading device, and transferring the article carriers to the target loading aid by the automatically operated reloading device.

17. The method for storing and picking article carriers according to claim 16, wherein the article carriers removed at the automatically operated unloading device are consecutively discharged in a sequence onto the stationary conveying system or the at least one another empty transport loading aid and are subsequently transported to the at least one automatically operated reloading device in the sequence.

18. The method for storing and picking article carriers according to claim 16, wherein the article carriers removed at the automatically operated unloading device are discharged onto the stationary conveying system or the at least one another empty transport loading aid in such a way that at least one pre-picked article carrier stack of multiple article carriers arranged on top of one another is assembled, and the at least one pre-picked article carrier stack is subsequently transported to the automatically operated reloading device.

19. The method for storing and picking article carriers according to claim 16, further comprising the step of assembling article carrier stacks on the target loading aid with multiple article carrier stacks using the automatically operated reloading device provided at the reloading station.

20. The method for storing and picking article carriers according to claim 1, further comprising the steps of:

providing an automatically operated second loading device, providing article carrier stack groups of multiple article carrier stacks arranged next to one another with article carriers arranged on top of one another in the delivery zone of the order fulfillment facility, providing another mobile transport loading aids, each of the another mobile transport loading aids being configured for receiving and stabilizing a position of an article carrier stack group, wherein the another mobile transport loading aids comprise empty transport loading aids, transporting empty transport loading aids using autonomously moveable, driverless transport vehicles of the autonomously moveable, driverless transport vehicles to the loading station and providing at least one of the empty transport loading aids at the automatically operated second loading device or on a buffer surface close to the automatically operated second loading device, loading the at least one empty transport loading aid provided at the automatically operated second loading device with at least one article carrier stack group from the delivery zone using the automatically operated second loading device in order to provide at least one loaded transport loading aid, transporting the at least one loaded transport loading aid containing the at least one article carrier stack group from the loading station to the storage zone using an autonomously moveable, driverless transport vehicle of the autonomously moveable, driverless transport vehicles, placing the at least one loaded transport loading aid containing the at least one article carrier stack group on the storage surface in the storage zone, storing the at least one transport loading aid containing the at least one article carrier stack group in the storage zone, and processing the picking order comprising the steps of:
transporting at least one of the loaded transport loading aids containing the article carriers required for the picking order from the storage zone to the unloading station and providing the loaded transport loading aid at a semi-automated unloading device or on a buffer surface close to the semi-automated unloading device using at least one autonomously moveable, driverless transport vehicle of the autonomously moveable, driverless transport vehicles, manually unloading the at least one loaded transport loading aid provided at the semi-automated unloading device by removing the article carriers required for processing the picking order, and manually assembling the article carriers on at least one target loading aid for the picking order at the semi-automated unloading device.

21. The method for storing and picking article carriers according to claim 20, wherein providing the loaded transport loading aid at the semi-automated unloading device comprises the steps of:

taking over the loaded transport loading aid from an autonomously moveable, driverless transport vehicle of the autonomously moveable, driverless transport vehicles to a lifting platform of the semi-automated unloading device, and providing the article carriers at a provisioning level by lifting the loaded transport loading aid placed on the lifting platform in order to enable ergonomic unloading of the article carriers by a picker.

22. The method for storing and picking article carriers according to claim 20, further comprising the steps of:

transporting empty target loading aids using autonomously moveable, driverless transport vehicles of the autonomously moveable, driverless transport vehicles to the unloading station and providing at least one of the empty target loading aids at the semi-automated unloading device or on a buffer surface close to the semi-automated unloading device using an autonomously moveable, driverless transport vehicle of the autonomously moveable, driverless transport vehicles, and manually assembling the article carriers on at least one empty target loading aid for the picking order at the semi-automated unloading device.

23. The method for storing and picking article carriers according to claim 20, further comprising the steps of:

transporting at least one partially loaded target loading aid using an autonomously moveable, driverless transport vehicle of the autonomously moveable, driverless transport vehicles from the automatically operated unloading device to the semi-automated unloading device or to a buffer surface close to the semi-automated unloading device after the article carriers have been assembled on the at least one partially loaded target loading aid at the automatically operated unloading device and if article carriers are still required for the picking order which are provided via the at least one loaded target loading aid at the semi-automated unloading device, and manually assembling the article carriers on the at least one partially loaded target loading aid for the picking order at the semi-automated unloading device.

24. The method for storing and picking article carriers according to claim 20, further comprising the steps of:

providing stack loading aids in each case for stabilizing a position of an order stack assembled of the article carriers according to the picking order, wherein the stack loading aids comprise at least one first stack loading aid and at least one second stack loading aid, each of which comprise a base and stack walls connected to the base, transporting the stack loading aids using autonomously moveable, driverless transport vehicles of the autonomously moveable, driverless transport vehicles to the unloading station and providing at least one of the multiple stack loading aids at the semi-automated unloading device or on a buffer surface close to the semi-automated unloading device, and assembling the article carriers according to the picking order to the order stack on the target loading aid in the first stack loading aid or on the base of the second stack loading aid at the semi-automated unloading device.

25. An order fulfillment facility for storing and picking article carriers which contain articles and are stackable, the order fulfillment facility comprising:

an order-processing computer for acquiring a picking order and for determining articles which are required for the picking order, a delivery zone for providing article carrier stacks of multiple article carriers arranged on top of one another, a plurality of mobile transport loading aids, each of the mobile transport loading aids of the plurality of mobile transport loading aids being configured for receiving and stabilizing a position of at least one of the article carrier stacks, wherein the plurality of mobile transport loading aids comprise a plurality of empty transport loading aids, a loading station having at least one automatically operated first loading device or at least one automatically operated first loading devices and a buffer surface close to the automatically operated first loading device, wherein the automatically operated first loading device is configured for loading one of the empty transport loading aids with at least one article carrier stack in order to provide at least one loaded transport loading aid, wherein the empty transport loading aid is provided for loading at the automatically operated first loading device, a storage zone for storing the at least one loaded transport loading aid containing the at least one article carrier stack, an unloading station with at least one automatically operated unloading device for unloading at least one of the loaded transport loading aids by removing the article carriers required for processing a picking order, wherein the loaded transport loading aids are provided for unloading at the automatically operated unloading device, a plurality of autonomously moveable, driverless transport vehicles, each of the autonomously moveable, driverless transport vehicles having a chassis with a drive unit and a loading platform arranged on the chassis for receiving a mobile transport loading aid, wherein the plurality of autonomously moveable, driverless transport vehicles are controlled by a control system to transport empty transport loading aids to the loading station and to provide one of the empty transport loading aids at the automatically operated first loading device or on the buffer surface close to the automatically operated first loading device, to transport the at least one loaded transport loading aid containing the at least one article carrier stack from the loading station to a storage zone, and to transport the at least one loaded transport loading aid containing the article carriers required for the picking order from the storage zone to an unloading station and to provide the at least one loaded transport loading aid at the automatically operated unloading device or on a buffer surface close to the automatically operated unloading device, and a reloading station for assembling the article carriers for the picking order.

26. The order fulfillment facility according to claim 25, further comprising an order stack load securing station with at least one automatically operated load securing device or with at least one automatically operated load securing device and a buffer surface close to the automatically operated load securing device,
- wherein the automatically operated load securing device is formed for secure transport of an order stack with a securing means, and
- wherein the order stack load securing station comprises a lifting device which lifts the target loading aid with the order stack from the stack loading aid if the order fulfillment facility comprises the first stack loading aid or which lifts the order stack from the stack loading aid if the order fulfillment facility comprises the second stack loading aid, for stabilizing the order stack with the securing means.

27. The order fulfillment facility according to claim 25, wherein some of the plurality of mobile transport loading aids comprises:
- a base,
- side walls connected to the base,
- at least one accommodating shaft bounded by the side walls for accommodating at least one article carrier stack, and
- a loading and unloading opening,
- wherein the side walls serve to stabilize a position of the at least one article carrier stack when the carrier stack is placed on the base, and
- wherein the side walls consist of only first side walls arranged parallel or inclined to each other, or the side walls comprise first side walls arranged parallel or inclined to each other and a second side wall arranged between the first side walls.

28. The order fulfillment facility according to claim 27, wherein the side walls comprise the first side walls arranged parallel or inclined to each other and the second side wall arranged between the first side walls, wherein the second side wall comprises a side wall part inclined at an inclination angle towards a vertical plane spanning between the first side walls such that the side wall part is inclined backwards with increasing vertical distance from the base.

29. The order fulfillment facility according to claim 27, wherein the base comprises a base part which is inclined downwards in the direction towards the second side wall at an inclination angle towards a horizontal plane spanning between the first side walls.

30. The order fulfillment facility according to claim 27, wherein the base comprises a placing surface on an upper side of the base, on which at least one article carrier stack is placed, and a transport surface on a lower side of the base, against which a loading platform of an autonomously moveable, driverless transport vehicle of the plurality of autonomously moveable, driverless transport vehicles is positioned.

31. The order fulfillment facility according to claim 25, further comprising at least one stack loading aid for stabilizing a position of an order stack assembled of the article carriers according to the picking order, wherein the at least one stack loading aid comprises at least one of a first stack loading aid and a second stack loading aid, and wherein the at least one stack loading aid comprises a base and stack walls connected to the base.

32. The order fulfillment facility according to claim 31, wherein an upper side of the base of the first stack loading aid forms a placing surface on which a target loading aid, with the order stack stacked thereon is placed.

33. The order fulfillment facility according to claim 31, wherein an upper side of the base of the second stack loading aid forms protruding placing blocks separated from each other by receiving channels, on which the article carriers of the order stack are placed, so that the second stack loading aid forms the target loading aid.

34. The order fulfillment facility according to claim 31, wherein the base comprises a transport surface on a lower side of the base, against which a loading platform of an autonomously movable, driverless transport vehicle of the plurality of autonomously movable, driverless transport vehicles is positioned.

* * * * *